United States Patent
Takeda et al.

(10) Patent No.: US 9,287,903 B2
(45) Date of Patent: Mar. 15, 2016

(54) SIGNAL TRANSMISSION APPARATUS, ELECTRONIC INSTRUMENT AND SIGNAL TRANSMISSION METHOD

(75) Inventors: Takahiro Takeda, Kanagawa (JP); Kenichi Kawasaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 565 days.

(21) Appl. No.: 13/200,919

(22) Filed: Oct. 5, 2011

(65) Prior Publication Data

US 2012/0093041 A1 Apr. 19, 2012

(30) Foreign Application Priority Data

Oct. 18, 2010 (JP) .................. 2010-233696

(51) Int. Cl.
*H04W 88/02* (2009.01)
*H04L 5/14* (2006.01)
*H01P 1/06* (2006.01)
*H04B 1/034* (2006.01)

(52) U.S. Cl.
CPC . *H04B 1/034* (2013.01); *H01P 1/06* (2013.01)

(58) Field of Classification Search
CPC .................................. H04B 1/34; H04B 1/034
USPC .................................................. 333/20, 21 A
See application file for complete search history.

(56) References Cited

U.S. PATENT DOCUMENTS

| | | | |
|---|---|---|---|
| 3,668,567 A * | 6/1972 | Rosen .......................... | 333/21 A |
| 5,576,668 A * | 11/1996 | Clark et al. ................. | 333/21 A |
| 5,760,658 A * | 6/1998 | Tokuda et al. .............. | 333/21 A |
| 2002/0109558 A1* | 8/2002 | Kanamaluru ............... | 333/21 A |
| 2002/0130808 A1* | 9/2002 | Fukushima et al. .......... | 342/75 |
| 2007/0161292 A1 | 7/2007 | Igarashi | |
| 2009/0232459 A1 | 9/2009 | Shigeno et al. | |
| 2010/0188305 A1* | 7/2010 | Blaser et al. ................ | 343/756 |
| 2011/0026443 A1* | 2/2011 | Okada et al. ................ | 370/280 |

FOREIGN PATENT DOCUMENTS

| | | |
|---|---|---|
| JP | 50-41451 | 4/1975 |
| JP | 52-146147 | 12/1977 |
| JP | 52-156535 | 12/1977 |
| JP | 57-015501 | 1/1982 |
| JP | 63-147012 | 9/1988 |
| JP | 64-037109 | 2/1989 |
| JP | 08-335808 | 12/1996 |

(Continued)

OTHER PUBLICATIONS

Machine translation of JP 2007-201576, translated Sep. 17, 2014.*

(Continued)

*Primary Examiner* — Stephen E Jones
*Assistant Examiner* — Scott S Outten
(74) *Attorney, Agent, or Firm* — Hazuki International, LLC

(57) ABSTRACT

A signal transmission apparatus includes: a transmission section adapted to transmit a transmission object signal as a radio wave; a reception section adapted to receive the radio wave transmitted from the transmission section and output an electric signal corresponding to the received radio wave; and a connection section adapted to connect a first housing and a second housing of an electronic instrument pivotably around a center axis; the connection section having a radio signal transmission line formed therein by which wireless transmission can be carried out between the transmission section and the reception section.

22 Claims, 25 Drawing Sheets

(56) References Cited

FOREIGN PATENT DOCUMENTS

| | | |
|---|---|---|
| JP | 10-041716 | 2/1998 |
| JP | 2002-232202 A | 8/2002 |
| JP | 2006-136016 A | 5/2006 |
| JP | 2007-201576 A | 8/2007 |
| JP | 2007-228223 A | 9/2007 |
| JP | 4079126 | 2/2008 |
| JP | 4082353 | 2/2008 |
| JP | 2008-079085 A | 4/2008 |
| JP | 2009-222084 | 1/2009 |

OTHER PUBLICATIONS

Machine translation of JP2011035511, translated Feb. 12, 2015.*
Japanese Office Action issued Jul. 1, 2014 for corresponding Japanese Application No. 2010-233696.

* cited by examiner

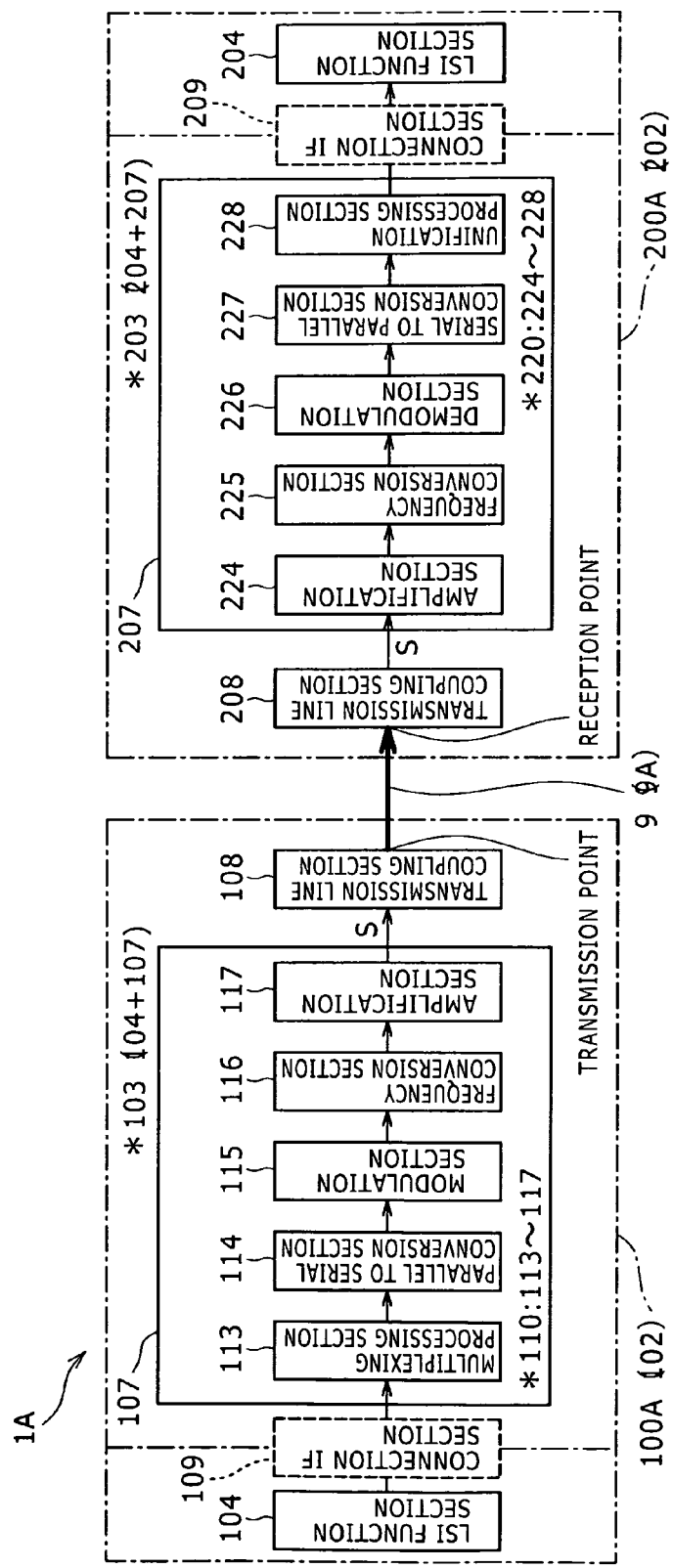

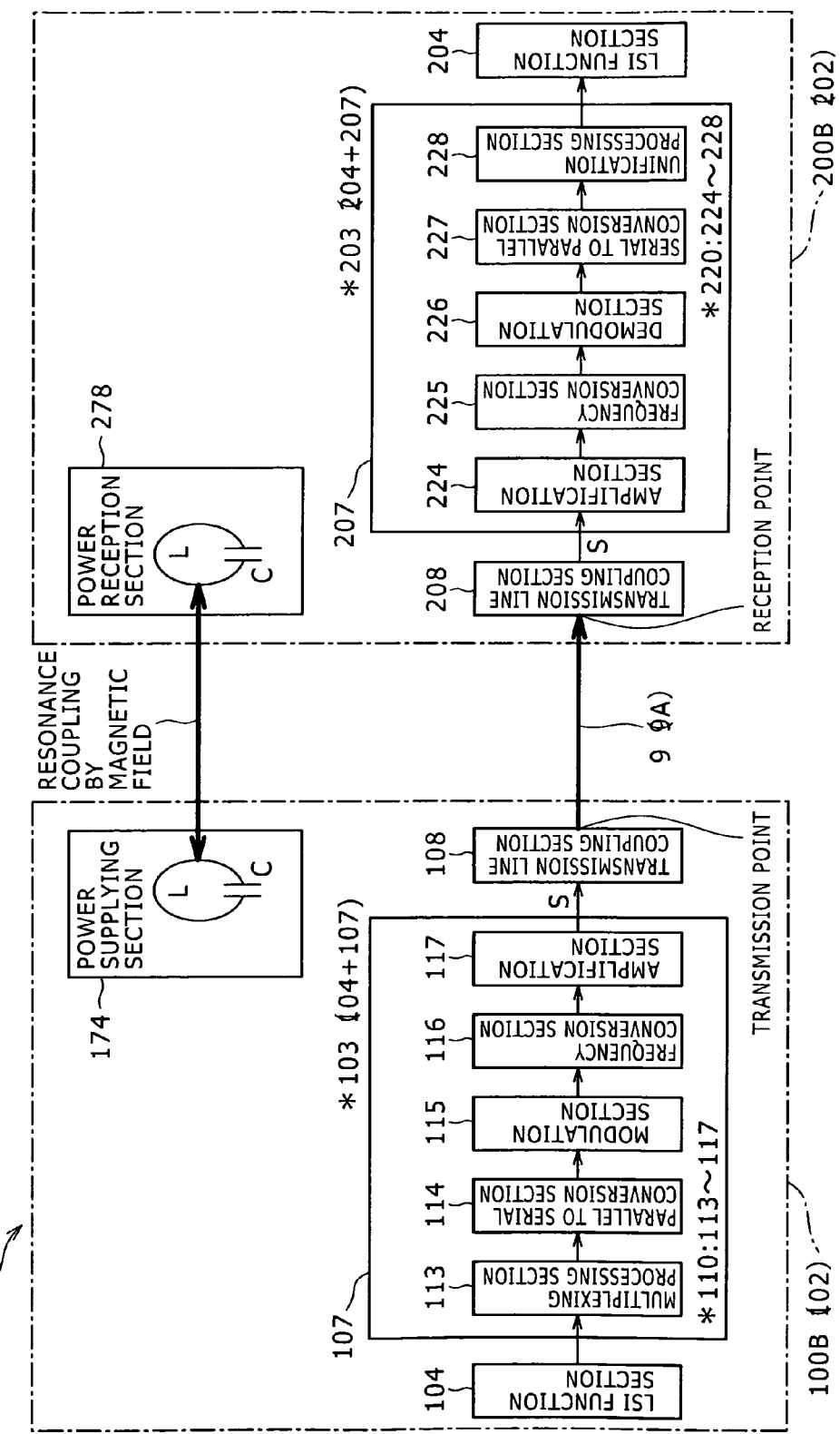

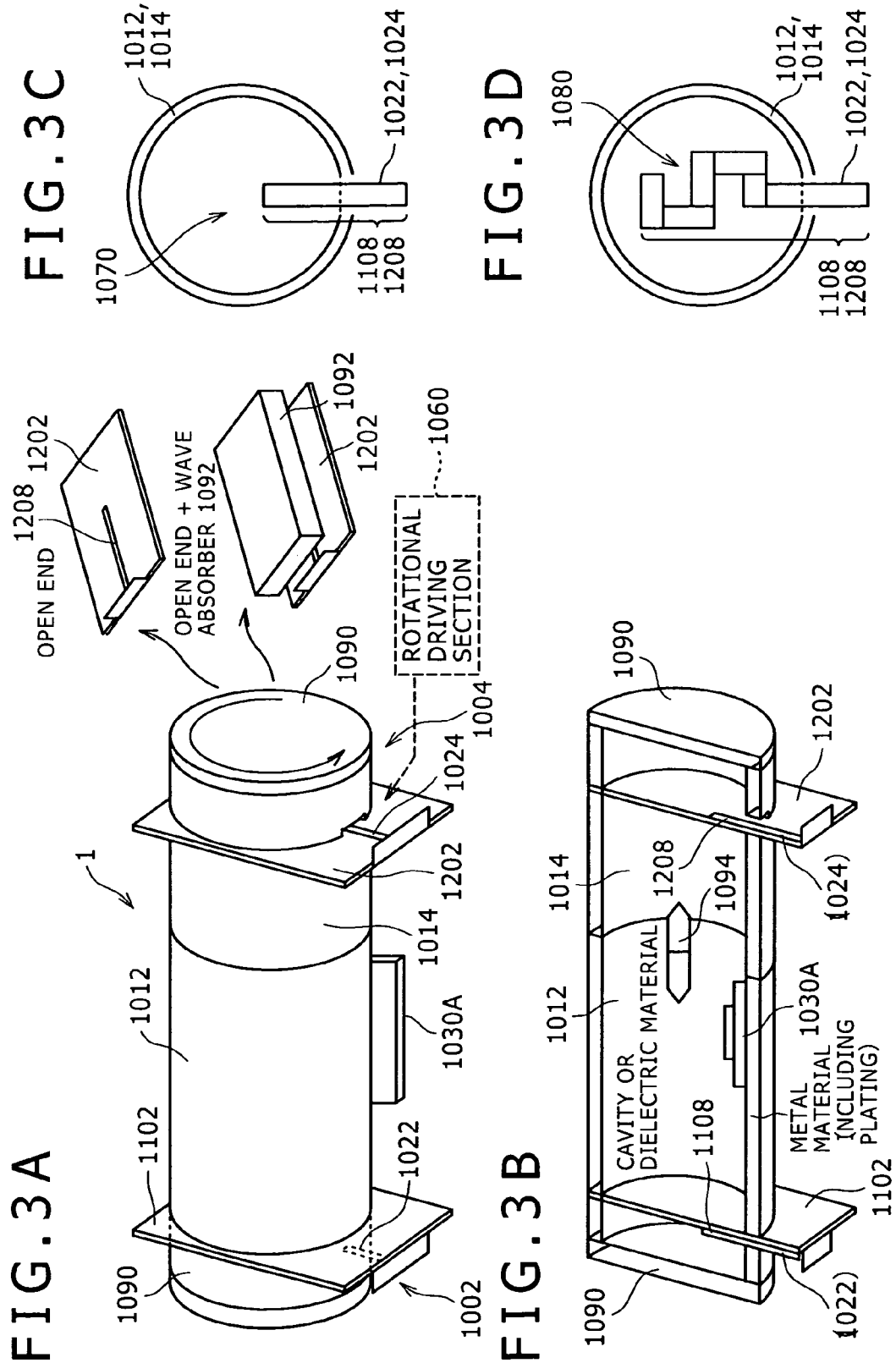

FIG. 4  <EXAMPLE OF COMBINATION OF FIXED SECTION, MOVABLE SECTION, PRESENCE OR ABSENCE OF POLARIZATION CONVERSION SECTION, LINEAR POLARIZATION PROBE AND CIRCULAR POLARIZATION PROBE>

| EXAMPLE OF CONFIGURATION | FIXED SECTION | | | MOVABLE SECTION | | | EVALUATION | COMMENT (SUPERIORITY OR INFERIORITY) |
|---|---|---|---|---|---|---|---|---|
| | SHORT OR OPEN | PROBE POLARIZATION | POLARIZATION CONVERSION SECTION (Polarizer) | SHORT OR OPEN | PROBE POLARIZATION | POLARIZATION CONVERSION SECTION (Polarizer) | | |
| 1 | SHORT | CIRCULAR | NO | SHORT | CIRCULAR | NO | A | SIMPLE IN STRUCTURE |
| 2 | OPEN | CIRCULAR | NO | OPEN | CIRCULAR | NO | C | RADIATION ON OPEN SIDE MATTERS |
| 3 | SHORT (OPEN) | CIRCULAR | NO | OPEN (SHORT) | CIRCULAR | NO | C | RADIATION ON OPEN SIDE MATTERS |
| 4 | SHORT | LINEAR (CIRCULAR) | YES (NO) | SHORT | CIRCULAR (LINEAR) | NO (YES) | B | ADVANTAGEOUS IN AXIAL RATIO CHARACTERISTIC IN COMPARISON WITH CONFIGURATION EXAMPLE 1 |
| 5 | OPEN | LINEAR (CIRCULAR) | YES (NO) | OPEN | CIRCULAR (LINEAR) | NO (YES) | D | RADIATION ON OPEN SIDE MATTERS, TWO PROBE DESIGNS ARE REQUIRED |
| 6 | SHORT (OPEN) | LINEAR (CIRCULAR) | YES (NO) | OPEN (SHORT) | CIRCULAR (LINEAR) | NO (YES) | D | RADIATION ON OPEN SIDE MATTERS |
| 7 | SHORT | LINEAR | YES | SHORT | LINEAR | NO | E | DIFFICULTY IN USE BECAUSE OF REFLECTION IN SHORT |
| 8 | OPEN | LINEAR | YES | OPEN | LINEAR | NO | C | RADIATION ON OPEN SIDE MATTERS, DROP OF LEVEL BY 3 dB |
| 9 | SHORT (OPEN) | LINEAR | YES | OPEN (SHORT) | LINEAR | NO | C | RADIATION ON OPEN SIDE MATTERS, DROP OF LEVEL BY 3 dB |
| 10 | SHORT | LINEAR | NO | SHORT | LINEAR | NO | E | DIFFICULTY IN USE BECAUSE OF REFLECTION IN SHORT, LIMITED ONLY TO CASE WHEREIN ROTATION ANGLE IS SMALL |
| 11 | OPEN | LINEAR | NO | OPEN | LINEAR | NO | E | LIMITED ONLY TO CASE WHEREIN ROTATION ANGLE IS SMALL |
| 12 | SHORT (OPEN) | LINEAR | NO | OPEN (SHORT) | LINEAR | NO | E | LIMITED ONLY TO CASE WHEREIN ROTATION ANGLE IS SMALL |
| 13 | SHORT | LINEAR | YES | SHORT | LINEAR | YES | B | ADVANTAGEOUS IN AXIAL RATIO CHARACTERISTIC IN COMPARISON WITH CONFIGURATION EXAMPLE 1, WAVEGUIDE BECOMES LONG |
| 14 | OPEN | LINEAR | YES | OPEN | LINEAR | YES | D | RADIATION ON OPEN SIDE MATTERS, WAVEGUIDE BECOMES LONG |
| 15 | SHORT (OPEN) | LINEAR | YES | OPEN (SHORT) | LINEAR | YES | D | RADIATION ON OPEN SIDE MATTERS, WAVEGUIDE BECOMES LONG |

RIGHT-HANDED WAVE

LEFT-HANDED WAVE

OPEN END

WAVE ABSORBER
+ OPEN END

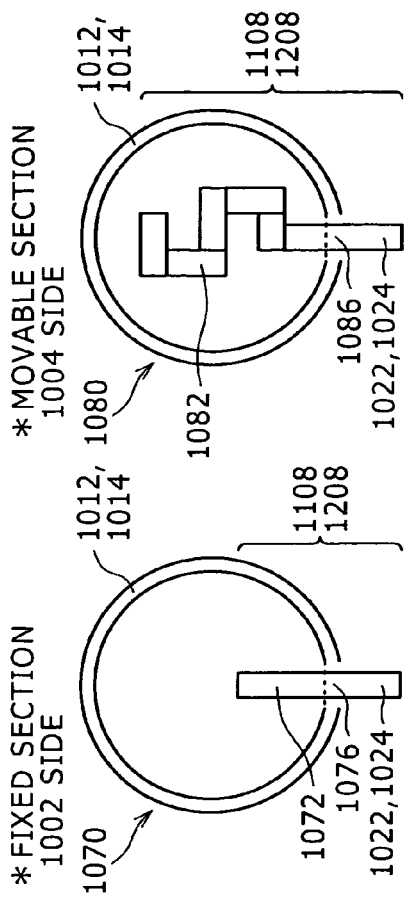
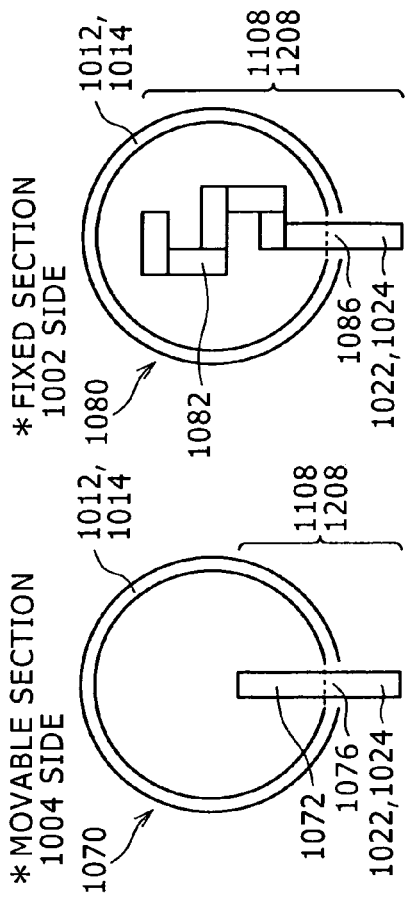
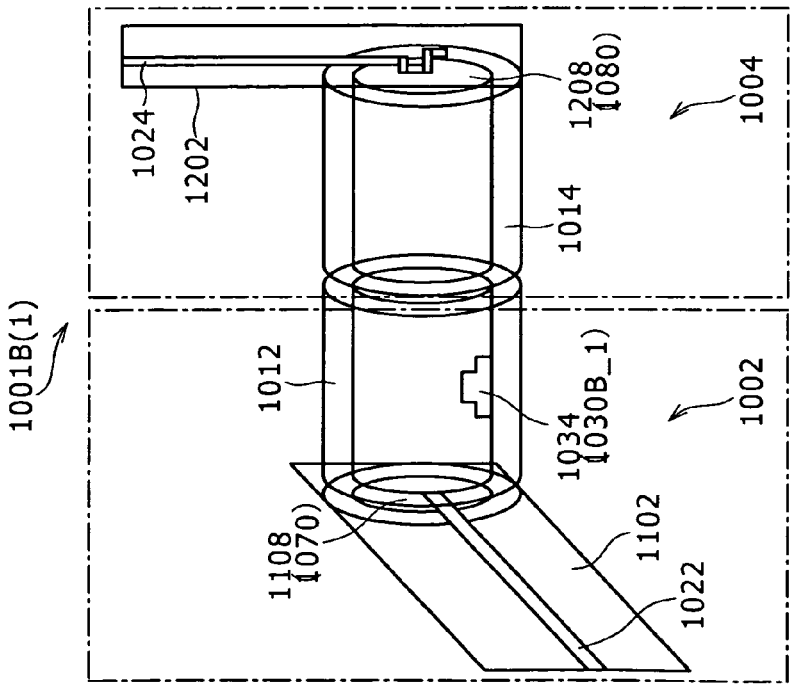

SIGNAL TRANSMISSION APPARATUS, ELECTRONIC INSTRUMENT AND SIGNAL TRANSMISSION METHOD

BACKGROUND

This disclosure relates to a signal transmission apparatus, an electronic instrument and a signal transmission method, and more particularly to a technology for transmitting a signal between a plurality of housings of an electronic instrument.

A foldable electronic instrument is known wherein a plurality of housings are connected for folding movement by a connection section for which a hinge structure is utilized. Usually, an electric wiring line such as a flexible cable or a thin line coaxial cable for connecting the housings to each other is disposed in the connection section to achieve a signal interface between the housings. A related art is disclosed in Japanese Patent No. 4082353 or Japanese Patent No. 4079126, particularly refer to FIGS. 2 to 4. However, the signal transmission by an electric wiring line has a problem in reliability in that a cable may be deteriorated until it is broken down and another problem that, as the transmission rate increases, the number of wiring lines increases.

On the other hand, as a method which does not rely upon an electric wiring line, it has been proposed to utilize optical communication in a connection section of a hinge mechanism to carry out signal transmission. The signal transmission just described is disclosed, for example, in Japanese Patent No. 4079126, particularly in FIGS. 6 and 7, and Japanese Patent Laid-Open No. 2009-222084.

SUMMARY

However, the method of utilizing optical communication to carry out signal transmission requires a configuration suitable for properties of light and is disadvantageous in that it is difficult to avoid increase of the size and the cost.

Therefore, it is desirable to provide a novel technology which can eliminate the disadvantage in size and cost involved in signal transmission in a hinge structure without depending upon an electric wiring line.

According to a mode of the present disclosure, there is provided a signal transmission apparatus including a transmission section adapted to transmit a transmission object signal as a radio wave, and a reception section adapted to receive the radio wave transmitted from the transmission section and output an electric signal corresponding to the received radio wave. The signal transmission apparatus further includes a connection section adapted to connect a first housing and a second housing of an electronic instrument pivotably around a center axis, the connection section having a radio signal transmission line formed therein by which wireless transmission can be carried out between the transmission section and the reception section. Here, "wireless transmission can be carried out" signifies that a radio wave can be transmitted.

Preferably, the millimeter waveband or a frequency band in the proximity of the millimeter waveband such as the sub millimeter waveband or the centimeter waveband is used for a carrier signal. The signal transmission apparatus can be modified in various manners to achieve additional advantages.

According to another mode of the present disclosure, there is provided an electronic instrument including a transmission side signal processing section adapted to produce an electric signal in a frequency band of a radio wave based on a transmission object signal, a transmission section adapted to transmit the electric signal produced by the transmission side signal processing section as a radio wave, and a reception section adapted to receive the radio wave transmitted from the transmission section and output a corresponding electric signal. The electronic instrument further includes a reception side signal processing section adapted to reproduce a transmission object signal based on the electric signal outputted from the reception section, a first housing in which the transmission side signal processing section is accommodated, a second housing in which the reception side signal processing section is accommodated, and a connection section adapted to connect the first housing and the second housing pivotably around a center axis, the connection section having formed therein a radio signal transmission line along which wireless transmission between the transmission section and the reception section can be carried out.

According to a further mode of the present disclosure, there is provided a signal transmission method including carrying out wireless transmission with a radio wave between a first housing and a second housing of an electronic instrument along a radio signal transmission line formed in a connection section for connecting the first housing and the second housing pivotably around a center axis.

In summary, according to the present disclosure, in the connection section of the hinge structure by which the first housing of the electronic instrument in which, for example, a transmission side signal processing section is accommodated and the second housing of the electronic instrument in which, for example, a reception side signal processing section are accommodated are rotatably connected around the center axis, a radio signal transmission line which allows radio transmission between the transmission section and the reception section is formed. Further, in the present disclosure, the connection section between the first housing and the second housing in the hinge structure is utilized to form the radio signal transmission line to carry out wireless connection in the frequency band of the radio wave between the transmission and reception sections.

With the signal transmission apparatus, electronic instrument and signal transmission method according to the present disclosure, signal transmission through the connection section which rotatably connects the first housing and the second housing to each other can be implemented wirelessly using a radio wave without using an electric wiring line or light. Since a radio wave is utilized, a radio communication technology can be applied, and problems involved in use of an electric wiring line can be eliminated. Further, a signal interface at a connection section of a hinge structure can be constructed with a configuration simpler and less expensive than that in the case where light is utilized. The signal transmission apparatus, electronic instrument and signal transmission method according to the present disclosure are more advantageous in terms of the size and the cost than in the case where light is utilized.

The above and other features and advantages of the present disclosure will become apparent from the following description and the appended claims, taken in conjunction with the accompanying drawings in which like parts or elements denoted by like reference symbols.

BRIEF DESCRIPTION OF THE DRAWINGS

FIGS. 3A to 3D are schematic views showing a basic configuration of a hinge structure according to an embodiment of the present disclosure;

FIGS. 7A to 7C and 8A-1 to 8C-3c are schematic views showing different examples of a polarization conversion section used in the hinge structure of the embodiment;

FIGS. 14A to 14C are schematic views showing a hinge structure of a working example 2;

DETAILED DESCRIPTION OF THE PREFERRED EMBODIMENT

Figure 5A:
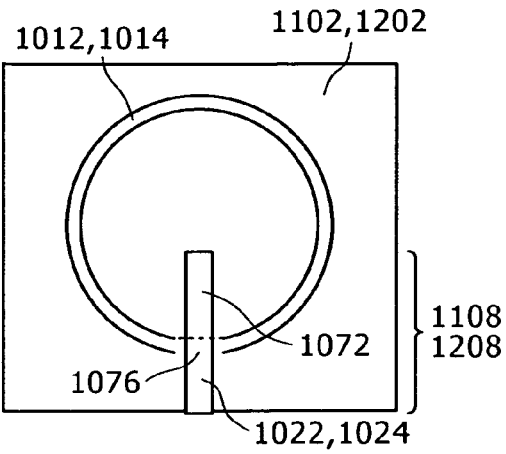
FIGS. 5A to 5B-5 are schematic views showing a linearly polarized wave probe and a circularly polarized wave probe as a transmission and reception antenna used in the hinge structure of the embodiment.

In the following, an embodiment of the present disclosure is described in detail with reference to the accompanying drawings. In the following description, in order to distinguish each functioning element among different forms, the functioning element is represented by a reference character with a reference symbol of a capital letter of an alphabet like A, B, C, . . . added thereto, but when no such distinction is required, the reference symbol is omitted. This similarly applies also to the accompanying drawings.

The description is given in the following order.
1. General Outline
2. Communication Processing System: first example
3. Communication Processing System: second example
4. Hinge Structure: basic configuration
5. Transmission and Reception Antennae: for a linearly polarized wave, for a circularly polarized wave, an annular patch antenna
6. Polarization Conversion Section
7. Mode Conversion Section
8. Particular Applications Working Example 1: a linearly polarized wave probe is disposed at the opposite ends and a polarization conversion section is disposed in a waveguide, and a circularly polarized wave is transmitted Working Example 2: a linearly polarized wave probe is disposed at one end and a polarization conversion section is disposed in a waveguide, and a circularly polarized wave is transmitted Working Example 3: mode conversion in a waveguide Working Example 4: annular patch antennae on the opposite ends Working Example 5: a linearly polarized wave probe is disposed at the opposite ends and a linearly polarized wave is transmitted in a waveguide Working Example 6: multiplexing transmission using two orthogonally polarized waves Working Example 7: multiplexing transmission by frequency division multiplexing Working Example 8: waveguide length is changeable Working Example 9: wireless transmission of a signal+ wireless transmission of power Working Example 10: wireless transmission of a signal+ transmission of power by a slip ring mechanism Working Example 11: applications to an electronic instrument <General Outline>
Signal Transmission Apparatus, Signal Transmission Method In a configuration of an embodiment corresponding to the first to third modes of the present disclosure, a signal transmission apparatus, a hinge structure or an electronic instrument includes a transmission section adapted to transmit a transmission object signal in the form of a radio wave, and a reception section adapted to receive the radio wave transmitted from the transmission section and output an electric signal corresponding to the received radio wave.

For example, a transmission side signal processing section is accommodated in a first housing of an electronic instrument, and, for example, a reception side signal processing section is accommodated in a second housing of the electronic instrument. Further, a connection section is provided which connects the first housing and the second housing for pivotal motion around a center axis. The connection section may be configured such that it does not allow, in normal use of the electronic instrument, disconnection of the first housing and the second housing from each other or may be configured such that it allows disconnection of the first housing and the second housing from each other but connects, when the electronic instrument is to be used, the first housing and the second housing to each other.

Further, a radio signal transmission line which allows wireless transmission between the transmission section and the reception section is formed in the connection section of the hinge structure. In other words, the hinge structure in the electronic instrument which connects the first housing which accommodates, for example, the transmission side signal processing section and the second housing which accommodates, for example, the reception side signal processing section is utilized such that wireless transmission in a frequency band of a radio wave is carried out between the transmission and reception sides at the connection section provided on the hinge structure. Preferably, a cavity provided in the connection section between the first housing and the second housing of the hinge structure is utilized to form the radio signal transmission line, which is utilized to carry out wireless transmission in the frequency band of the radio wave between the transmission and reception sides. If a radio wave is used for signal transmission, then the problems which appear in the case where an electric wiring line or light is used do not appear.

Preferably, the millimeter waveband in which the wavelength ranges from one to 10 mm is used mainly as the frequency band of the radio wave, or in other words, as the carrier frequency. The present disclosure can be applied not only to the millimeter waveband but also to a case where a waveband in the proximity of the millimeter waveband such as, for example, the sub millimeter waveband in which the wavelength is shorter and ranges from 0.1 to one millimeter or the centimeter waveband in which the wavelength is longer and ranges from one to 10 cm. For example, in the case where a frequency division multiplexing method is adopted, if the number of carrier frequencies to be used increases until a required communication band cannot be assured with the millimeter waveband, then the sub millimeter waveband~millimeter waveband, millimeter waveband~centimeter waveband or sub millimeter waveband~millimeter waveband~centimeter waveband are used. In order to reduce the size of the signal transmission apparatus, it is suitable to use the millimeter waveband or the sub millimeter waveband rather than the centimeter waveband.

If the millimeter waveband or a proximity waveband to the millimeter waveband is used for signal transmission, then no disturbance is provided to the other electric wiring lines, and the necessity for such an EMC (electromagnetic compatibility) countermeasure as is used when an electric wiring line such as, for example, a flexible printed wiring line is used for signal transmission is reduced. If the millimeter waveband or a proximity waveband is used, then a higher data rate can be applied than that when an electric wiring line such as a flexible printed wiring line is used. Therefore, it is possible to cope readily with high speed and high data rate transmission such as high speed transmission of an image signal necessitated by enhancement of the definition or increase of the frame rate.

Preferably, a waveguide section for connecting the transmission section and the reception section to each other is provided in the cavity formed in the connection section between the first housing and the second housing of the hinge structure, and the radio signal transmission line is formed in the waveguide section. When the waveguide section is provided in the cavity, the waveguide section may be provided linearly and coaxially with the center axis of the connection section, or the waveguide may have a bent portion, at which a reflection section for changing the path of the radio wave between the transmission and reception sides is provided.

When the waveguide section is provided in the cavity, a waveguide which forms the waveguide section may be disposed. The radio signal transmission line is formed in the waveguide. In this instance, irregular reflection of the radio wave can be prevented rather than that in an alternative case in which the cavity itself formed in the connection section is utilized as the radio signal transmission line. In this instance, if the waveguide is provided linearly and coaxially with the center axis of the connection section, then the waveguide preferably includes a first waveguide coaxial with the center axis of the connection section and a second waveguide rotatable relative to the first waveguide around the center axis of the connection section. In this instance, the radio signal transmission line is formed in the first waveguide and the second waveguide.

When the waveguide which configures the waveguide section is provided in the cavity, preferably a dielectric material is stuffed in the waveguide. In this instance, multiple reflections can be reduced and the pipe diameter can be reduced.

When the waveguide which configures the waveguide section is provided in the cavity, in the case where a dielectric material is stuffed in the waveguide, preferably a surface treatment, which may be metal plating, for coating a thin film of a metal material is carried out in such a manner as to cover an outer periphery of the dielectric material. In this case, the waveguide can be lightened.

In the case where the waveguide configures the waveguide section is provided in the cavity, a transmission line coupling section for transmitting a radio signal to the radio signal transmission line is provided at an end portion of the waveguide on the transmission section side while a transmission line coupling section for receiving the radio signal from the radio signal transmission line is provided at an end portion of the waveguide on the reception section side. Preferably, a terminating member for reflecting the radio signal to the transmission line coupling section side is provided on at least one, more preferably on both, of the opposite side to the radio signal transmission line with respect to the end portion of the waveguide on the transmission section side and the opposite side to the radio signal transmission line with respect to the end portion of the waveguide on the reception section side. In this instance, enhancement of the sensitivity can be achieved by the structure wherein also a reflected wave can be utilized by the terminating member.

Or, in the case where the waveguide configures the waveguide section is provided in the cavity, a transmission line coupling section for transmitting a radio signal to the radio signal transmission line is provided at an end portion of the waveguide on the transmission section side while a transmission line coupling section for receiving the radio signal from the radio signal transmission line is provided at an end portion of the waveguide on the reception section side. Further, at least one (preferably both) of the opposite side to the radio signal transmission line with respect to the end portion of the waveguide on the transmission section side and the opposite side to the radio signal transmission line with respect to the end portion of the waveguide on the reception section side may be formed as an open end, and an absorption member for absorbing the radio signal radiated from the transmission line coupling section or the waveguide may be provided in the proximity of the open end. In this instance, since a leak radio wave is absorbed by the absorption member, unnecessary reflection can be prevented.

It is to be noted that the terminating member may be provided at one of the end portions of the waveguide while the other end portion is made an open end and an absorption member is provided in the proximity of the open end. In other words, the transmission line coupling section for transmitting a radio signal to the radio signal transmission line is provided at the end portion of the waveguide on the transmission section side while the transmission line coupling section for receiving the radio signal from the radio signal transmission line is provided at the end portion of the waveguide on the reception section side. Further, the terminating member for reflecting the radio signal to the transmission line coupling section side is provided on one of the opposite side of the end portion of the waveguide on the transmission section side opposite to the radio signal transmission line and the opposite side of the end portion of the waveguide on the reception section side opposite to the radio signal transmission line, and the other of the opposite side of the end portion of the waveguide on the transmission section side opposite to the radio signal transmission line and the opposite side of the end portion of the waveguide on the reception section side opposite to the radio signal transmission line is left an open end. Further, the absorption member for absorbing the radio signal radiated from the transmission line coupling section or the waveguide may be provided in the proximity of the open end.

In the case where the rotating angle of the connection section of the hinge structure is small, that is, smaller than 90 degrees, a linearly polarized wave may be used for transmission in the waveguide. In particular, in the case where the coupling section allows the first housing and the second housing to open and close within a range of less than 90 degrees around the center axis, a transmission side transmission line coupling section including a linear polarization probe for transmitting a radio signal in the form of a linearly polarized wave to the radio signal transmission line is provided at an end portion of the radio signal transmission line on the transmission section side, and a reception side transmission line coupling section including a linear polarization probe for receiving the radio signal of the linearly polarized wave from the radio signal transmission line is provided at an end portion of the radio signal transmission line on the reception section side. Then, a linearly polarized wave is used for wireless transmission within the radio signal transmission line.

In the case where the signal transmission apparatus is configured such that it is not influenced by the rotational angle of the connection section of the hinge structure, or in other words, in the case where there is no limitation to the rotational angle, a circularly polarized wave may be used for wireless transmission in the waveguide, that is, in the radio signal transmission line.

In the case where the signal transmission apparatus is configured such that a circularly polarized wave is used for wireless transmission in the radio signal transmission line, basically the following three modes can be taken. In order to facilitate understandings of the description, it is assumed that one of the "signal processing section of the transmission side and transmission section" and the "reception section and signal processing circuit of the reception side" is mounted on the fixed section, and the movable section is configured for relative rotation around the opening and closing rotational axis with respect to the fixed section. Further, the transmission section and the reception section are collectively referred to as communication sections.

1) An antenna for a circularly polarized wave, that is, a circular polarization probe, is used at the transmission line coupling section in the communication sections of the fixed section and the movable section. In this instance, no special countermeasure is required for the radio signal transmission line. For example, in the case of transmission from the fixed section to the movable section, a signal is transmitted in the form of a circularly polarized wave from the circular polarization probe of the communication section of the fixed section side to the radio signal transmission line. Even if the movable section rotates over more than 90 degrees, the circular polarization probe of the communication section of the movable section side can receive the circularly polarized wave propagated in the radio signal transmission line without any trouble. The same holds true for the case of the reversed direction of transmission from the fixed section to the movable section.

2) An antenna for a linearly polarized wave, that is, a linear polarization probe, is used at the transmission line coupling section in one of the communication sections of the fixed section and the movable section while an antenna for a circularly polarized wave, that is, a circular polarization probe, is provided at the transmission line coupling section of the other one of the communication sections of the fixed section and the movable section. In this instance, the radio signal transmission line is formed in a waveguide structure, and a polarization conversion section for converting a circularly polarized wave and a linearly polarized wave is provided. This is described specifically in connection with a case in which a linear polarization probe is provided in the communication section of the fixed section side while a circular polarization probe is provided in the communication section of the movable section side. In this instance, in the case of transmission from the fixed section to the movable section, a signal is transmitted in the form of a linearly polarized wave from the linear polarization probe of the communication section of the fixed section side to the radio signal transmission line. The linearly polarized wave is converted into a circularly polarized wave by the polarization conversion section provided in the radio signal transmission line or waveguide. The circularly polarized wave obtained by the conversion propagates in the radio signal transmission line and comes to the circular polarization probe of the communication section of the movable section. Accordingly, even in the case where the movable section rotates over more than 90 degrees, the circularly polarized wave having propagated in the radio signal transmission line can be received without any trouble. On the other hand, upon transmission from the movable section to the fixed section, a signal is transmitted in the form of a circularly polarized wave from the circular polarization probe of the communication section of the movable section to the radio signal transmission line. The circularly polarized wave is converted into a linearly polarized wave by the polarization conversion section provided in the radio signal transmission line or waveguide. The linearly polarized wave obtained by the conversion propagates in the radio signal transmission line and comes to the linear polarization probe of the communication section of the fixed section side. Accordingly, even in the case where the movable section rotates over more than 90 degrees, the circularly polarized wave having propagated in the radio signal transmission line is converted into a linearly polarized wave without any trouble by the polarization conversion section. Consequently, the linearly polarized wave can be received without any problem by the fixed section side. This similarly applies also to the case where the circular polarization probe is provided in the communication section of the fixed section side while the linear polarization probe is provided in the communication section of the movable section side.

3) An antenna for a linearly polarized wave, that is, a linearly polarization probe, is used at the transmission line coupling section in the communication sections of the fixed section and the movable section. In this instance, the radio signal transmission line is formed in the form of a waveguide structure, and a polarization conversion section for converting a circularly polarized wave and a linearly polarized wave is provided over a plurality of stages. In particular, a first polarization conversion section for converting a linearly polarized wave into a circularly polarized wave and a second polarization conversion section for converting the circularly polarized wave obtained by the conversion by the first polarization conversion section back into a linearly polarized wave are provided. Since only this relationship is required, a plurality of pairs of a first polarization conversion section and a second polarization conversion section may be provided. In the case of transmission from the fixed section to the movable section, a signal is transmitted in the form of a linearly polarized wave from the linear polarization probe of the communication section of the fixed section side to the radio signal transmission line. The linearly polarized wave is converted into a circularly polarized wave by the first polarization conversion section provided in the radio signal transmission line or waveguide. The circularly polarized wave obtained by the conversion is converted back into a linearly polarized wave by the second polarization conversion section provided in the radio signal transmission line or waveguide. The linearly polarized wave obtained by the conversion by the second polarization conversion section propagates in the radio signal transmission line and comes to the linear polarization probe of the communication section of the movable section side. Accordingly, even in the case where the movable section rotates over more than 90 degrees, the linearly polarized wave having propagated in the radio signal transmission line from one of the communication sections is converted into a circularly polarized wave without any trouble by the first polarization conversion section. Further, the circularly polarized wave is converted into a linearly polarized wave without any trouble by the second polarization conversion section, and the linearly polarized wave can be received without any trouble by the linear polarization probe of the other communication section.

The $TM_{01}$ mode may be used for wireless transmission in the radio signal transmission line. In this instance, an antenna or probe for introducing a radio wave in the $TM_{01}$ mode into the radio signal transmission line may be provided at the transmission line coupling section at the end portion of the radio signal transmission line on the transmission section side while another probe for receiving the signal of the $TM_{01}$ mode having propagated in the radio signal transmission line is provided at the transmission line coupling section at the end portion of the probe on the reception section side. Or, the transmission side transmission line coupling section for transmitting a radio signal in a mode other than the $TM_{01}$ mode such as in the $TM_{11}$ mode to the radio signal transmission line may be provided at the end portion of the radio signal transmission line on the transmission section while the reception side transmission line coupling section for receiving the radio signal of the mode other than the $TM_{01}$ mode such as in the $TM_{11}$ mode and the radio signal of the $TM_{01}$ mode from the radio signal transmission line and the mode conversion section for generating the $TM_{01}$ mode is provided for the radio signal transmission line. Since a polarized wave exists in the $TM_{11}$ mode, a linearly polarized wave cannot be received if the hinge is rotated until the transmission and reception antennae are disposed orthogonally. However, since no polarized wave exists in the $TM_{01}$ mode, even if the hinge is rotated, a linearly polarized wave can be received.

Two polarized waves orthogonal to each other may be used for wireless transmission in the radio signal transmission line to carry out multiplex communication of the signals. The multiplex communication may be carried out in two modes including a mode in which two signals are transmitted in the same direction and another mode in which bidirectional communication is carried out. In this instance, irrespective of whether a circular polarization probe is used for the transmission line coupling section or a linear polarization probe is used for the transmission line coupling section and a polarization conversion section is used in the radio signal transmission line, a signal of a first transmission object is transmitted as a radio signal of a right-handed circularly polarized wave through the radio signal transmission line, particularly between the first waveguide and the second waveguide and a signal of a second transmission object is transmitted as a radio signal of a left-handed circularly polarized wave through the radio signal transmission line, particularly between the first waveguide and the second waveguide.

Multiplex communication of signals may be carried out by time division multiplexing and frequency division multiplexing. The multiplex communication of signals may be carried out in two modes including a mode in which a plurality of signals are transmitted in the same direction and another mode in which bidirectional communication is carried out. For example, transmission and reception are changed over by time division multiplexing to carry out half duplex bidirectional communication. In this instance, the signal processing sections on the transmission side and the reception side have a changeover section which changes over a transmission or reception timing time-divisionally, and a single radio signal transmission line is used to carry out half duplex bidirectional transmission. Full duplex bidirectional communication wherein simultaneous transmission and reception are carried out by frequency division multiplexing may be carried out. In this instance, the transmission side and the reception side use a frequency of a radio signal for transmission and a frequency of a radio signal for reception which are different from each other while a single radio signal transmission line is used to carry out full duplex bidirectional communication. A plurality of systems of signals may be changed over by time division multiplexing to carry out signal transmission. In this instance, a multiplexing processing section for combining a plurality of signals into a single signal by time division processing so that the single signal may be transmitted is provided on the transmission side while a unification processing section for dividing the single radio signal received through the radio signal transmission line into different signals is provided on the reception side. A plurality of signals may be transmitted simultaneously by frequency division multiplexing. In this instance, a multiplexing processing section for using different frequencies for a plurality of transmission object signals such that the signals are transmitted by a single radio signal transmission line is provided on the transmission side while a unification section for dividing the single radio signal received through the radio signal transmission line into different signals is provided on the reception section.

Preferably, the transmission section or the reception section and the corresponding signal processing section are disposed on the same board and disposed in the corresponding housing. In particular, the signal processing section on the transmission side and the transmission section may be disposed on the first board and provided in the first housing while the signal processing section on the reception side and the reception section are disposed on the second board and provided in the second housing.

Preferably, a transmission characteristic of the radio signal transmission line between the transmission section and the reception section is known. Further, for at least one of the signal processing section on the transmission side at a preceding stage to the transmission section and the signal processing section on the reception section at a succeeding stage to the reception section, a set value processing section for inputting a set value for signal processing determined in advance to the signal processing section may be provided. A transmission characteristic between the transmission and reception sides can be known in advance if transmission conditions between the transmission and reception sides do not substantially vary, that is, are substantially fixed. Such transmission conditions do not substantially vary, for example, in an environment in which the locations of the transmission section and the reception section in one housing do not vary, or in other words, in the case of intra-apparatus communication. Such transmission conditions do not substantially vary in another case in which, even in the case where the transmission section and signal transmission section on the transmission side and the reception section and signal processing section on the reception side are disposed in different housings from each other, the locations of the transmission section and the reception section in use are placed in a state determined in advance, or in other words, in the case of wireless transmission between apparatus at a comparatively short distance from each other.

In an environment in which transmission conditions between the transmission and reception side do not substantially vary or, in other words, are substantially fixed, even if a set value which defines an operation of the signal processing sections is handled as a fixed value, or in other words, even if parameter setting is fixed, the signal processing sections can operate without any trouble. By setting a set value for signal setting to a value determined in advance, that is, to a fixed value, the parameter setting need not be changed dynamically, and therefore, the parameter arithmetic operation circuit can be reduced and the power consumption can be reduced as well. In wireless transmission within an apparatus or between apparatus at a comparatively short distance, since the communication environment is fixed, various circuit parameters which depend upon the communication environment can be determined in advance. Further, in the environment in which the transmission conditions are fixed, even if a set value which defines an operation of the signal processing section is handled as a fixed value, that is, even if the parameter setting is fixed, the signal processing section can operate without any trouble. For example, if optimum parameters are determined and retained into the inside of the apparatus upon shipment from a factory, reduction of the parameter arithmetic operation circuit and reduction of the power consumption can be achieved. Various types of setting are available as the parameter setting. For example, gain setting or signal amplitude setting of a signal amplification circuit or amplitude adjustment section, setting of a phase adjustment amount and setting of a frequency adjustment are available. The gain setting is utilized for transmission power setting, setting of a reception level to be inputted to a demodulation functioning section, AGC (automatic gain control) and so forth. The setting of a phase adjustment amount is utilized to adjust, in a system in which a carrier signal and a clock are set separately, the phase in accordance with a delay amount of a transmission signal. The setting of a frequency characteristic is utilized to emphasize the amplitude of a low frequency component or a high frequency component in advance on the transmission side.

In the configuration of the embodiment corresponding to the hinge structure according to the second mode, a power transmission section for transmitting power by wireless transmission or by means of a slip ring between the first housing and the second housing may be provided at the connection portion of the hinge structure. In the case where wireless transmission is used for power transmission, from between a method which does not use an electromagnetic coil, that is, a radio wave reception type method, and another method which uses an electromagnetic coil, that is, an electromagnetic induction type method or a resonance type method, the method which uses an electromagnetic coil is adopted preferably.

It is to be noted that, if the first housing and the second housing are configured from a dielectric material which can transmit a radio signal or radio wave therethrough, then it is possible to use the first housing and the second housing as the radio signal transmission line to carry out wireless transmission in a frequency band of the radio wave between the transmission and reception sides. In this instance, it is not essential to configure the first housing and the second housing entirely from a dielectric material suitable for transmission of a radio signal or radio wave, but only a portion of the first housing and the second housing which configures the route interconnecting the transmission and reception sides may be configured from a dielectric material suitable for transmission of a radio signal or radio wave. In other words, a dielectric material suitable for transmission of a radio signal or radio wave may be embedded only in a portion of an ordinary dielectric material used for a housing on the route interconnecting the transmission and reception sides.

Electronic Instrument

In the configuration of the embodiment corresponding to the electronic instrument according to the second mode of the present disclosure, the electronic instrument may be an electronic instrument of a first example wherein intra-apparatus signal transmission is carried out or an electronic instrument of a second example wherein signal transmission between different apparatus is carried out. For example, the electronic instrument of the first example relates to signal transmission within an apparatus and is configured such that a first communication section which transmits a transmission object signal as a radio signal and includes a transmission section and a signal processing section on the transmission side, a second communication section which receives the radio signal transmitted from the transmission section of the first communication section and includes a reception section and a signal processing section on the reception side, and a radio signal transmission line which allows wireless transmission between the transmission section and the reception section, all disposed at positions determined in advance in a single housing.

The electronic instrument of the second example relates to signal transmission between different apparatus and includes a first electronic instrument in which a first communication section which transmits a transmission object signal as a radio signal and includes a transmission section and a signal processing section on the transmission side is disposed at a transmission point determined in advance in one housing and a second electronic instrument in which a second communication section which receives the radio signal transmitted from the transmission section of the first communication section and includes a reception section and a signal processing section on the reception side is disposed at a reception point determined in advance in one different housing. Then, when the first electronic instrument and the second electronic instrument are disposed at positions determined in advance, a radio signal transmission line which allows wireless communication is formed between the transmission section of the first communication section and the reception section of the second communication section.

In particular, in the configuration of the embodiment which corresponds to the electronic instrument according to the second mode of the present disclosure, not only it is possible to form a single electronic instrument having an apparatus configuration wherein components are accommodated in one housing but also it is possible to configure one electronic instrument from a combination of a plurality of apparatus, that is, a plurality of electronic instrument. The signal transmission apparatus of the embodiment is utilized for a hinge structure which forms a connection section which utilizes the hinge structure at a connection portion between the first housing and the second housing. Further, the hinge structure can be applied to an electronic instrument of the foldable type wherein the first housing and the second housing are connected to each other for folding movement by the connection section such as, for example, a portable telephone set, a notebook type personal computer, a digital movie apparatus, an electronic book, an electronic dictionary, an electronic notebook or a portable game machine.

In the signal transmission apparatus of the embodiment described below, a carrier frequency in the millimeter waveband in which the wavelength ranges from one to 10 millimeter is used mainly. However, the signal transmission apparatus can be applied also in the case where not a carrier frequency in the millimeter waveband but a carrier frequency in a frequency band proximate to the millimeter waveband such as the sub millimeter waveband or the centimeter waveband is used.

In the case where a communication apparatus is configured, the following three cases are available including a case in which a communication apparatus only for the transmission side, that is, the first communication section, is involved, another case in which a communication apparatus only for the reception side, that is, the first communication section, is involved, and a further case in which communication apparatus for the transmission side and the reception side are involved. The transmission side and the reception side are coupled to each other by the radio signal transmission line such as, for example, a millimeter wave signal transmission line such that signal transmission is carried out in the millimeter waveband. A signal of a transmission object is transmitted after it is frequency-converted into a signal of the millimeter waveband suitable for broad-band transmission. However, in any case, the signal transmission apparatus is configured from a pair or sets of a first communication section and a reception section. In the case where multi-channel transmission by frequency division multiplexing is to be carried out, a plurality of sets or pairs of a first communication section and a reception section are provided.

Then, between the first communication section and the reception section disposed at a comparatively short distance, a signal of a transmission object is converted into a millimeter wave signal, and then the millimeter wave signal is transmitted through the millimeter wave signal transmission line. The "radio transmission" in the embodiment signifies that a signal of a transmission object is transmitted not by a general electric wiring line or simple wire line but by wireless transmission using a radio wave, in the example described, using a millimeter wave.

The "comparatively short distance" signifies that the distance is short in comparison with a distance between communication apparatus during outdoor use which are used in broadcasting or general wireless communication, and may be such a distance that the transmission range can be substantially specified as a closed space. The "closed space" signifies a space in a state in which the leak amount of a radio wave from the inside to the outside of the space is small and the amount of introduction or advancement of a radio wave from the outside into the inside of the space is small. Typically, the "closed space" is a state in which the space is entirely surrounded by a housing or casing having a shielding effect against a radio wave. For example, communication between boards in a housing of an electronic instrument, communication between chips on the same board or communication between a plurality of apparatus in a state in which the different apparatus are integrated with each other like a state in which one of the electronic instrument is placed on another one of the electronic instrument corresponds to communication in the "closed space." The "integrated" signifies a state in which two electronic instrument contact, when they are mounted on each other, with each other such that a hinge structure is configured at a connection portion between the electronic instruments.

In the following description, signal transmission within a housing of an electronic instrument is referred to as intra-apparatus signal transmission or intra-housing signal transmission, and signal transmission in a state in which a plurality of electronic instrument are mounted on and integrated with each other is referred to as inter-apparatus signal transmission. In the case of the intra-apparatus signal transmission, a signal transmission apparatus wherein the communication apparatus (communication section or transmission section) on the transmission side and the communication apparatus (communication section or reception section) on the reception side are accommodated in the same housing and a radio signal transmission line is formed between the communication sections, that is, between the transmission and reception sections, can make an electronic instrument itself. On the other hand, in the case of the inter-apparatus signal transmission, the signal transmission apparatus is constructed such that the communication apparatus (communication section or transmission section) on the transmission side and the communication apparatus (communication section or reception section) on the reception side are accommodated in housings of different electronic instruments and, when the two electronic instruments are disposed at positions determined in advance and integrated with each other, a radio signal transmission line is formed between the communication sections, that is, between the transmission and reception sections, in the two electronic instruments.

In each of the communication apparatus provided with the radio signal transmission line interposed therebetween, a transmission system and a reception system are paired and disposed in combination. Since each communication apparatus includes both of the transmission system and the reception system, bidirectional communication can be achieved. In the case where both of the transmission system and the reception system are provided in each of the communication apparatus, signal transmission between one and the other of the two communication apparatus may be any of one-way signal transmission and bidirectional signal transmission. For example, in the case where the first communication apparatus serves as the transmission side and the second communication apparatus serves as the reception side, the first communication section which exhibits the transmission function is disposed in the first communication section, and the reception section which exhibits the reception function is disposed in the second communication apparatus. Reversely, in the case where the second communication apparatus serves as the transmission side and the first communication apparatus serves as the reception side, the first communication section which exhibits the transmission function is disposed in the second communication section, and the reception section which exhibits the reception function is disposed in the first communication apparatus.

The first communication section includes a signal production section which produces a signal of a transmission object to produce an electric signal in the millimeter waveband, that is, a signal conversion section for converting an electric signal of a transmission object into an electric signal in the millimeter waveband, and a transmission side signal coupling section for coupling the electric signal in the millimeter waveband produced by the transmission side signal production section to the radio signal transmission line such as, for example, a millimeter wave signal transmission for transmitting a radio signal in the millimeter waveband. Preferably, the signal production section on the transmission side is integrated with a functioning section which produces a signal of a transmission object.

For example, the transmission side signal production section includes a modulation circuit, which modulate a signal of a transmission object, that is, a baseband signal. The transmission side signal production section frequency-converts the signal after modulated by the modulation circuit to produce an electric signal in the millimeter waveband. In principle, the signal of the transmission object may be converted directly into an electric signal in the millimeter waveband. The transmission side signal coupling section converts the electric signal in the millimeter waveband produced by the transmission side signal production section into a radio signal in the form of an electromagnetic wave or radio wave and supplies the radio signal to the millimeter wave signal transmission line as the radio signal transmission line.

The second communication section includes, in the reception section thereof, a reception side signal coupling section for receiving a radio signal in the millimeter waveband transmitted thereto through the millimeter wave signal transmission line as the radio signal transmission line and converting the radio signal into an electric signal, and further includes a reception side signal production section for carrying out signal processing for the electric signal or input signal received by the reception side signal coupling section and obtained by the conversion to produce or restore or else reproduce an ordinary electric signal, which is a signal of the transmission object and is a baseband signal. Preferably, the reception side signal production section has a demodulation circuit and frequency-converts the electric signal in the millimeter waveband to produce an output signal. Thereafter, the demodulation section demodulates the output signal to produce a signal of the transmission object. In principle, the electric signal in the millimeter waveband may be converted directly into a signal of the transmission object.

In particular, in order to establish a signal interface, a signal of a transmission object is transmitted as a radio signal by contactless or cable-free transmission but not by transmission through an electric wiring line. Preferably, as regards signal transmission, that is, as regards transmission of a video image signal for which high speed transmission or large amount information transmission is required, a high-speed clock, or the like, the signal is transmitted as a radio signal in the millimeter waveband or the like. In short, in the present embodiment, signal transmission usually carried out by an electric wiring line is carried out using a radio signal or radio wave. By using a radio signal in the millimeter waveband or the like to carry out signal transmission, signal transmission of a high rate of the order of gigabits per second (Gbps) can be implemented. Further, the range of the radio signal can be restricted readily, and also effects arising from this property can be achieved.

Here, the signal coupling sections may have any configuration only if they allow the first communication section and the reception section to transmit a radio signal, here a radio signal in the millimeter waveband, to be transmitted through the radio signal transmission line, for example, through a millimeter wave signal transmission line therebetween. For example, they may have an antenna structure, that is, an antenna coupling section, or may be of the type which can establish coupling without using an antenna structure. The radio signal transmission line such as the "millimeter wave signal transmission line which transmits a signal of a millimeter wave" may be the air, that is, a free space. Preferably, however, the radio signal transmission line has a structure which transmits a radio signal in the form of an electromagnetic wave or radio wave while confining the radio signal in the transmission line, that is, a radio signal confinement structure such as a millimeter wave confinement structure. By positively utilizing a radio signal confinement structure, layout of a radio signal transmission line can be arbitrarily determined finally, for example, like an electric wiring line. Such a radio signal confinement structure as just described is typically achieved by a waveguide although not limited to this. For example, a waveguide configured from a dielectric material which can transmit a radio signal, called dielectric transmission line or radio signal intra-dielectric transmission line, or a hollow waveguide which configures a transmission line and is configured such that a hollow shielding material for suppressing external radiation of a radio signal is provided in such a manner as to surround the transmission line, is used favorably. By providing the dielectric material or the shielding material with flexibility, free layout of the radio signal transmission line can be carried out in the cavity of the hinge structure. In the case where the radio signal transmission line is the air, that is, a free space, the signal coupling sections have an antenna structure, which allows signal transmission in the air over a short distance. On the other hand, in the case where the radio signal transmission line is configured from a dielectric material, although it is possible to use an antenna structure, this is not essential.

Comparison between Signal Transmission by an Electric Wire and Wireless Transmission Signal transmission which depends upon an electric wiring line has the following problems.

i) Although large amount and high speed transmission of transmission data is demanded, an electric wiring line has a limitation to the transmission speed and the transmission capacity.

ii) A technique of increasing the number of wiring lines to transmit signals in parallel to decrease the transmission speed per one signal line in order to cope with the problem of increase of the speed of transmission data is available. However, this technique gives rise to increase input and output terminals. As a result, complication of a printed board and cable wiring, increase in physical size of a connector section or an electric interface and so forth are demanded, resulting in complication in shape of them. Consequently, such problems as degradation of the reliability and increase of the cost arise.

iii) Together with drastic increase of the information amount of a video image, a computer image and so forth, the waveband of baseband signals is widened, which further actualizes the problem of EMC. For example, in the case where an electric wiring line is used, the wiring line acts as an antenna and causes interference of a signal corresponding to the tuning frequency of the antenna. Further, also reflection or resonance by mismatching in impedance of the wiring line makes a cause of unnecessary radiation. A countermeasure against such problems complicates the configuration of electronic instruments.

iv) If reflection is involved in addition to EMC, then also a transmission error by interference between symbols on the reception side or a transmission error by jumping in of disturbance makes a problem.

On the other hand, in the case where signal transmission is carried out wirelessly using, for example, the millimeter waveband without using an electric wiring line, since there is no necessity to pay particular attention to the wiring line shape or the connector position, there is little limitation to the layout. Since a wiring line and a terminal can be omitted for a signal whose transmission is changed to transmission by a millimeter wave, the problem of EMC is eliminated. Generally, since another functioning section which uses a frequency in the millimeter waveband does not exist in the communication apparatus, a countermeasure against EMC can be implemented readily. Since radio transmission is carried out in a state in which the communication apparatus on the transmission side and the communication apparatus on the reception side are positioned in the proximity of each other and is carried out between fixed positions or in a known positional relationship, the following advantages can be achieved.

1) It is easy to appropriately design a propagation channel or waveguide structure between the transmission side and the reception side.

2) If a dielectric structure of the transmission line coupling sections which seal the transmission side and the reception side and a propagation channel, that is, a waveguide structure of a millimeter wave signal transmission line, are designed together, then more reliable and better transmission than free space transmission can be achieved.

3) Since control of a controller for managing wireless transmission need not be carried out adaptively or frequently as in the case of general wireless communication, the overhead by control can be reduced in comparison with general wireless communication. As a result, set values or parameters to be used in a control circuit, an arithmetic operation circuit and so forth can be made constants, that is, fixed values, and consequently, miniaturization, low power consumption and high speed transmission can be anticipated. For example, if a wireless transmission characteristic is calibrated and a dispersion and so forth of individual products are grasped upon fabrication or upon designing, then since the data can be referred to, set values which define operation of the signal processing section can be used for preset or static control. Since such set values generally appropriately define operation of the signal processing section, high quality communication can be achieved while the configuration is simple and easy and the power consumption is low.

Further, use of wireless communication in the millimeter waveband wherein the wavelength is short can achieve the following advantages.

a) Since millimeter wave communication can use a wide communication band, a high data rate can be achieved readily.

b) The frequency to be used for transmission can be spaced from any other frequency for baseband signal processing, and interference between a millimeter wave and a wave of a frequency of a baseband signal is less likely to occur.

c) Since the wavelength of the millimeter waveband is short, antennas which is defined according to the wavelength and a waveguide structure can be miniaturized. In addition, due to its large distance attenuation, less diffraction occurs; therefore, electromagnetic shielding can be applied readily.

d) In ordinary outdoor wireless communication, severe regulations are applied to the stability of a carrier in order to prevent interference and so forth. In order to implement a carrier having such stability, an external frequency reference part of high stability and a multiplication circuit, a PLL (phase-locked loop circuit) and so forth are used, which increases the circuit scale. However, a millimeter wave can be shielded readily and prevented from leaking to the outside particularly when it is used together with signal transmission between fixed positions or in a known positional relationship. In order to demodulate a signal transmitted with a carrier of moderated stability using a small circuit on the reception side, it is preferable to adopt an injection locking method.

For example, as a technique for implementing high speed signal transmission between electronic instrument disposed at a comparatively short distance such as, a distance within ten and several centimeters or within an electric apparatus, for example, LVDS (Low Voltage differential Signaling) is known. However, together with recent further increase in amount and speed of transmission data, increase in power consumption, increase in influence of signal distortion by reflection and so forth, increase of unnecessary radiations (problem of EMI) and so forth become problems. The LVDS is reaching its limit in the case where a video signal including a picked up image signal or a signal of a computer image or the like is transmitted at a high speed or on the real time basis within an apparatus or between different apparatus.

In order to cope with high speed transmission of data, the wiring line number may be increased to reduce the transmission speed per one signal line through parallelization of signals. However, this countermeasure gives rise to increase of input and output terminals. As a result, complication of a printed board and a cable wiring line, increase of the semiconductor chip size and so forth are demanded. Further, transmission of high speed and large amount data through a wiring line gives rise to a problem of electromagnetic interference.

The problems involved in the LVDS or the technique of increasing the wiring line number arise from transmission of a signal by an electric wiring line. Therefore, as a technique for solving the problems arising from transmission of a signal by an electric wiring line, a technique of eliminating an electric wiring line to transmit a signal, particularly a technique of carrying out signal transmission using a radio wave, may be adopted. As a technique of carrying out signal transmission using a radio wave, for example, signal transmission in a housing, may be carried out by radio while a UWB (Ultra Wide Band) communication method is applied (hereinafter referred to as first technique) or a carrier frequency in the millimeter waveband in which the wavelength is short and ranges from one to 10 millimeter may be adopted (hereinafter referred to as second technique). However, the UWB communication method of the first technique uses a low frequency and therefore is not suitable for such high speed communication as in the case of transmission of, for example, a video image. Further, the UWB communication method of the first technique has a problem in terms of the size in that a large antenna is used. Further, since a frequency used for transmission is proximate to a frequency used in other baseband signal processing, the UWB communication method of the first technique has a problem also in that interference is likely to occur between the radio signal and a baseband signal. Further, in the case where the carrier frequency is low, it is likely to be influenced by driving system noise in the apparatus, and a countermeasure is required. In contrast, if a carrier frequency in the millimeter waveband wherein the wavelength is shorter is used as in the case of the second technique, the problems of the antenna size and noise can be solved.

While the foregoing description is given in connection with the case in which the millimeter waveband is used for wireless communication, the application range is not limited to the communication in the millimeter waveband. Communication in a frequency band lower than the millimeter waveband such as a centimeter waveband or a frequency band conversely exceeding the millimeter waveband such as a sub millimeter waveband may be applied. However, in intra-housing transmission or inter-apparatus signal transmission, it is effective to principally use the millimeter waveband wherein the waveband is not excessively long nor excessively short.

In the following, a signal transmission apparatus, a hinge structure and an electronic instrument of working examples are described particularly. As the most preferable example, an example wherein many functioning sections are formed in a semiconductor integrated circuit such as a chip like, for example, a CMOS IC is described. However, this is not essential.

Communication Processing System

First Example

Figures 1, 5B:
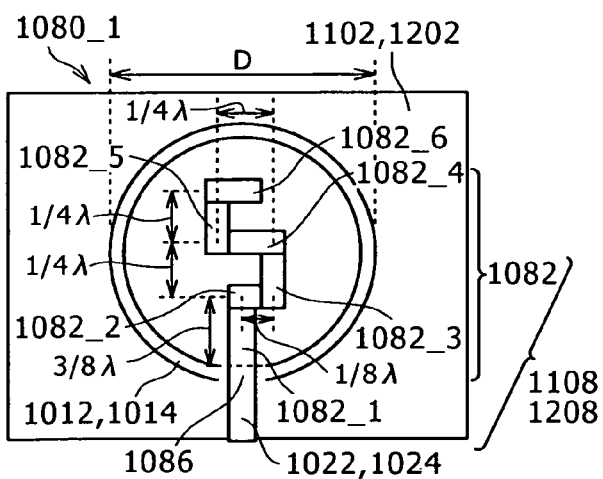
FIG. 1 is a block diagram showing a first example of a signal transmission apparatus.

FIG. 1 shows a signal transmission apparatus of a first example and particularly shows a signal interface of the signal transmission apparatus of the first example from a phase of a functional configuration.

Functional Configuration

Referring to FIG. 1, the signal transmission apparatus 1A of the first example is configured such that a first communication apparatus 100A which is an example of a first radio apparatus and a second communication apparatus 200A which is a second radio apparatus are coupled to each other by a radio signal transmission line 9 such that signal transmission is carried out utilizing a radio signal principally in the millimeter waveband. In FIG. 1, a transmission system is shown provided in the first communication apparatus 100A while a reception system is shown provided in the second communication apparatus 200A.

A semiconductor chip 103 ready for millimeter waveband transmission is provided in the first communication apparatus 100A, and a semiconductor chip 203 ready for millimeter waveband reception is provided in the second communication apparatus 200A. In the present embodiment, a signal which is made a transmission object in the millimeter waveband is only a signal for which high speed transmission or large amount transmission is required. Thus, a signal which may be transmitted at a low speed or by a small amount or a signal which can be regarded as DC current like power supply is not made an object of conversion into a millimeter wave signal. For those signals which are not made an object of conversion into a millimeter wave signal including power supply, an electric wiring line such as a flexible printed board (FPC) or a cable is used. Or connection of a signal between circuit boards is established by a technique similar to that in the past such as to use mechanical connection such as a slip ring. Original electric signals of an object of transmission before conversion into a millimeter wave signal are collectively referred to as baseband signals. In addition to those signals for which high speed transmission or large amount transmission is preferable, also other signals which may be transmitted at a low speed or by a small amount may be transmitted by a millimeter wave.

First Communication Apparatus

The first communication apparatus 100A includes a semiconductor chip 103 and a transmission line coupling section 108 ready for millimeter wave transmission and mounted on a board 102. The semiconductor chip 103 is an LSI (Large Scale Integrated Circuit) in which an LSI functioning section 104 and a signal production section 107, which is a millimeter wave signal production section, are integrated.

The semiconductor chip 103 is connected to the transmission line coupling section 108. The transmission line coupling section 108 is an example of a transmission section which converts an electric signal into a radio signal and transmits the radio signal to the radio signal transmission line 9. For example, an antenna structure which includes an antenna coupling section, an antenna terminal, a microstrip line, an antenna and so forth is applied as the semiconductor chip 103. The coupling point between the transmission line coupling section 108 and the radio signal transmission line 9 is a transmission point.

The LSI functioning section 104 takes charge of principal application control of the first communication apparatus 100A and includes, for example, a circuit for processing various signals to be transmitted to the opposite party.

The signal production section 107 which serves as an electric signal conversion section includes a transmission side signal production section 110 for converting a signal from the LSI functioning section 104 into a millimeter wave signal and carrying out signal transmission control through the radio signal transmission line 9. The transmission side signal production section 110 and the transmission line coupling section 108 configure a transmission system which serves as a transmission section or a transmission side communication section.

The transmission side signal production section 110 carries out signal processing of an input signal to produce a signal of a millimeter wave and includes, to this end, a multiplexing processing section 113, a parallel to serial conversion section 114, a modulation section 115, a frequency conversion section 116 and an amplification section 117. The amplification section 117 is an example of an amplitude adjustment section which adjusts the magnitude of an input signal and outputs a resulting signal. The modulation section 115 and the frequency conversion section 116 may be combined to form a section of a direct conversion type.

The multiplexing processing section 113 carries out, in the case where a signal from the LSI functioning section 104 includes a plurality of, or N1, types of signals which make an object of communication in the millimeter waveband, a multiplexing process such as time division multiplexing, frequency division multiplexing or code division multiplexing is carried out to multiplex the plural signals into a signal of one system. For example, a plurality of types of signals for which high speed transmission or large amount transmission is desired are combined into a signal of one system as an object of transmission by a millimeter wave.

The parallel to serial conversion section 114 converts parallel signals into a serial data signal and supplies the serial data signal to the modulation section 115. The modulation section 115 modulates a transmission object signal and supplies the modulated signal to the frequency conversion section 116. In the case where the present working example is not applied, the parallel to serial conversion section 114 is provided in the case of parallel interface specifications in which a plurality of signals for parallel transmission are used, but need not be provided in the case of serial interface specifications.

The modulation section 115 may be basically of any type only if it modulates a transmission object signal in at least one of the amplitude, frequency and phase or in an arbitrary combination of them. For example, in the case of an analog modulation method, for example, amplitude modulation (AM) and vector modulation are applicable. As the vector modulation, frequency modulation (FM) and phase modulation (PM) are available. In the case of a digital modulation method, for example, amplitude shift keying (ASK), frequency shift keying (FSK), phase shift keying (PSK) and amplitude phase shift keying (APSK) which modulates the amplitude and phase are available. As the amplitude shift keying, quadrature amplitude modulation (QAM) is representative.

The frequency conversion section 116 frequency-converts a transmission object signal after modulation by the modulation section 115 to produce an electric signal of a millimeter wave and supplies the electric signal to the amplification section 117. The electric signal of a millimeter wave signifies an electric signal of a certain frequency within a range of approximately 30 to 300 gigahertz. The term "approximately" here is used based on the fact that the frequency may be any frequency with which an effect by millimeter wave communication is achieved, and the lower limit to the frequency is not limited to 30 gigahertz and the upper limit to the frequency is not limited to 300 gigahertz.

Although the frequency conversion section 116 can be configured in various circuit configurations, for example, a configuration which includes a frequency mixing circuit or mixer circuit and a local oscillation circuit may be adopted. The local oscillation circuit generates a carrier, that is, a carrier signal or reference carrier, to be used for modulation. The frequency mixing circuit multiplies or modulates a signal from the parallel to serial conversion section 114 with a carrier in the millimeter waveband generated by the local oscillation circuit to generate a transmission signal of a millimeter wave and supplies the transmission signal to the amplification section 117.

The amplification section 117 amplifies an electric signal of a millimeter wave after the frequency conversion and supplies the amplified electric signal to the transmission line coupling section 108. The transmission line coupling section 108, which is a bidirectional coupling section, is connected to the amplification section 117 through an antenna terminal not shown.

The transmission line coupling section 108 transmits a signal of a millimeter wave generated by the transmission side signal production section 110 to the radio signal transmission line 9. The transmission line coupling section 108 is configured from an antenna coupling section. The antenna coupling section configures an example of the transmission line coupling section 108, which is a signal coupling section, or part of the transmission line coupling section 108. The antenna coupling section signifies, in a narrow sense, a section which couples an electronic circuit in a semiconductor chip and an antenna disposed in or outside the chip to each other, and signifies, in a wide sense, a section which couples a semiconductor chip and a radio signal transmission line such as the radio signal transmission line 9 to each other. For example, the antenna coupling section includes at least an antenna structure. The antenna structure signifies a structure of the coupling section to the radio signal transmission line 9 and may be any structure which converts an electric signal in the millimeter waveband into an electromagnetic or radio wave and couples the electromagnetic wave to the radio signal transmission line 9, but does not signify a structure of an antenna itself.

The radio signal transmission line 9 may be configured as a free space transmission line such that, for example, a radio signal is propagated in a space of a housing. Or preferably, the radio signal transmission line 9 is configured from a waveguide structure such as a waveguide, a transmission line, a dielectric line or the inside of a dielectric such that an electromagnetic wave in the millimeter waveband is entrapped in the transmission line so that the radio signal transmission line 9 has a characteristic of transmitting an electromagnetic wave efficiently. For example, the radio signal transmission line 9 may be formed as a dielectric transmission line 9A configured such that it includes a dielectric material having a specific inductive capacity within a fixed range and a dielectric dissipation factor. For example, by filling a dielectric material in an entire housing, not a free space transmission line but the dielectric transmission line 9A is disposed between the transmission line coupling section 108 and a transmission line coupling section 208. Or, the antenna of the transmission line coupling section 108 and the antenna of the transmission line coupling section 208 may be connected to each other by a dielectric line in the form of a wire-like material configured from a dielectric material and having a certain wire diameter to configure the dielectric transmission line 9A. As the radio signal transmission line 9 of the configuration which entraps a millimeter wave signal in the transmission line, not the dielectric transmission line 9A but a hollow waveguide whose transmission line is surrounded by a shielding material and is hollow may be used.

Second Communication Apparatus

The second communication apparatus 200A includes a semiconductor chip 203 and a transmission line coupling section 208 ready for millimeter waveband reception and mounted on a board 202. The semiconductor chip 203 is an LSI wherein an LSI functioning section 204 and a signal production section 207, which is a millimeter wave signal production, are integrated. Though not shown, the second communication apparatus 200A may be configured otherwise such that the LSI functioning section 204 and the signal production section 207 are not integrated similarly to the first communication apparatus 100A.

The semiconductor chip 203 is connected to a transmission line coupling section 208 similar to the transmission line coupling section 108. The transmission line coupling section 208 is an example of a reception section for converting a radio signal received through the radio signal transmission line 9 into an electric signal and is configured from an element similar to the transmission line coupling section 108. The transmission line coupling section 208 receives a radio signal in the millimeter waveband from the radio signal transmission line 9, converts the radio signal into an electric signal and outputs the electric signal to a reception side signal production section 220. The coupling point between the transmission line coupling section 208 and the radio signal transmission line 9 is a reception point.

The signal production section 207 which serves as an electric signal conversion section includes a reception side signal production section 220 for carrying out signal reception control through the radio signal transmission line 9. The reception side signal production section 220 and the transmission line coupling section 208 configure a reception system or reception section, that is, a communication section on the reception side.

The reception side signal production section 220 carries out signal processing of an electric signal of a millimeter wave received by the transmission line coupling section 208 to produce an output signal. To this end, the reception side signal production section 220 includes an amplification section 224, a frequency conversion section 225, a demodulation section 226, a serial to parallel conversion section 227, and a unification processing section 228. The amplification section 224 is an example of an amplitude adjustment section which adjusts the magnitude of an input signal and outputs a resulting signal. The frequency conversion section 225 and the demodulation section 226 may be combined to form a section of a direct conversion type.

The reception side signal production section 220 is connected to the transmission line coupling section 208. The amplification section 224 on the reception side is connected to the transmission line coupling section 208, and amplifies an electric signal of a millimeter wave after received by an antenna and supplies a resulting signal to the frequency conversion section 225. The frequency conversion section 225 frequency converts the electric signal of a millimeter wave after amplified and supplies the signal after the frequency conversion to the demodulation section 226. The demodulation section 226 demodulates the signal after the frequency conversion to acquire a signal of the baseband and supplies the acquired signal to the serial to parallel conversion section 227.

The serial to parallel conversion section 227 converts serial reception data into parallel output data and supplies the parallel output data to the unification processing section 228. The serial to parallel conversion section 227 is provided, similarly to the parallel to serial conversion section 114, in the case that the present example is not applied and in the case of parallel interface specifications in which a plurality of signals for parallel transmission are used. In the case where the original signal transmission between the first communication apparatus 100A and the second communication apparatus 200A is of the parallel type, the parallel to serial conversion section 114 and the serial to parallel conversion section 227 may not be provided.

In the case where the original signal transmission between the first communication apparatus 100A and the second communication apparatus 200A is parallel transmission, the number of signals of a millimeter wave conversion object is reduced by transmitting the input signals after parallel to serial conversion to the semiconductor chip 203 and carrying out serial to parallel conversion of the reception signal from the semiconductor chip 203 side.

The unification processing section 228 corresponds to the multiplexing processing section 113 and separates a signal of a single system into a plurality of signals _@ where @ is 1 to N. For example, a plurality of data signals combined into a signal of a single system are separated from each other and supplied to the LSI functioning section 204. The LSI functioning section 204 takes charge of principal application control of the second communication apparatus 200A and includes a circuit for processing, for example, various signals received from the opposite party.

In the case where a hinge structure 1001 hereinafter described is circulated as a module which includes the hinge structure 1001 without incorporating the hinge structure 1001 in an electronic instrument, for example in FIG. 1, as regards the first communication apparatus 100A, a connection IF (interface) section 109 may be provided between the LSI functioning section 104 and the signal production section 107 while the board 102 is divided into two portions at the location of the connection IF section 109 (refer to broken lines in FIG. 1) and the board on the LSI functioning section 104 side and the board of the signal production section 107 and the transmission line coupling section 108 side are connected to each other by the connection IF section 209. Also on a movable section 1004 side, the LSI functioning section 204 may be separated from the signal production section 207 and the transmission line coupling section 208 side. In particular, as regards the second communication apparatus 200, the connection IF section 209 may be provided between the LSI functioning section 204 and the signal production section 207 while the board 202 is divided into two substrates (refer to broken lines in FIG. 1) at the location of the connection IF section 209 while the circuit board of the LSI functioning section 204 side and the board of the signal production section 207 and the transmission line coupling section 208 side are connected to each other by the connection IF section 209. The connection IF section 109 or the connection IF section 209 may be, for example, a wire harness.

Though not shown, the first communication apparatus 100A or the second communication apparatus 200A in the present working example may include a set value processing section for inputting a set value for signal processing determined in advance to functioning sections, particularly to those which function as signal processing sections, which configure the first communication apparatus 100A or the second communication apparatus 200A. The set value processing section is configured such that it includes, for example, a set value determination section, a set value storage section and an operation controlling section. The set value determination section determines a set value such as a variable or a parameter for designating operation of a functioning section of the semiconductor chip 103 or the semiconductor chip 203, that is, general operation of the first communication apparatus 100A or the second communication apparatus 200A. The process for determining a set value is carried out, for example, upon shipment of the product from the factory. The set value storage section stores set values determined by the set value determination section. The operation controlling section controls the functioning sections of the semiconductor chip 103 such as the modulation section 115, frequency conversion section 116 and amplification section 117 or the functioning sections semiconductor chip 203 such as the amplification section 224, frequency conversion section 225 and demodulation section 226 to operate based on the set values read out from the set value storage section.

The set value processing section may be provided on the board 102 on which the semiconductor chip 103 is mounted or on the board 202 on which the semiconductor chip 203 is mounted or else may be provided on a board different from the board 102 and the board 202. Further, although the set value processing section may be provided outside the semiconductor chip 103 or the semiconductor chip 203, it may otherwise be built in the semiconductor chip 103 or the semiconductor chip 203. In this instance, the set value processing section is mounted on a board same as the board 102 or the board 202 on which the functioning sections which make an object of control, particularly the modulation section 115, frequency conversion section 116, amplification section 117 of the semiconductor chip 103 or the amplification section 224, frequency conversion section 225 and demodulation section 226 of the semiconductor chip 203, are mounted.

Establishment of Compatibility with Bidirectional Communication

The signal production section 107 and the transmission line coupling section 108 or the signal production section 207 and transmission line coupling section 208 can be made compatible with bidirectional communication by configuring them such that they have bidirectionality of data. For example, the signal production section 107 and the signal production section 207 include a reception side signal production section and a transmission side signal production section, respectively. Although the transmission line coupling section 108 and the transmission line coupling section 208 may be provided separately on the transmission side and the reception side, they may be used commonly for transmission and reception.

The "bidirectional communication" here is single core bidirectional transmission wherein one system (one core) of a millimeter wave transmission channel, that is, the radio signal transmission line 9, is used. For the implementation of the single core bidirectional communication, any of half-duplex methods which apply time division duplexing (TDD), a frequency division duplexing (FDD) and so forth can be adopted.

Connection and Operation

The technique of frequency converting an input signal and transmitting a resulting signal is used generally in broadcasting and radio communication. In such applications, a transmitter, a receiver and so on of a comparatively complicated configuration are used which can overcome such problems as within what range communication is possible (problem of the S/N radio in regard to thermal noise), how to cope with reflection or multi-paths, and how to prevent disturbance or interference with a different channel.

On the other hand, the signal production section 107 and the signal production section 207 used in the present embodiment principally use a millimeter waveband which is higher than a frequency band of a frequency used in complicated transmitters, receivers and so forth used popularly in broadcasting and radio frequency. Therefore, since the wavelength λ is short, a frequency which can be re-utilized readily and is suitable for communication among various devices disposed in the proximity of one another is used.

In the present embodiment, different from a signal interface in the past which uses an electric wiring line system, it is possible to be flexibly ready for high speed transmission and large amount transmission by carrying out signal transmission in the millimeter waveband as described above. For example, only a signal for which high speed transmission and large amount transmission are desired is made an object of communication. Depending upon an apparatus configuration, for a signal of low speed or small amount transmission or for power supply, the first communication apparatus 100A and the second communication apparatus 200A partly include an interface by an electric wiring system used in the past, that is, a connection by a terminal or connector.

The signal production section 107 is an example of a signal processing section which carries out signal processing determined in advance and carries out, in the present example, signal processing of an input signal inputted thereto from the LSI functioning section 104 to produce a signal of a millimeter wave. The signal production section 107 is connected to the transmission line coupling section 108 by a transmission line such as, for example, a microstrip line, a strip line, a coplanar line or a slot line. Thus, a signal of a millimeter wave produced by the signal production section 107 is supplied in the form of an electromagnetic wave, that is, a radio wave or radio signal, to the radio signal transmission line 9 through the transmission line coupling section 108.

The transmission line coupling section 108 has an antenna structure and has a function of converting an electric signal of a millimeter wave transmitted thereto and signaling the electromagnetic wave. The transmission line coupling section 108 is coupled to the radio signal transmission line 9 such that the electromagnetic wave obtained by the conversion by the transmission line coupling section 108 is supplied to one of the opposite ends of the radio signal transmission line 9. To the other end of the radio signal transmission line 9, the transmission line coupling section 208 of the second communication apparatus 200A side is coupled. By providing the radio signal transmission line 9 between the transmission line coupling section 108 of the first communication apparatus 100A side and the transmission line coupling section 208 of the second communication apparatus 200A side, an electromagnetic wave principally in the millimeter waveband is propagated to the radio signal transmission line 9.

The transmission line coupling section 208 of the second communication apparatus 200A side is coupled to the radio signal transmission line 9. The transmission line coupling section 208 receives the electromagnetic wave transmitted to the other end of the radio signal transmission line 9, converts the electromagnetic wave into a signal of a millimeter wave and supplies the signal to the signal production section 207 which serves as a baseband signal production section. The signal production section 207 is an example of a signal processing section which carries out signal processing determined in advance. In the present example, the signal production section 207 carries out signal processing of a signal of a millimeter wave obtained by the conversion to produce an output signal in the form of a baseband signal and supplies the output signal to the LSI functioning section 204.

While the foregoing description is given in regard to signal transmission from the first communication apparatus 100A to the second communication apparatus 200A, if the first communication apparatus 100A and the second communication apparatus 200A are configured so as to be ready for bidirectional communication, then a signal can be transmitted similarly from the LSI functioning section 204 of the second communication apparatus 200A to the first communication apparatus 100A. Consequently, a signal of a millimeter wave can be transmitted bidirectionally.

Communication Processing System

Second Example

Figures 5, 5B:
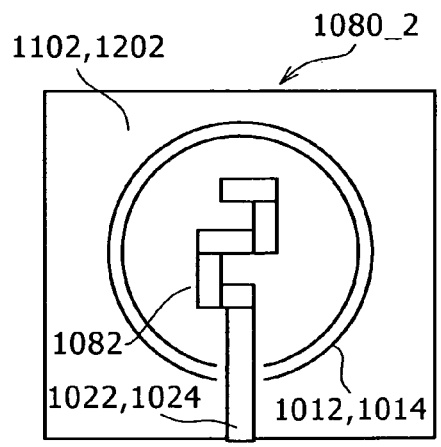
Figures 2, 5B:
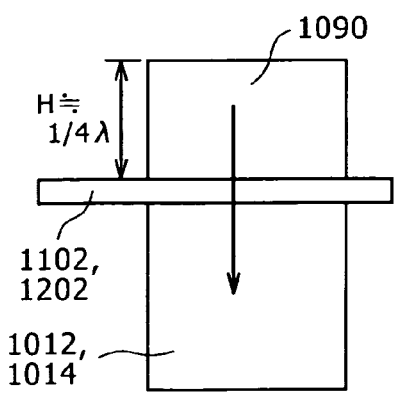
FIG. 2 is a block diagram showing a second example of a signal transmission apparatus.

FIG. 2 shows a signal transmission apparatus of a second example and particularly shows a signal interface of the signal transmission apparatus of the second example from an aspect of the functional configuration.

In the signal transmission apparatus 1B of the second example, also power supply which requires power transmission is transmitted by wireless transmission on the basis of the signal transmission apparatus 1A of the first example, with regard to which the connection IF section 109 and the connection IF section 209 are not shown in FIG. 2. In other words, the signal transmission apparatus 1B additionally has a configuration for supplying power to be used by the second communication apparatus 200B side from the first communication apparatus 100B by wireless transmission.

The first communication apparatus 100B includes a power supplying section 174 which is an example of a power transmission terminal apparatus which supplies power to be used by the second communication apparatus 200B by wireless transmission. The configuration of the power supplying section 174 is hereinafter described. The second communication apparatus 200B includes a power reception section 278 which is an example of a power reception terminal apparatus which receives power transmitted thereto by wireless transmission from the first communication apparatus 100B side. The power supplying section 174 on the power transmission side and the power reception section 278 on the power reception side are collectively referred to as power circuits, and a power transmission section or contactless power transmission apparatus which transmits power by wireless transmission between the first communication apparatus 100 and the second communication apparatus 200 is configured from the power supplying section 174 and the power reception section 278. Although the configuration of the power reception section 278 is hereinafter described, whatever configuration is applied, the power reception section 278 produces a power supply voltage to be used by the second communication apparatus 200B side and supplies the power supply voltage to the semiconductor chip 203 and so forth. Since, in terms of the functional configuration, the second example is different from the first example only in that also power is transmitted by wireless transmission, description of the other part of the configuration is omitted herein to avoid redundancy.

Various methods for transmitting power contactlessly from a power supplying apparatus or power transmission terminal apparatus to a power reception apparatus or power reception terminal apparatus have been proposed. The method of transmitting power contactlessly is called "contactless power supply," "wireless power supply," "wireless power transmission" or the like. As a principle of contactless power transmission, electromagnetic energy is utilized, and roughly speaking, a radiation type, that is, a radio wave reception type, and a non-radiation type are available. The radiation type includes a microwave type and a laser type, and the non-radiation type includes an electromagnetic induction type and a resonance type also called electromagnetic resonance type. If one of the types is used, then an interface through an electric wiring line or a terminal can be eliminated sufficiently, and a cable-free apparatus configuration can be achieved. Thus, all signals including power supply can be transmitted from the first communication apparatus 100B to the second communication apparatus 200B by wireless transmission.

The radio wave reception type utilizes energy of a radio wave and converts an AC waveform obtained by reception of a radio wave into a DC voltage by means of a rectification circuit. The radio wave reception type is advantageous in that it can transmit power irrespective of the frequency band and, for example, a millimeter wave may be used. Though not shown, the power supplying section on the transmission side which supplies power by wireless transmission includes a transmission circuit for transmitting a radio wave in a certain frequency band. The power reception section on the reception side which receives power from the power supplying section transmitted by wireless transmission includes a rectification circuit for rectifying a received radio wave. Although depending upon the transmission power, the reception voltage is low, and as a rectification diode to be used in the reception circuit, it is preferable to use a rectification diode whose forward voltage is as low as possible such as, for example, a Schottky diode. A resonance circuit may be configured on the stage preceding to the rectification circuit such that the voltage is rectified after it is increased. In the radio wave reception type in general outdoor use, much of the transmission power is diffused as a radio wave, and therefore, the power transmission efficiency is low. However, it is considered possible to eliminate the problem just described by the combination of a configuration which can limit the transmission range such as, for example, a millimeter wave transmission line of an entrapment configuration.

The electromagnetic induction type utilizes electromagnetic coupling and induced electromotive force of a coil. Though not shown in the drawings, a primary coil is provided on a power supplying section, that is, on the power transmission side or primary side, for supplying power wirelessly, and is driven with a comparatively high frequency. In the power reception section, that is, in the power reception side or secondary side for receiving power wirelessly from the power supplying section, a secondary coil is provided at a position opposing to the primary coil, and a rectification diode, a capacitor for resonance and smoothing and so forth are provided. For example, a rectification circuit is configured from the rectification diode and the smoothing capacitor. If the primary coil is driven with a high frequency, then induced electromotive force is generated in the secondary coil electromagnetically coupled to the primary coil. Based on the induced electromotive force, a DC voltage is generated by the rectification circuit. Thereupon, a resonance effect is utilized to raise the power reception efficiency. In the case where the electromagnetic induction type is adopted, the power supplying section and the power reception section are positioned in the proximity of each other such that any other member, particularly of a metal, may not be placed between the power supplying section and the power reception section, particularly between the primary coil and the secondary coil and besides electromagnetic shielding may be applied to the coils. The former is for preventing the metal from being heated by the principle of electromagnetic induction heating, and the latter is for taking a countermeasure against electromagnetic interference with any other electronic circuit. Although the electromagnetic induction type can transmit high power, it is recommendable to dispose the transmission and reception elements in the proximity of each other such as, for example, at a distance smaller than 1 cm.

The resonance type is a system wherein power is transmitted by coupling by resonance of an electric field or a magnetic field between a resonator or resonance element provided in the power supplying apparatus for supplying power and a power reception apparatus for receiving power supplied from the power supplying apparatus. In other words, the resonance type applies a principle same as that of a phenomenon that two oscillators such as pendulums or a tuning fork resonates and utilizes a resonance phenomenon in a near field of one of an electric field and a magnetic field without using an electromagnetic wave. More particularly, a phenomenon that, in the case where one of two oscillators having the same natural frequency, which corresponds to the power supplying section, is oscillated, although only small oscillations are transmitted to the other oscillator which corresponds to the power reception section, the latter oscillator begins to oscillate by a great amount by a resonance phenomenon. The method which utilizes resonance of an electric field is hereinafter referred to as electric field resonance type, and the method which utilizes resonance of a magnetic field is hereinafter referred to as magnetic field resonance type. It is to be noted that attention is paid recently to the "resonance type" which utilizes resonance of an electric field or a magnetic field which is used in the aspect of the efficiency, transmission distance, positional displacement, angular displacement and so forth. Particularly, attention is paid to a method called magnetic field resonance type or magnetic resonance type which utilizes resonance of a magnetic field which is influenced less by energy absorption by a living organism body, that is, which suffers from less loss by a dielectric.

Though not shown, in the case of a type wherein a resonance phenomenon in an electric field is utilized, a dielectric member is disposed on both of the power supplying section or power supplying side for supplying power by radio and the power reception section or power reception side for receiving power by radio from the power supplying section such that a resonance phenomenon may occur between the two dielectric members. It is important to use, for an antenna, a dielectric which has a dielectric constant of several tens to 100 or more, which is much higher than an ordinary dielectric constant and which exhibits dielectric loss as low as possible and to cause the antenna to excite a particular oscillation mode. For example, in the case where a disk antenna is used, the coupling is highest when the oscillation mode around the disk is m=2 or 3.

In the present embodiment, while, as a method for implementing power transmission by wireless transmission, any of, for example, the radio wave reception type, the electromagnetic induction type and the resonance type can be adopted, FIG. 2 shows a configuration which adopts the resonance type by a magnetic field. Also it is basically possible to adopt any of the electromagnetic induction type, radio wave reception type and resonance type, in the signal transmission apparatus 1 of the second example, the resonance type which utilizes a resonance phenomenon of a magnetic field is adopted as seen in FIG. 2 taking the characteristic of the types described above into consideration. For example, the power supplying efficiency of the electromagnetic induction type exhibits its maximum in the case where the center axis of the primary coil and the center axis of the secondary coil are aligned with each other, and if the center axes are displaced or misaligned with each other, then the efficiency drops. In other words, the accuracy in alignment between the primary coil and the secondary coil has a significant influence on the power transmission efficiency. Although depending upon the type of the electronic instrument, in the case where the electronic instrument is of a form wherein the relative position between the power transmission side and the power reception is variable, it is not preferable to adopt the electromagnetic induction type. In the case of the radio wave reception type or the resonance type by an electric field, EMI or interference is taken into consideration. In contrast, the resonance type by a magnetic field is free from the problems.

As seen in FIG. 2, in the case of the type which utilizes a resonance phenomenon in a magnetic field, an LC resonator is disposed in both of the power supplying section 174 of the power supplying side which supplies power by wireless transmission and the power reception section 278 of the power reception side which receives power by wireless transmission from the power supplying section 174 such that a resonance phenomenon of a magnetic field occurs between the LC resonators. For example, part of an antenna of the loop type is shaped like a capacitor such that it cooperates with the inductance of the loop itself to form an LC resonator. It is possible to obtain a high Q value representing a degree of resonance, and the rate by which the power is absorbed by any other than the antenna for resonance is low. Therefore, although the type described is similar to the electromagnetic induction type in that a magnetic field is utilized, it is quite different from the electromagnetic induction type in that transmission of several kW is possible in a state in which the power supplying section 174 and the power reception section 278 are spaced away from each other by a distance greater than that in the case of the electromagnetic induction type.

<Hinge Structure: Basic Configuration>

Figures 3, 5B:
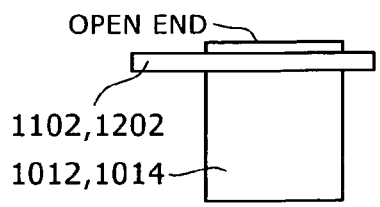
Figures 4, 5B:
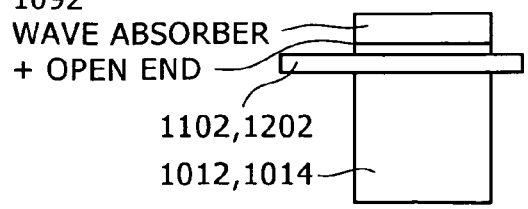
FIG. 4 is a table illustrating combinations of components of the hinge structure of the embodiment.

FIGS. 3A to 3D and 4 illustrate a basic configuration of a hinge structure to which the signal transmission apparatus 1 of the present embodiment is applied. In particular, FIGS. 3A to 3D show a basic configuration of the hinge structure 1001 of the present embodiment, that is, the structure of the signal transmission apparatus 1. FIG. 4 illustrates combinations of components of the hinge structure 1001 of the present embodiment.

Appearance

Figures 1, 8A:
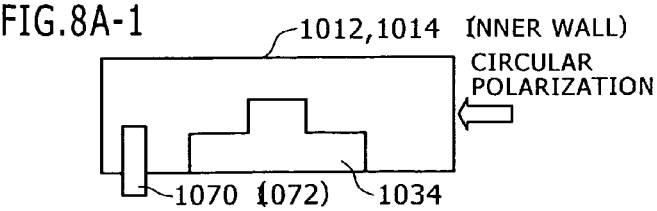
Figures 2, 8A:
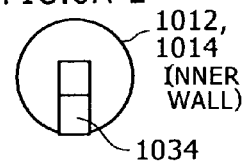
Figures 3A, 8A:
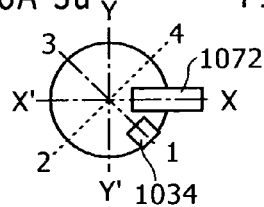
Figures 3B, 8A:
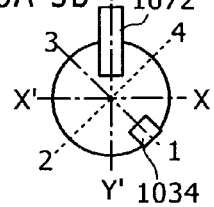

Referring first to an overall view of FIG. 3A and a sectional view of FIG. 3B, the hinge structure 1001 to which the signal transmission apparatus 1 of the present embodiment is applied includes a fixed section 1002, a movable section 1004 which functions as a rotatable section, and a tubular waveguide 1012 and a tubular waveguide 1014 disposed between the fixed section 1002 and the movable section 1004 and cooperatively configuring a transmission line or waveguide along which a radio wave propagates. The waveguide 1012 is an example of a first cavity section, and the tubular waveguide 1014 is an example of a second cavity section. The waveguide 1012 and the waveguide 1014 are integrated with each other to form one waveguide and used as a waveguide section. In the example shown, the waveguide 1012 on the fixed section 1002 side has a length set greater than that of the waveguide 1014 on the movable section 1004 side.

The fixed section 1002 and the movable section 1004 may have any structure only if the movable section 1004 is rotatable relative to the fixed section 1002 but do not signify that the fixed section 1002 has an absolutely fixed position. Or, the fixed section 1002 may be rotatable while the movable section 1004 is rotatable relative to the fixed section 1002 which rotates. There is no necessity for the communication sections of both of the fixed section 1002 and the movable section 1004 to have a relative rotatable configuration, but the point is that only it is necessary for the fixed section 1002 and the movable section 1004 to be relatively rotatable in the proximity of the transmission line coupling portions for transmission and reception of the communication sections thereof. Various techniques are known as regards how to establish a connection between a rotating portion and a non-rotating portion, and any of the techniques can be applied to the present embodiment. This similarly applies also to various exampled hereinafter described.

Although the term "rotation" does not inhibit rotation over the full circumference of 360 degrees or more or infinite rotation or revolution, this is not essential. Naturally, although rotation over the full circumference of 360 degrees or more or infinite rotation is not inhibited, the hinge structure 1001 has a function of folding two tubular members relative to each other by means of a hinge mechanism, and normally the "rotation" by this is smaller than 360 degrees. The hinge structure 1001 is used to connect two housings to each other for pivotal motion through a connection mechanism in a foldable electronic instrument such as, for example, a portable telephone set, a notebook type personal computer, a portable game machine or a digital movie apparatus. In the present embodiment, a cavity is provided in the connection mechanism and is used for signal transmission to be carried out wirelessly by radio, that is, by a radio wave, from one to the other housing.

By configuring the movable section 1004 such that a rotational driving section 1060 for driving the movable section 1004 to rotate can be connected thereto, it is possible to automatically rotate the movable section 1004 without depending upon a manual operation. The hinge structure 1001 in this instance may be configured in any manner only if the rotational driving section 1060 can be connected thereto and may be circulated while it includes the rotational driving section 1060 or may be circulated without including the rotational driving section 1060.

The waveguide 1012 and the waveguide 1014 are secured to the fixed section 1002. Although the waveguide 1012 and the waveguide 1014 optimally have a circular or round cross sectional shape, the cross sectional shape is not limited to this but may be a shape proximate to a circular shape, and particularly, an ellipsis or a polygon such as, for example, an octagon or a dodecagon is permitted. However, a shape having a small number of angles such as, for example, a triangle or a quadrangle is not preferable because it is much different from a circular shape.

For example, in the case where the waveguide 1012 and the waveguide 1014 are formed as round waveguides, the cutoff frequency Fc of the basic mode, that is, the $TE_{11}$ mode, is given by $Fc = c \times 1.814/(2 \times \pi \times a)$ [Hz]. Here, "c" is the velocity of light and is $2.99792458 \times 10^8$ [m/s], "a" the radius [m] of the waveguide. For example, in the case where a=1.75 mm, the waveguide can be used with a frequency higher than the cutoff frequency Fc=49.458 gigahertz.

The fixed section 1002 is attached or secured to one of the housings of the electronic instrument. The movable section 1004 is a member mounted for rotation around a rotational shaft and is coupled for rotation to the fixed section 1002 so as to form a hinge structure by means of a coupling shaft not shown provided in the waveguide 1012 and the waveguide 1014. Preferably, the center of the waveguide 1012 and the waveguide 1014 is made coincide with the center of the rotational shaft of the movable section 1004. Incidentally, in the configuration example shown, the waveguide 1014, a board 1202 which corresponds to the board 102 or the board 202, a microstrip line 1024 and a terminating member 1090 are component members of the movable section 1004, and a block including the component members and one of the communication sections not shown is rotatable relative to the fixed section 1002 on which the other communication section is mounted.

A board 1102 which corresponds to the board 102 or the board 202 and on which circuit parts are mounted is provided on the fixed section 1002. A communication section including a transmission section, that is, a radio communication section, for transmitting a transmission object signal by radio, for example, in the centimeter waveband, the millimeter waveband or the sub millimeter waveband to the opposite party and a reception section and which corresponds to the first communication apparatus 100 or the second communication apparatus 200 is mounted on the board 1102. Similarly, the board 1202 on which circuit parts are mounted is provided on the movable section 1004. A communication section, that is, a radio communication section, including a transmission section for transmitting a transmission object signal by radio, for example, in the centimeter waveband, the millimeter waveband or the sub millimeter waveband to the opposite part and a reception section and which corresponds to the first communication apparatus 100 or the second communication apparatus 200 is mounted on the board 1202. Preferably, the millimeter waveband is used as the transmission frequency band, that is, the frequency band for a carrier. Although the first communication apparatus 100 or the second communication apparatus 200 described hereinabove is used as the communication section, if both of them are provided in each of the fixed section 1002 and the movable section 1004, then a configuration which allows bidirectional communication can be obtained.

A transmission line coupling section 1108 including a microstrip line 1022 which is an example of a line not shown electrically connected to the transmission section or the reception section is provided on the board 1102. Similarly, a transmission line coupling section 1208 including a microstrip line 1024 which is an example of a line not shown electrically connected to the transmission section or the reception section is provided on the board 1202. The transmission line coupling section 1108 and the transmission line coupling section 1208 correspond to the transmission line coupling section 108 and the transmission line coupling section 208, respectively. The transmission line coupling section 1108 and the transmission line coupling section 1208 for supplying or receiving an electromagnetic wave are provided in the waveguide 1012 and the waveguide 1014, for example, at ends on the waveguide 1012 and the waveguide 1014, respectively.

Processing of an Waveguide End Portion

The fixed section 1002 or the movable section 1004 may be terminated, at an end portion of the waveguide 1014 remote from the waveguide 1012 or at an end portion of the waveguide 1012 remote from the waveguide 1014, by the terminating member 1090 which is a short block or reflecting plate. By disposing the terminating member 1090, which is an example of a reflecting plate, at a position at which radio waves are intensified by each other by reflected components at one end or at the opposite ends of the entire waveguide configured from the waveguide 1012 and the waveguide 1014, the transmission efficiency can be raised by an effect that the traveling wave and the reflecting wave intensity each other. In particular, in the case where the terminating member 1090 is used, also a reflected wave by the terminating member 1090 can be utilized for transmission and reception, and this enhances the sensitivity. However, it may matter that an unnecessary standing wave is generated in the waveguide by multiple reflections in the waveguide 1012 and the waveguide 1014.

The end of the waveguide 1012 remote from the waveguide 1014 may be left open, or an absorbing member, that is, a radio wave absorber 1092, which absorbs a radio signal radiated from the transmission line coupling section 1108 or the waveguide 1012, may be disposed in the proximity of the end while the end is left open. Similarly, the end of the waveguide 1014 remote from the waveguide 1012 may be left open, or an absorbing member, that is, a radio wave absorber 1092, which absorbs a radio signal radiated from the transmission line coupling section 1208 or the waveguide 1014, may be disposed in the proximity of the end while the end is left open. By disposing the radio wave absorber 1092 at one end or the opposite ends of entire waveguide configured from the waveguide 1012 and the waveguide 1014, the multiple reflection level or the backward wave level can be lowered. In particular, in the case where the radio wave absorber 1092 is used for an open end, although a reflected wave cannot be utilized for transmission or reflection, since it is possible to absorb a radio wave leaking from the end portion, leakage of the radio wave to the outside can be prevented and the multiple reflection level in the waveguide 1012 and the waveguide 1014 can be lowered and besides the backward wave can be erased or lowered in level.

Processing of a Circumferential Edge of the Waveguide

Even in the case where a dielectric material is filled in the waveguide 1012 and the waveguide 1014, preferably a circumferential edge member of the waveguide 1012 and the waveguide 1014 is made of a metal material. In short, although a signal transmission line for transmitting a signal of an electromagnetic wave may be the air, that is, the free space, preferably it has a structure for allowing an electromagnetic wave to be transmitted therealong while the electromagnetic wave is entrapped therein. In the case where a dielectric material is filled to produce the waveguide 1012 and the waveguide 1014 having the dielectric inserted therein, the dielectric material may be stuffed into the tubular member of a metal material or a thin film coating of a metal material may be formed by a surface treatment, hereinafter referred to as metal plating, so as to cover the outer periphery of the dielectric material. The structure wherein metal plating is applied to the outer periphery of a dielectric material can achieve, in addition to miniaturization, reduction in weight from that in an alternative case in which a dielectric material is stuffed in a housing of a metal material. In particular, by applying metal plating on the outer periphery of a dielectric cylinder, a round waveguide having a dielectric material inserted therein can be produced, and consequently, reduction in weight can be achieved in addition to reduction in size. On the other hand, with the structure wherein a dielectric material is filled in a tubular member of a metal material, a mechanical strength can be increased from that in the case where metal plating is applied.

Processing of the Inside of the Waveguide

The inside of the waveguide 1012 and the waveguide 1014 functions as a radio signal transmission line. The inside of the waveguide 1012 and the waveguide 1014 may be hollow and have the air therein. In particular, the waveguide 1012 and the waveguide 1014 include a shielding member of, for example, a metal material which configures the radio signal transmission line, for example, a millimeter wave signal transmission line and suppresses external radiation of a radio signal or radio wave is provided in such a manner as to surround the transmission line such that they form a hollow waveguide wherein the transmission line in the shielding member is hollow.

However, preferably the inside of the waveguide 1012 and the waveguide 1014 is stuffed with a dielectric material. By stuffing a dielectric material, the sectional size or diameter of the waveguide can be made small and multiple reflections in the waveguide can be suppressed. For example, in the case where the waveguide 1012 and the waveguide 1014 are round waveguides, if the relative dielectric constant of the dielectric material to be stuffed is represented by $\in$, then the diameter of the waveguide 1012 and the waveguide 1014 can be reduced to approximately $1/\sqrt{\in}$ time with respect to that in the case where the waveguide 1012 and the waveguide 1014 are hollow. Further, reflection components by mismatching of a transmission or reception port sometimes multiple-reflects in a waveguide and have a bad influence on the transmission or reception port. Here, if the inside of the waveguide is the air, then since it causes little loss, even if such reflected components are multiple-reflected in the waveguide, the power level of them is not attenuated. Consequently, the reflected components have a significantly bad influence. In contrast, if a dielectric material which causes some loss, which is greater than that by the air, is stuffed, then the power level of reflected waves is attenuated, and therefore an otherwise possible bad influence can be suppressed.

In the case where the terminating member 1090 is provided at an end portion of the waveguide 1012 and the waveguide 1014 or the end portion of the waveguide 1012 and the waveguide 1014 is formed as an open end without disposing the radio wave absorber 1092 thereat, in order to prevent the problem of reflected waves, a directional coupling member 1094 called isolator, which is, particularly in the example shown, of the waveguide type, having a function also as an absorbing member for absorbing reflected components of a radio signal may be disposed in the waveguide 1012 or waveguide 1014. Since the directional coupling member 1094 allows a traveling wave component of an electromagnetic wave propagating in the waveguide to pass therethrough while it absorbs reflected wave components of the electromagnetic wave, the influence of reflection can be reduced. For example, if an isolator wherein ferrite is utilized as the radio wave absorbing member is used, then a radio wave absorbing action operates when a particular magnetic field, here, a magnetic field in a direction in which it is to be absorbed, is applied to the ferrite. Consequently, the load fluctuation to the antenna can be prevented on the transmission side while, on the reception side, a negative effect by advancement of an unnecessary radio wave, which enters through the antenna, into a reception circuit can be prevented. The isolator may be, for example, a distributed constant isolator or a concentrated constant isolator. However, in the present example, an isolator of the waveguide type which may be regarded as a distributed constant isolator is used.

Although, in a distributed constant isolator, the required size of the ferrite member increases in inverse proportion to the frequency, if the millimeter waveband or a waveband in the proximity of the millimeter waveband is used for wireless transmission, then a ferrite member of a diameter smaller than 1 cm can be used. This can achieve reduction in size of the device, that is, of the directional coupling member 1094. The directional coupling member 1094 of the waveguide type which is simple and easy in configuration can be applied to the hinge structure 1001 in the present embodiment without adopting a concentrated constant isolator which is complicated in configuration although it is small in size.

Antenna Structure

The transmission line coupling section 1108 and the transmission line coupling section 1208 have an antenna structure. The antenna structure is a structure at a coupling section to a signal transmission line configured in the waveguide 1012 and the waveguide 1014, and may be any member if it converts an electric signal in the millimeter band or the like into an electromagnetic wave and couples the electromagnetic wave to a radio signal transmission line but does not signify only an antenna itself. For example, the antenna structure is configured including an antenna terminal, a microstrip line and an antenna. Details of the transmission line coupling section 1108 and the transmission line coupling section 1208 are hereinafter described.

The signal transmission apparatus 1 of the present embodiment preferably uses a circularly polarized wave to carry out wireless transmission in the waveguide 1012 and the waveguide 1014. In the case where the antennae or probes on the transmission side and the reception side are of the type wherein a linearly polarized wave is transmitted and received, respectively, when the rotational angle of the hinge structure is small like an angle within 90 degrees, preferably within 45 degrees, the linearly polarized wave can be received without any trouble even if it is transmitted as it is in the waveguide. However, if the rotational angle is greater and exceeds 90 degrees, then since the linearly polarized wave rotates, it cannot be received without any trouble by a probe for a linearly polarized wave. In the case where a linearly polarized wave is used, transmission and reception can be carried out only within a narrow range centered at a position at which the linearly polarized waves on the transmission side and the reception side coincide with each other.

Even in the case where the movable section 1004 is rotated to an angle proximate to 360 degrees with respect to the fixed section 1002, if a circularly polarized wave is used to carry out wireless transmission, then it can be transmitted and received without any trouble. In other words, if a circularly polarized wave is used within the waveguide 1012 and the waveguide 1014, then even if the wave guide is rotated up to 360 degrees with respect to the center axis on the rotation side, communication can be carried out. In addition, there is an advantage also in that the structure can be miniaturized by use of a radio signal of the millimeter waveband.

In order to use a circularly polarized wave in the waveguide 1012 and the waveguide 1014, a technique of using a circular polarization probe for the transmission line coupling section 1108 and the transmission line coupling section 1208 is available. Also another technique can be adopted which uses a linear polarization probe for the transmission line coupling section 1108 and the transmission line coupling section 1208 while a functioning section as a polarization conversion section or a circularly polarized wave generator for carrying out conversion between a linearly polarized wave and a circularly polarized wave is provided in the waveguide 1012 and the waveguide 1014. Or a combination of the techniques may be used.

For example, the transmission line coupling section 1108 and the transmission line coupling section 1208 can assume the following three forms. In particular, in the first form, both of them supply or receive an electromagnetic wave in the form of a linearly polarized wave to or by the waveguide 1012 and the waveguide 1014, respectively. In the second form, both of them supply or receive an electromagnetic wave in the form of a circularly polarized wave to or by the waveguide 1012 and the waveguide 1014, respectively. In the third form, one of them supplies or receives an electromagnetic wave in the form of a linearly polarized wave while the other of them supplies or receives an electromagnetic wave in the form of a circularly polarized wave to or by the waveguide 1012 and the waveguide 1014.

Figures 3C, 8A:
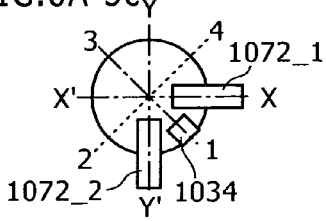

In the case where a linearly polarized wave is used, a linearly polarized wave generator such as a linear polarization probe 1070 shown in FIG. 3C is used as a linearly polarized wave antenna in the transmission line coupling section 1108 and the transmission line coupling section 1208. However, in the case where a circularly polarized wave is used, a circularly polarized wave generator such as a circular polarization probe 1080 shown in FIG. 3D is used as a circularly polarized wave antenna in the transmission line coupling section 1108 and the transmission line coupling section 1208. On the other hand, in the case where a linearly polarized wave is introduced into the waveguide 1012 or the waveguide 1014 but is transmitted in the form of a circularly polarized wave between the waveguide 1012 and the waveguide 1014, the a polarization conversion section 1030 as a polarization conversion apparatus or polarizer for carrying out conversion between a linearly polarized wave and a circularly polarized wave is provided for the waveguide 1012 and the waveguide 1014.

FIG. 3A shows a polarization conversion section 1030A of a first example hereinafter described as the polarization conversion section 1030 used on the waveguide 1012 side. Though not shown, various modifications to the arrangement of the semiconductor chip 103 can be made. For example, the polarization conversion section 1030 is provided on the waveguide 1014 side with the dividing position of the waveguide 1012 and the waveguide 1014 changed. Or, the polarization conversion section 1030 is provided for both of the waveguide 1012 and the waveguide 1014.

On the other hand, in order to allow a linearly polarized wave to be introduced in the TE mode into the waveguide 1012 or the waveguide 1014 and transmitted in the TM mode between the waveguide 1012 and the waveguide 1014, a mode conversion section 1040 (not shown, hereinafter described in detail) for converting a linearly polarized wave from the TE mode into the TM mode is provided in the waveguide 1012 and the waveguide 1014. In the case where the mode conversion is carried out, not only a desired mode component such as a $TM_{01}$ mode component but also an unnecessary mode component such as, for example, a $TE_{21}$ mode component may possibly be generated. Therefore, in this instance, also a member for suppressing such an unnecessary mode component may be used additionally.

Further, as another method of allowing a linearly polarized wave in the TM mode to be transmitted between the waveguide 1012 and the waveguide 1014, an antenna such as an annular patch antenna hereinafter described in detail for introducing a linearly polarized wave in the TM mode itself into the waveguide 1012 or the waveguide 1014 may be used as the transmission line coupling section 1108 or the transmission line coupling section 1208. For example, since the $TE_{11}$ mode includes a polarized wave, if the hinge is rotated until the transmission and reception antennae are directed perpendicularly to each other, then a linearly polarized wave cannot be received. However, the $TM_{01}$ mode can be received even if the hinge is rotated because it does not include a polarized wave.

Examples of the Combination

FIG. 4 shows a table of combinations of the elements described above. From FIG. 4, those combinations which can be applied to the signal transmission apparatus 1 of the present embodiment can be recognized. In the columns of "short or open" of FIG. 4, "short" represents that the terminating member 1090 is used for an end portion of the fixed section or the movable section while "open" represents that the end portion is open. As described hereinabove, in the case of "open," preferably the radio wave absorber 1092 is disposed in the proximity of the end portion. "Short (open)" signifies a case in which the end portion is short or open, and "open (short)" signifies another case in which the end portion is open or short, and "short" and "open" are used in such a combination that, when one of the end portions of the fixed section and the movable section is short, the other of the end portions is open, or vice versa.

In the column of "probe" in FIG. 4, "circular" represents a case where the circular polarization probe 1080 is used, and "linear" represents another case where the linear polarization probe 1070 is used. "Linear (circular)" signifies a case where the linear polarization probe 1070 or the circular polarization probe 1080 is used, "linear (circular)" signifies a case where the circular polarization probe 1080 or the linear polarization probe 1070 is used, and "linear" and "circular" are used in such a combination that, when one of the fixed section and the movable section uses the linear polarization probe 1070, the other of the fixed section and the movable section uses the circular polarization probe 1080, but when the one section uses the circular polarization probe 1080, the other section uses the linear polarization probe 1070.

In the column of "evaluation," relative ranking used in the order of "A" to "E" is indicated, and "A" indicates an optimum combination, and unfavorable problems are actualized as the combination changes to B→C→D→E. For example, in the configuration example wherein wireless transmission between the waveguide 1012 and the waveguide 1014 is carried out using a circularly polarized wave, there is no limitation to the rotational angle by which the movable section 1004 rotates with respect to the fixed section 1002, and even in the case where the rotational angle is great, for example, greater than 90 degrees, a radio signal can be transmitted and received without any trouble.

In the configuration example 1 wherein the circular polarization probe 1080 is used for both of the transmission and the reception and the terminating member 1090 is disposed at the end of both of the waveguide 1012 and the waveguide 1014, by using a circularly polarized wave for wireless transmission between the first communication section and the second communication section which is disposed for relative rotation with respect to the first communication around the rotational shaft, even in a case wherein the structure that the second communication section makes relative rotation including endless rotation with respect to the first communication is adopted, a radio signal emitted from one of the communication sections can be received without any problem by the other communication section. Since the waveguide 1012 and the waveguide 1014 do not require the polarization conversion section 1030 and are simple in structure, the form described above is considered most preferable, and the evaluation is set to "A." In this instance, although there is no escape for an electromagnetic wave reflected by the terminating member 1090, since it propagates in the form of a circularly polarized wave, the possibility that an unnecessary standing wave may appear is low even if multiple reflections occur in the waveguide 1012 or the waveguide 1014. However, the circular polarization probe 1080 used for both of the fixed section and the movable section is disadvantageous in that it is difficult in probe design in comparison with the linear polarization probe 1070.

In the configuration example 4 wherein the linear polarization probe 1070 is used for one of the transmission and the reception while the circular polarization probe 1080 is used for the other, the polarization conversion section 1030 is required for one of the waveguide 1012 and the waveguide 1014. Therefore, the configuration example 4 is more complicated in structure than the configuration example 1 and therefore is evaluated as "B." In this instance, even if the axial ratio of the circularly polarized wave drops, since a linearly polarized wave is used for the other of the transmission and the reception, the configuration example 4 is advantageous in the axial ratio characteristic in comparison with the configuration example 1. The configuration example 4 is advantageous also in that the linear polarization probe 1070 whose configuration design is easier than that of the circular polarization probe 1080 can be used for one of the transmission and the reception. Further, although there is no escape for an electromagnetic wave reflected by the terminating member 1090, since the polarization conversion section 1030 intervenes, even if multiple reflections occur in the waveguide 1012 and the waveguide 1014, the possibility that an unnecessary standing wave may appear is low.

The configuration examples 10 to 12 wherein "linear" is used for both of the transmission and reception and the waveguide 1012 and the waveguide 1014 do not include the polarization conversion section 1030 are combinations which are not suitable in the case where the rotational angle of the hinge structure is great such as, for example, greater than 90 degrees. Therefore, they are evaluated as "E." This is because, since either an electromagnetic wave is introduced from the fixed section 1002 side into the movable section 1004 side while it remains in the form of a linearly polarized wave or is emitted in the form of a linearly polarized wave from the movable section 1004 side and introduced into the fixed section 1002 side, if a circularly polarized wave is not used, then in the case where the rotational angle of the hinge structure is greater than 90 degrees, a situation is entered in which transmission and reception are disabled.

The configuration example 7 wherein "linear" is used for both of the transmission and the reception and, while the polarization conversion section 1030 is provided in the waveguide 1012, it is not provided in the waveguide 1014 while the terminating member 1090 is provided for both of the ends is not considered a preferable combination, and therefore, is evaluated as "E." This is because there is no escape for an electromagnetic wave reflected by the terminating member 1090 and an unnecessary standing wave by multiple reflections in the waveguide 1012 and the waveguide 1014 may possibly appear.

The configuration example 13 wherein the terminating member 1090 is disposed for both of the ends from among the configuration examples 13 to 15 wherein "linear" is used for both of the transmission and the reception and the polarization conversion section 1030 is provided in both of the waveguide 1012 and the waveguide 1014 is evaluated as "B" because it is more complicated in structure than the configuration example 1 similarly to the configuration example 4. In this instance, even if the axial ratio of the circularly polarized wave drops, since a linearly polarized wave is used for the other, the configuration example 13 is advantageous in axial ratio characteristic in comparison with the configuration example 1. However, the configuration example 13 is disadvantageous in that the overall length of the waveguide is longer. Meanwhile, the configuration example 13 has an advantageous in that the linear polarization probe 1070 which is easier in probe design than the circular polarization probe 1080 can be used for both of the transmission and the reception. Further, although there is no escape for an electromagnetic wave reflected by the terminating member 1090, since the polarization conversion section 1030 intervenes, even if multiple reflections occur in the waveguide 1012 or the waveguide 1014, the possibility that an unnecessary standing wave may appear is low. In the case where one or both of the ends are formed as an open end as in the case of the configuration example 14 or 15, this is inferior to the configuration example 13 wherein the terminating member 1090 is disposed for both of the ends and besides has a disadvantage that the overall length of the waveguide is long in comparison with that in the case of the configuration example 2 or the configuration example 3. Therefore, the configuration examples 14 and 15 are evaluated as "D."

Transmission and Reception Antenna

Figure 6:
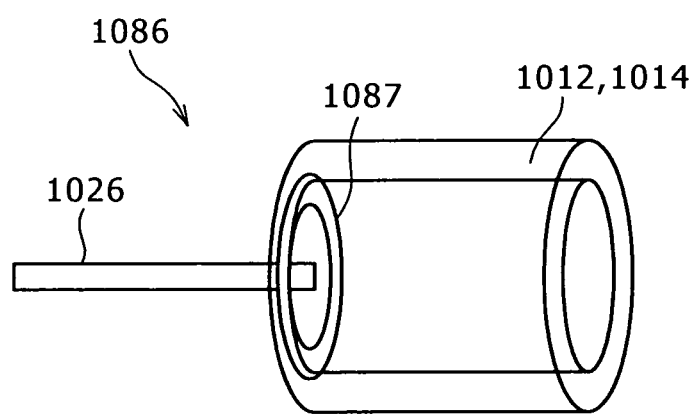
FIG. 6 is a schematic view showing an example of a configuration of an annular patch antenna as a transmission and reception antenna used in the hinge structure of the embodiment.

FIGS. 5A to 5B-5 and 6 show a transmission and reception antenna used in the hinge structure 1001 in the present embodiment. More particularly, FIG. 5A shows an example of a configuration of the linear polarization probe 1070, and FIGS. 5B-1 to 5B-5, show an example of a configuration of the circular polarization probe 1080. FIG. 6 shows an example of a configuration of an annular patch antenna.

For a Liner Polarized Wave

Referring first to FIG. 5A, the linear polarization probe 1070 includes, as a transmission and reception antenna, a linear bar-like member 1072 provided at a base end side portion of the waveguide 1012 and the waveguide 1014 of a tubular shape, preferably of a cylindrical shape, and inserted perpendicularly in the waveguide 1012 and the waveguide 1014. As apparent from the structure just described, the linear polarization probe 1070 is much simpler than the circular polarization probe 1080 hereinafter described. Though not shown in FIG. 5A, an end portion of the waveguide 1012 and the waveguide 1014 is provided with the terminating member 1090, is formed as an open end or is formed as an end with the radio wave absorber 1092 disposed in the proximity thereof as in the case of the circular polarization probe 1080 hereinafter described.

In order to achieve the state in which the linear bar-like member 1072 is inserted perpendicularly into the waveguide 1012 and the waveguide 1014, the bar-like member 1072 is formed by forming, on one principal surface portion of the board 1102 and the board 1014 in the form of a flat plate formed, for example, from a dielectric material, that is, from an insulating material, a conductor pattern in the form of a foil film, which is to form the bar-like member 1072 made of copper or some other conductor, linearly by coating by means of etching or the like. In short, the linear polarization probe 1070 can be miniaturized and is simplified in configuration because the bar-like member 1072 formed from a conductor pattern is formed on one flat face of the board 1102 and the board 1202.

The linear polarization probe 1070 or linearly polarized wave generator of such a structure as described above can be used as a linearly polarized wave transmission antenna. In particular, when an oscillation signal in the form of a linearly polarized wave is supplied from a transfer end 1076, the linear polarization probe 1070 radiates a linearly polarized wave in a direction perpendicular to the principal surface portion of the board 1102 and the board 1202, that is, toward the front end side of the waveguide 1012 and the waveguide 1014, through the bar-like member 1072. The linear polarization probe 1070 can be used also as a linearly polarized wave reception antenna. In particular, in the case where the linear polarization probe 1070 is used as a linearly polarized wave reception antenna, the linear polarization probe 1070 receives a linearly polarized wave incoming in a perpendicular direction to the principal face of the board 1102 and the board 1202 from the front end side of the waveguide 1012 and the waveguide 1014 by means of the bar-like member 1072 and outputs the received linearly polarized wave as a reception signal in the form of a linearly polarized wave from the transfer end 1076.

For a Circularly Polarized Wave

Referring to FIGS. 5B-1 to 5B-5, the circular polarization probe 1080 includes, as a transmission and reception antenna, a crank-like member 1082 which is a combination of a plurality of linear members inserted perpendicularly to the waveguide 1012 and the waveguide 1014 at a base end side portion of the waveguide 1012 and the waveguide 1014 of a tubular shape, preferably of a cylindrical shape. For example, the crank-like member 1082 is configured from a combination of first to sixth linear members 1082_1 to 1082_6. The circular polarization probe 1080 of such a structure as just described is disclosed, for example, in Japanese Patent Laid-Open No. Hei 5-283902.

In order to establish the state in which the crank-like member 1082 is inserted perpendicularly into the waveguide 1012 and the waveguide 1014, a crank-shaped conductor pattern which is to make the crank-like member 1082 is formed on one principal face of the board 1102 and the board 1202 in the form of a flat plate formed, for example, from a dielectric material, that is, from an insulating material.

The dimensions of the conductor patterns of the linear members 1082_1 to 1082_6 of the crank shape are set in the following manner in response to a wavelength λ. First, the first linear member 1082_1 is configured such that the base end side thereof is formed as a transfer end 1086, which is a reception end or a transmission end, of an electromagnetic signal of the wavelength λ and the length thereof is approximately ⅜λ. The transfer end extends to and is connected to the microstrip line 1022 and the microstrip line 1024 formed on the board 1102 and the board 1202, respectively.

The second linear member 1082_2 connects to and extends from an end portion of the first linear member 1082_1 in one side direction perpendicular to the crank-like member 1082 and has a length of approximately ⅛λ. The third linear member 1082_3 connects to and extends from an end portion of the second linear member 1082_2 in a direction parallel to the first linear member 1082_1 toward an end side of the first linear member 1082_1 and has a length of approximately ¼λ. The fourth linear member 1082_4 connects to and extends from an end portion of the third linear member 1082_3 in a direction perpendicular to the third linear member 1082_3 toward the other end side of the third linear member 1082_3 and has a length of approximately ¼λ. The fifth linear member 1082_5 connects to and extends from an end portion of the fourth linear member 1082_4 in a direction parallel to the first linear member 1082_1 toward the end side of the first linear member 1082_1 and has a length of approximately ¼λ. The sixth linear member 1082_6 connects to and extends from an end portion of the fifth linear member 1082_5 in a direction perpendicular to the fifth linear member 1082_5 and has a length of approximately ⅛λ.

The crank-like member 1082 is formed such that the second linear member 1082_2 and sixth the linear member 1082_6 have a rotationally symmetrical relationship in position and shape around the fourth linear member 1082_4 and also the third linear member 1082_3 and the fifth linear member 1082_5 have a rotationally symmetrical relationship in position and shape around the fourth linear member 1082_4.

In this manner, the circular polarization probe 1080 is formed by forming a conductor pattern of a foil film of copper or some other conductor by coating such that the first to sixth linear members 1082_1 to 1082_6 are successively provided continuously by means of etching or the like on the board 1102 and the board 1202 in such a manner as to generally exhibit a crank shape.

The width of the conductor pattern of the first to sixth linear members 1082_1 to 1082_6 which form the crank-like member 1082 is set to a width determined in advance in response to the wavelength λ taking transmission loss of a signal into consideration. Further, in the present example, the one side direction is determined as the rightward direction when the board 1102 and the board 1202 are faced while the other side direction is determined as the leftward direction when the board 1102 and the board 1202 are faced.

The circular polarization probe 1080 having the crank-like member 1082 of such a configuration as described above is disposed and used in the waveguide 1012 and the waveguide 1014. In particular, the board 1102 and the board 1202 are disposed such that the portions thereof at which the conductor patterns are formed are positioned in the board 1102 and the board 1202, respectively. The board 1102 and the board 1202 are disposed in the waveguide 1012 and the waveguide 1014 such that the principal face portions thereof are disposed perpendicularly to the axis of the waveguide 1012 and the waveguide 1014 in a state in which the conductor patterns of the first to sixth linear members 1082_1 to 1082_6 of the crank-like member 1082 are positioned in the waveguide 1012 and the waveguide 1014 of a tubular shape, preferably of a cylindrical shape, which are open on the front end side thereof and are closed on the rear end side thereof. The board 1102 and the board 1202 are partially led out to the outside of the waveguide 1012 and the waveguide 1014. At the portions of the board 1102 and the board 1202 lead out to the outside of the waveguide 1012 and the waveguide 1014, the microstrip line 1022 and the microstrip line 1024 are formed, respectively. The inner diameter of the waveguide 1012 and the waveguide 1014 denoted by a double-sided arrow mark D in FIG. 5B-1 is set to a dimension of such a degree that at least the crank-like member 1082 having the conductor patterns of the first to sixth linear members 1082_1 to 1082_6 can be covered with the fourth linear member 1082_4 positioned centrally.

The board 1102 and the board 1202 are directed, at the principal face portions thereof on which the first to sixth linear members 1082_1 to 1082_6 are formed, toward the front end side of the waveguide 1012 and the waveguide 1014. For example, the terminating member 1090 is disposed on the rear end side of the waveguide 1012 and the waveguide 1014 remote from the board 1102 and the board 1202. The board 1102 and the board 1202 are supported at a position at which the distance to the rear end of the waveguide 1012 and the waveguide 1014 denoted by a double-sided arrow mark H in FIG. 5B-2 is approximately ¼λ. In other words, the depthwise length of the terminating member 1090 is set to approximately ¼λ. Naturally, the rear end side of the waveguide 1012 and the waveguide 1014 may be formed as an open end as seen in FIG. 5B-3 or may be formed as an open end while the radio wave absorber 1092 is disposed in the proximity of the open end as seen in FIG. 5B-4.

The circular polarization probe 1080 as a circularly polarized wave generator having such a structure as described above can be used as a circularly polarized wave transmission antenna. In particular, when an oscillation signal in the form of a linearly polarized wave is supplied from the transfer end 1086, the circular polarization probe 1080 radiates a circularly polarized wave in a direction perpendicular to the main face section of the board 1102 and the board 1202, that is, in a direction toward the front end side of the waveguide 1012 and the waveguide 1014 through the crank-like member 1082. The circular polarization probe 1080 can be used also as a circularly polarized wave reception antenna. In particular, in the case where the circular polarization probe 1080 is used as a circularly polarized wave reception antenna, the circular polarization probe 1080 receives, by means of the crank-like member 1082 thereof, a circularly polarized wave incoming in a perpendicular direction to the main face of the board 1102 and the board 1202 from the front end side of the waveguide 1012 and the waveguide 1014. Then, the circular polarization probe 1080 outputs the received circularly polarized wave as a reception signal in the form of a linearly polarized wave from the transfer end 1086.

Incidentally, a circularly polarized wave exhibits a positional displacement by ¼λ, that is, 90 degrees, between the amplitude of an electric field in an X axis direction and the amplitude of the electric field in a Y axis direction where the advancing direction thereof is defined as a Z axis. A circularly polarized wave is either a right-handed wave or a left-handed wave depending upon whether the amplitude of the electric field in the X axis direction leads or delays in phase with respect to the amplitude of the electric field in the Y axis direction. In a circular polarization probe 1080_1 shown in FIG. 5B-1, the crank-like member 1082 has a characteristic for transmitting and receiving a right-handed wave. If the crank-like member 1082 is shaped so as to make a mirror image with respect to the circular polarization probe 1080_1 of FIG. 5B-1 like a circular polarization probe 1080_2 shown in FIG. 5B-5, then the crank-like member 1082 has a characteristic for transmitting and receiving a left-handed wave. In other words, in order to transmit and receive a left-handed wave, the crank-like member 1082 may be formed such that the one side direction is set to the left side direction facing the board 1102 and the board 1202 while the other side direction is set to the right side direction facing the board 1102 and the board 1202.

Therefore, in the circular polarization probe 1080 of such a configuration as described above, if an electromagnetic signal of a wavelength λ is supplied from the transfer end 1086 which is the base end side of the linear member 1082_1, then whichever one of a right-handed wave and a left-handed wave the electromagnetic signal is, the crank-like member 1082 having the first to sixth linear members 1082_1 to 1082_6 radiates a circularly polarized wave in a perpendicular direction to the board 1102 and the board 1202. On the other hand, if a circularly polarized wave is introduced into the circular polarization probe 1080 from a perpendicular direction to the board 1102 and the board 1202, then the crank-like member 1082 having the first to sixth linear members 1082_1 to 1082_6 receives the circularly polarized wave, and a reception signal in the form of a linearly polarized wave is outputted from the transfer end 1086. Since the first to sixth linear members 1082_1 to 1082_6 of the circular polarization probe 1080 formed from the conductor patterns are formed on the same plane, the circular polarization probe 1080 can be formed in a reduced thickness and is simplified in configuration. Although a characteristic diagram is not shown, the circular polarization probe 1080 has a good reception characteristic, that is, a good axial ratio (cross polarization discrimination degree) characteristic of low transmission loss. Since the conductor patterns receive a circularly polarized wave with a good reception characteristic, it is possible to send the reception signal to a circuit at the succeeding stage through the transfer end 1086.

Incidentally, a right-handed wave and a left-handed wave are used in pair on the transmission side and the reception side. In particular, in the case where the circular polarization probe 1080_1 for transmitting a right-handed wave is used on the transmission side, the circular polarization probe 1080_1 for receiving a right-handed wave is used on the reception side, but in the case where the circular polarization probe 1080_2 for transmitting a left-handed wave is used on the transmission side, the circular polarization probe 1080_2 for receiving a left-handed wave is used on the reception side.

Two orthogonally polarized waves of a right-handed circularly polarized wave and a left-handed circularly polarized wave can be used to carry out communication by two systems in the same direction or bidirectional communication without using frequency division multiplexing or any other multiplexing method. In particular, the circular polarization probe 1080_1 for transmitting a right-handed wave and the circular polarization probe 1080_2 for transmitting a left-handed wave are provided on one member such as, for example, the fixed section 1002 while the circular polarization probe 1080_1 for transmitting a right-handed circularly polarized wave and the circular polarization probe 1080_2 for transmitting a left-handed wave are provided on the other member such as, for example, the movable section 1004 such that orthogonally polarized waves, that is, a right-handed circularly polarized wave and a left-handed circularly polarized wave, are utilized. In this instance, two-polarized wave common use of transmitting or receiving a right-handed circularly polarized wave and transmitting or receiving a left-handed circularly polarized wave can be achieved. By utilizing orthogonally polarized waves of a right-handed circularly polarized wave and a left-handed circularly polarized wave, a doubled amount of information can be transmitted while using the same carrier frequency without using frequency division multiplexing or any other multiplexing method.

Annular Patch Antenna

An annular patch antenna is an antenna having a patch conductor of an annular shape, that is, an annular radiation conductor 1087, as schematically shown in FIG. 6. Particularly, a $TM_{01}$ mode annular patch antenna 1086 has directivity similar to that of a dipole or a monopole placed perpendicularly to the patch. The annular radiation conductor 1087 is supplied with power in the $TM_{01}$ mode coaxially from the annular radiation conductor 1087.

It is to be noted that FIG. 6 schematically shows the $TM_{01}$ mode annular patch antenna 1086, and for details of the same, a reference document given below may be referred to.

Reference Document: Naohisa GOTOH, "Introductory Course to Antenna Engineering," Denpa Shinbun-Sha, Chapter 4 Patch Antenna, 4.10 $TM_{01}$ mode annular patch antenna, pp. 228-281, FIGS. 4 to 37

<Polarization Conversion Section>

FIGS. 7A to 8C-3c illustrate the polarization conversion section 1030 used in the hinge structure 1001 according to the present embodiment.

Figure 7A:
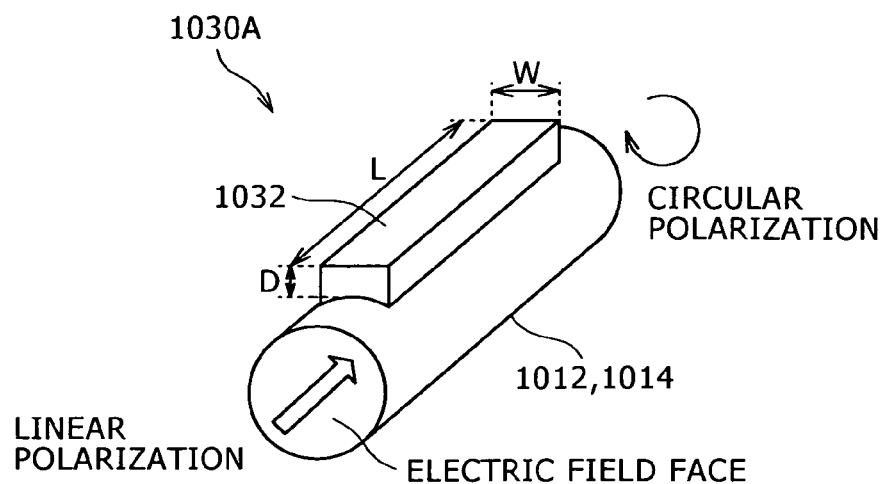

The polarization conversion section 1030A of a first example shown in a perspective view of FIG. 7A is a circularly polarized wave generator which is an example of a mono-grooved type round waveguide formed in the waveguide 1012 and the waveguide 1014. For example, a circularly polarized waveguide generator disclosed in the following reference document can be utilized as the polarization conversion section 1030A.

Reference Document: Naofumi YONEDA et al, "Mono-Grooved Circular Waveguide Polarizers," 2002 IEEE MTT-S Digest, WE2C-4, pp. 821-824

Figure 7B:
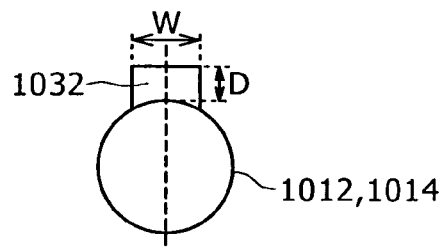
Figure 7C:
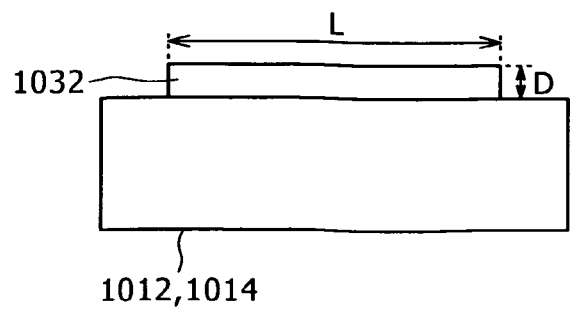

The polarization conversion section 1030A of the first example is configured such that a side groove 1032 of a parallelepiped shape as a coupling groove is provided on an outer side face of the waveguide 1012 and the waveguide 1014 of a tubular shape, preferably of a cylindrical shape. In the following, description is given of a case in which a radio wave of the basic mode, that is, the $TE_{11}$ mode, of a round waveguide in the form of a linearly polarized wave inclined by 45 degrees with respect to a plane which passes the center of the side groove 1032 indicated by a broken line in a sectional view (cylindrical face) of FIG. 7B is inputted from an input end of the waveguide 1012 and the waveguide 1014.

By an influence of the side groove 1032, an incoming radio wave exhibits a phase difference between a polarized wave component thereof horizontal to a plane which passes the center indicated by a broken line of the side groove 1032 and a polarized wave component thereof vertical to the plane. At this time, if the sectional dimensions of the waveguide 1012 and the waveguide 1014, which are the width W, depth D and length L, are designed appropriately with respect to the sectional dimensions of the waveguide 1012 and the waveguide 1014, in the case of a round waveguide, a diameter ϕ, as disclosed in the Reference Document 2, then a radio wave of the basic mode outputted from an output end remote from the input end of the waveguide 1012 and the waveguide 1014 is a circularly polarized wave within a certain fixed or desired frequency band. This signifies that, whichever one of the basic mode having a horizontal polarized wave and the basic mode having a vertical polarized wave passes through a plane which passes the center indicated by a broken line of the side groove 1032, little reflection occurs and the phase difference of passing phases of them is "approximately 90 degrees."

A polarization conversion section 1030B of a second example shown in FIGS. 8A-1 to 8B-3c is configured such that a metal projection 1034 or metal piece in the form of a stepped plate is provided on the inner side face of the waveguide 1012 and the waveguide 1014 of a tubular shape, preferably of a cylindrical shape. The metal projection 1034 is a flat plate having a width smaller than one half the inner diameter of the waveguide 1012 and the waveguide 1014, and a sectional shape of the metal projection 1034 in the longitudinal direction of the waveguide 1012 and the waveguide 1014 exhibits a stepped shape. The metal projection 1034 is disposed on the inner wall of the waveguide 1012 and the waveguide 1014 such that the longitudinal direction thereof coincides with the longitudinal direction of the waveguide 1012 and the waveguide 1014.

Figures 1, 8B:
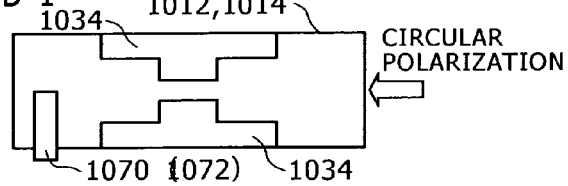
Figures 2, 8B:
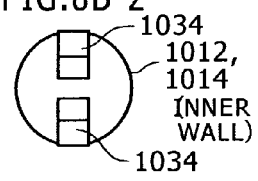
Figures 3A, 8B:
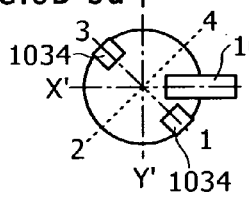
Figures 3B, 8B:
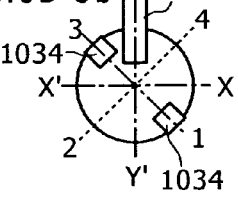
Figures 3C, 8B:
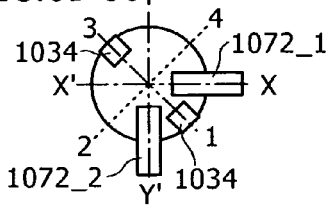

The metal projection 1034 may be disposed singly on one side of the waveguide 1012 and the waveguide 1014 as shown in FIGS. 8A-1 to 8A-3c, or two such metal projections 1034 may be disposed diagonally on the waveguide 1012 and the waveguide 1014 as seen in FIGS. 8B-1 to 8B-3c.

In the case where the polarization conversion section 1030B of the second example is applied, the linear polarization probe 1070 having the linear bar-like member 1072 inserted perpendicularly in the waveguide 1012 and the waveguide 1014 at a base end portion of the waveguide 1012 and the waveguide 1014 is used in combination. The combination of the polarization conversion section 1030B of the second example and the linear polarization probe 1070 functions as a circularly polarized wave transmission and reception antenna.

Into the circularly polarized light transmission and reception antenna configured, for example, from the combination of the polarization conversion section 1030B of the second example and the linear polarization probe 1070, a circularly polarized wave is introduced as indicated by an arrow mark A in FIG. 8A-1 or 8B-1 from an open end side of the waveguide 1012 and the waveguide 1014. From within the circularly polarized wave, an electric field amplitude component in a direction perpendicular to the principal face of the metal projection 1034 passes through the inside of the waveguide 1012 and the waveguide 1014 without being influenced by the metal projection 1034 and comes to the bar-like member 1072. On the other hand, an electric field amplitude component of the circularly polarized wave in a direction along the principal face of the metal projection 1034 passes through the metal projection 1034, whereupon the advancing speed is reduced, and then comes to the bar-like member 1072. The metal projection 1034 is formed such that, when the electric field amplitude component of the circularly polarized wave which passes through the metal projection 1034 exhibits a delay corresponding to ¼λ when it reaches the bar-like member 1072.

By the configuration, the electric field amplitude component of the circularly polarized wave in a direction perpendicular to the principal face of the metal projection 1034 and the electric field amplitude component of the circular polarized wave in a direction along the principal face of the metal projection 1034 reach the bar-like member 1072 at the same time with each other and are outputted as a reception signal through the bar-like member 1072. Further, when a radio wave is oscillated from the bar-like member 1072, the circularly polarized wave transmission and reception antenna configured from the combination of the polarization conversion section 1030B of the second example and the linear polarization probe 1070 can be used as a circularly polarized wave generator which oscillates a circularly polarized wave toward the end side of the waveguide 1012 and the waveguide 1014 by an action of the metal projection 1034.

Here, the metal projection 1034 and the bar-like member 1072 are disposed in the following manner. The description is given under the assumption that a radio wave advances in a direction from the rear side toward the front side of the plane of an applied figure. First, as seen in FIGS. 8A-3a to 8A-3c and 8B-3a to 8B-3c, the positions shifted by 45, 135, 225 and 315 degrees in the clockwise direction around the center axis of the waveguide 1012 and the waveguide 1014 with respect to the bar-like member 1072 of the linear polarization probe 1070 are represented as positions 1, 2, 3 and 4, respectively. It is to be noted that the horizontal direction and the vertical direction with respect to the center axis are represented as X-X' axis and Y-Y' axis, respectively.

Further, the metal projection 1034 is disposed at the positions 1 and 3 or only at the position 1 or 3 (this disposition is hereinafter referred to as disposition form A). The positions mentioned have a relationship that a same polarized wave is transmitted from and received by the linear polarization probe 1070, that is, by the bar-like member 1072. Or, the metal projection 1034 is disposed at the positions 2 and 4 or only at the position 2 or 4 (this disposition is hereinafter referred to as disposition form B). The positions mentioned have a relationship that a same polarized wave is transmitted from and received by the linear polarization probe 1070, that is, by the bar-like member 1072.

The disposition form A and the disposition form B have an orthogonal polarization relationship to each other and may be used for transmission and reception of a right-handed wave or of a left-handed wave from a relationship to the position at which the linear polarization probe 1070, that is, the bar-like member 1072, is disposed. For example, when the metal projection 1034 is disposed at the positions 1 and 3 or only at the position 1 or 3, if the linear polarization probe 1070, that is, the bar-like member 1072, is positioned on the X-X' axis, then a right-handed wave is handled, but if the linear polarization probe 1070, that is, the bar-like member 1072, is positioned on the Y-Y' axis, then a left-handed wave is handled. In particular, if the bar-like member 1072 is disposed on the X-X' axis, on any of the X and X' sides, as seen in FIGS. 8A-3a and 8B-3a, then a right-handed wave can be transmitted or received. If the bar-like member 1072 is disposed on the Y-Y' axis, on any of the Y and Y' sides, as seen in FIGS. 8A-3b and 8B-3b, then a left-handed wave can be transmitted or received.

Incidentally, a right-handed wave and a left-handed wave are used in pair on the transmission side and the reception side. In particular, in the case where the form of FIG. 8A-3a or 8B-3a is used for one of the fixed section 1002 and the movable section 1004, for example, for the fixed section 1002, the circular polarization probe 1080_1 which receives and transmits a right-handed wave is used for the other of the fixed section 1002 and the movable section 1004, for example, for the movable section 1004. However, in the case where the form of FIG. 8A-3b or 8B-3b is used for one of the fixed section 1002 and the movable section 1004, for example, for the fixed section 1002, the circular polarization probe 1080_2 which receives and transmits a left-handed wave is used for the other of the fixed section 1002 and the movable section 1004, for example, for the movable section 1004.

If a bar-like member 1072_1 and another bar-like member 1072_2 are disposed such that one of them, for example, the bar-like member 1072_1, is disposed on the X-X' axis, on any of the X and X' sides, and the other of them, for example, the bar-like member 1072_2, is disposed on the Y-Y' axis, on any of the Y and Y' sides, as seen in FIGS. 8A-3c and 8B-3c, then two-polarized wave common use wherein a right-handed wave is transmitted or received by the bar-like member 1072_1 and a left-handed wave is transmitted or received by the bar-like member 1072_2 can be achieved. By utilizing orthogonally polarized waves, that is, both of a right-hand circularly polarized wave and a left-hand circularly polarized wave, even if frequency division multiplexing or any other multiplexing method is not used, a doubled amount of information can be transmitted while using the same carrier frequency.

Figures 1, 8C:
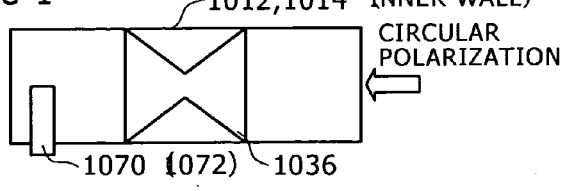
Figures 2, 8C:
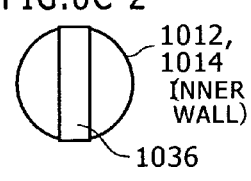
Figures 3A, 8C:
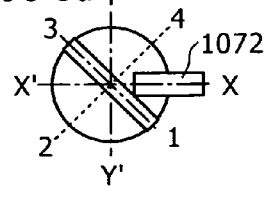
Figures 3B, 8C:
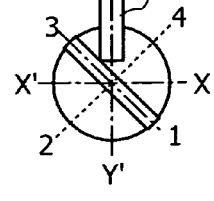
Figures 3C, 8C:
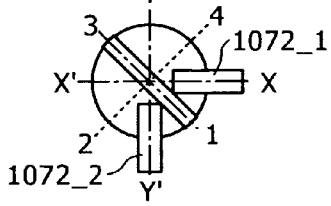

A polarization conversion section 1030C of the third example shown in FIGS. 8C-1 to 8C-3c is configured including a wedge-shaped dielectric plate 1036 in the form of a plate provided on the inner side face of the waveguide 1012 and the waveguide 1014 of a tubular shape, preferably of a cylindrical shape. The dielectric plate 1036 is a flat plate having a width equal to the inner diameter of the waveguide 1012 and the waveguide 1014 and is disposed on the axis of the waveguide 1012 and the waveguide 1014 such that the longitudinal direction thereof coincides with the axial direction of the waveguide 1012 and the waveguide 1014.

In the case where the polarization conversion section 1030C of the third example is applied, the linear polarization probe 1070 including the linear bar-like member 1072 inserted vertically in the waveguide 1012 and the waveguide 1014 at a base end side portion of the waveguide 1012 and the waveguide 1014 is used in combination. The combination of the polarization conversion section 1030C of the third example and the linear polarization probe 1070 functions as a circularly polarized wave transmission and reception antenna.

Into the circularly polarized light transmission and reception antenna configured, for example, from the combination of the polarization conversion section 1030C of the third example and the linear polarization probe 1070, a circularly polarized wave is introduced as indicated by an arrow mark B in FIG. 8C-1 from an open end side of the waveguide 1012 and the waveguide 1014. From within the circularly polarized wave, an electric field amplitude component in a direction perpendicular to the principal face of the dielectric plate 1036 passes through the inside of the waveguide 1012 and the waveguide 1014 without being influenced by the dielectric plate 1036 and comes to the bar-like member 1072. On the other hand, an electric field amplitude component of the circularly polarized wave in a direction along the principal face of the dielectric plate 1036 passes through the dielectric plate 1036, whereupon the advancing speed is reduced, and then comes to the bar-like member 1072. The dielectric plate 1036 is formed such that, when the electric field amplitude component of the circularly polarized wave which passes through the dielectric plate 1036 exhibits a delay corresponding to ¼λ when it reaches the bar-like member 1072.

By the configuration, the electric field amplitude component of the circularly polarized wave in a direction perpendicular to the principal face of the dielectric plate 1036 and the electric field amplitude component of the circular polarized wave in a direction along the principal face of the dielectric plate 1036 reach the bar-like member 1072 at the same time with each other and are outputted as a reception signal through the bar-like member 1072. Further, when a radio wave is oscillated from the bar-like member 1072, the circularly polarized wave transmission and reception antenna configured from the combination of the polarization conversion section 1030C of the third example and the linear polarization probe 1070 can be used as a circularly polarized wave generator which oscillates a circularly polarized wave toward the end side of the waveguide 1012 and the waveguide 1014 by an action of the dielectric plate 1036.

Here, the dielectric plate 1036 and the bar-like member 1072 are disposed in the following manner. The description is given under the assumption that a radio wave advances in a direction from the rear side toward the front side of the plane of an applied figure. First, as seen in FIGS. 8C-3a to 8C-3c, the positions shifted by 45, 135, 225 and 315 degrees in the clockwise direction around the center axis of the waveguide 1012 and the waveguide 1014 with respect to the bar-like member 1072 of the linear polarization probe 1070 are represented as positions 1, 2, 3 and 4, respectively. It is to be noted that the horizontal direction and the Y direction with respect to the center axis are represented as X-X' axis and Y-Y' axis, respectively.

Further, the dielectric plate 1036 is disposed in one of a "direction of the positions 1 and 3" (hereinafter referred to as disposition form A) and another "direction of the positions 2 and 4" (hereinafter referred to as disposition form B). The disposition form A and the disposition form B have an orthogonal polarization relationship, and may be used for transmission and reception of a right-handed wave or of a left-handed wave from a relationship to the position at which the linear polarization probe 1070, that is, the bar-like member 1072, is disposed. For example, when the dielectric plate 1036 is disposed at the positions 1 and 3 or only at the position 1 or 3, if the linear polarization probe 1070, that is, the bar-like member 1072, is positioned on the X-X' axis, then a right-handed wave is handled, but if the linear polarization probe 1070, that is, the bar-like member 1072, is positioned on the Y-Y' axis, then a left-handed wave is handled. In particular, if the bar-like member 1072 is disposed on the X-X' axis, on any of the X and X' sides, as seen in FIG. 8C-3a, then a right-handed wave can be transmitted or received. If the bar-like member 1072 is disposed on the Y-Y' axis, on any of the Y and Y' sides, as seen in FIG. 8C-3b, then a left-handed wave can be transmitted or received.

Incidentally, a right-handed wave and a left-handed wave are used in pair on the transmission side and the reception side. In particular, in the case where the form of FIG. 8C-3a is used for one of the fixed section 1002 and the movable section 1004, for example, for the fixed section 1002, the circular polarization probe 1080_1 which receives and transmits a right-handed wave is used for the other of the fixed section 1002 and the movable section 1004, for example, for the movable section 1004. However, in the case where the form of FIG. 8C-3b is used for one of the fixed section 1002 and the movable section 1004, for example, for the fixed section 1002, the circular polarization probe 1080_2 which receives and transmits a left-handed wave is used for the other of the fixed section 1002 and the movable section 1004, for example, for the movable section 1004.

If the bar-like member 1072_1 and the bar-like member 1072_2 are disposed such that one of them, for example, the bar-like member 1072_1, is disposed on the X-X' axis, on any of the X and X' sides, and the other of them, for example, the bar-like member 1072_2, is disposed on the Y-Y' axis, on any of the Y and Y' sides, as seen in FIGS. 8C-3c, then two-polarized wave common use wherein a right-handed wave is transmitted or received by the bar-like member 1072_1 and a left-handed wave is transmitted or received by the bar-like member 1072_2 can be achieved. By utilizing orthogonally polarized waves, that is, both of a right-handed circularly polarized wave and a left-handed circularly polarized wave, a doubled amount of information can be transmitted.

<Mode Conversion Section>

Figure 9A:
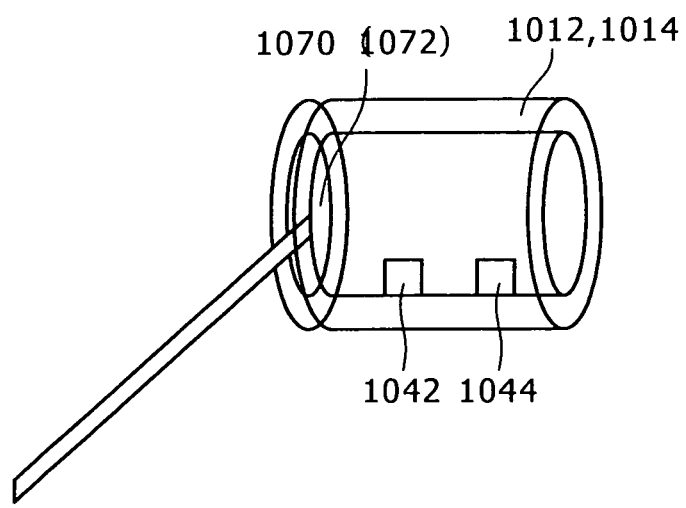
FIGS. 9A and 9B are schematic views showing a mode conversion section used in the hinge structure of the embodiment.
Figure 9B:
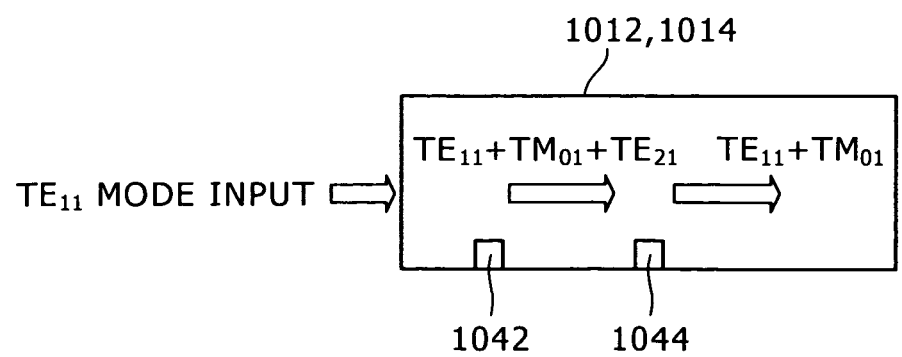

FIGS. 9A and 9B illustrate the mode conversion section 1040 used in the hinge structure 1001 in the present embodiment. More particularly, FIG. 9A shows a general configuration of the mode conversion section 1040, and FIG. 9B illustrates operation of the mode conversion section 1040.

Referring to FIGS. 9A and 9B, the mode conversion section 1040 includes a $TM_{01}$ generating projection 1042 and a $TE_{21}$ erasing projection 1044 provided in a round waveguide formed from the waveguide 1012 and the waveguide 1014. Not one but a plurality of such $TE_{21}$ erasing projections 1044 may be disposed. A radio wave of the $TE_{11}$ mode is inputted to the inside of the round waveguide from the linear polarization probe 1070. The electric field plane of the radio wave propagating along the waveguide extends in a direction parallel to the cross section, and the $TM_{01}$ generating projection 1042 and the $TE_{21}$ erasing projection 1044 project inwardly in parallel to the electric field plane toward the center of the round waveguide.

In the case where a projection parallel to the electric field plane exists in the inside of a round waveguide, a higher-order mode is generated as seen in FIG. 9B. The $TM_{01}$ generating projection 1042 is configured from a screw or the like such that the projection amount thereof can be adjusted. The projection amount of the $TM_{01}$ generating projection 1042 is adjusted to an amount with which the $TM_{01}$ mode is generated by adjusting the projection amount while observing an antenna output power. By selecting a magnitude of the diameter of the round waveguide in which the $TM_{01}$ generating projection 1042 is provided such that the higher-order mode $TM_{01}$ is not attenuated in a low frequency band, the higher-order mode $TM_{01}$ is radiated in a low frequency band.

If the $TM_{01}$ generating projection 1042 receives a radio wave of the $TE_{11}$ mode, then it generates a radio wave of the $TM_{01}$ mode and generates the $TE_{21}$ mode which is an unnecessary higher-order mode. The $TE_{21}$ mode in a high frequency band is erased by the single or plural $TE_{21}$ erasing projections 1044. The distance between the $TM_{01}$ generating projection 1042 and the $TE_{21}$ erasing projection 1044 is set to $\lambda g/2$ where $\lambda g$ is the wavelength of the $TE_{21}$ mode in the waveguide. Where a plurality of $TE_{21}$ erasing projections 1044 are provided, also the distance between each two $TE_{21}$ erasing projections 1044 is set to $\lambda g/2$. The $TM_{01}$ generating projection 1042 has a bidirectional property, that is, a $TM_{01}$-$TM_{01}$ conversion function, and generates a radio wave of the $TE_{11}$ mode when it receives a radio wave of the $TM_{01}$ mode. Therefore, by introducing a radio wave of the $TE_{11}$ mode into the waveguide on the transmission side from the transmission side such that the radio wave of the $TE_{11}$ mode is converted into a radio wave of the $TM_{01}$ mode and then passing the radio wave of the $TM_{01}$ mode through the $TM_{01}$ generating projection 1042 on the reception side, the radio wave of the $TM_{01}$ mode can be converted into a radio wave of the $TE_{11}$ mode.

The $TE_{21}$ erasing projection 1044 is configured from a screw or the like such that the projection amount thereof can be adjusted similarly to the $TM_{01}$ generating projection 1042. The $TM_{01}$ generating projection 1042 and the $TE_{21}$ erasing projection 1044 are disposed such that they are juxtaposed in a line in parallel to the electric field plane. Or, the $TM_{01}$ generating projection 1042 and the $TE_{21}$ erasing projection 1044 may be offset from the position at which they are juxtaposed in a line. By adjusting the position or the projection amount of the $TM_{01}$ generating projection 1042 and the $TE_{21}$ erasing projection 1044 in a state in which the distance between the $TM_{01}$ generating projection 1042 and the $TE_{21}$ erasing projection 1044 and the distance between adjacent ones of the $TE_{21}$ erasing projections 1044, the amplitude ratio and the phase difference of the $TM_{01}$ mode from the basic mode, that is, the $TE_{11}$ mode, can be set to appropriate values at the waveguide opening.

The diameter of the round waveguide is set such that the $TM_{01}$ mode propagates in a low frequency band. Although one of higher-order modes with respect to the $TM_{01}$ mode is the $TE_{21}$ mode, the $TE_{21}$ mode is erased by one or more $TE_{21}$ erasing projections 1044 to radiate the $TE_{11}$ mode and the $TM_{01}$ mode. By erasing the $TE_{21}$ mode, which appears in a high frequency band, by means of the $TE_{21}$ erasing projection 1044, application to two frequency bands is permitted. Even in the case where a radio wave is introduced in a mode other than the $TM_{01}$ mode into the waveguide, by utilizing such mode conversion as described above, even if the hinge is rotated, the radio wave can be received.

<Particular Applications>

In the following, particular applications of the hinge structure 1001 to which the signal transmission apparatus 1 is applied are described.

Working Example 1

Figure 10B:
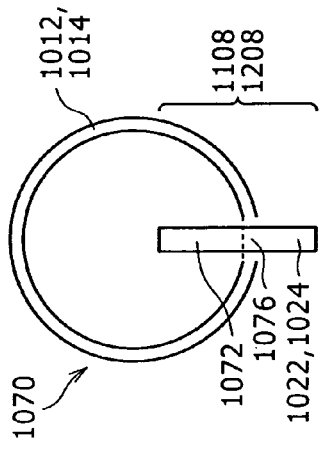
FIGS. 10A to 10C are schematic views showing a hinge structure of a working example 1.
Figure 10C:
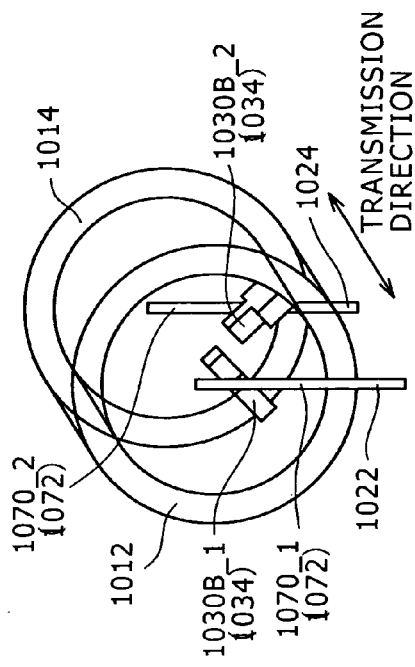
Figure 10A:
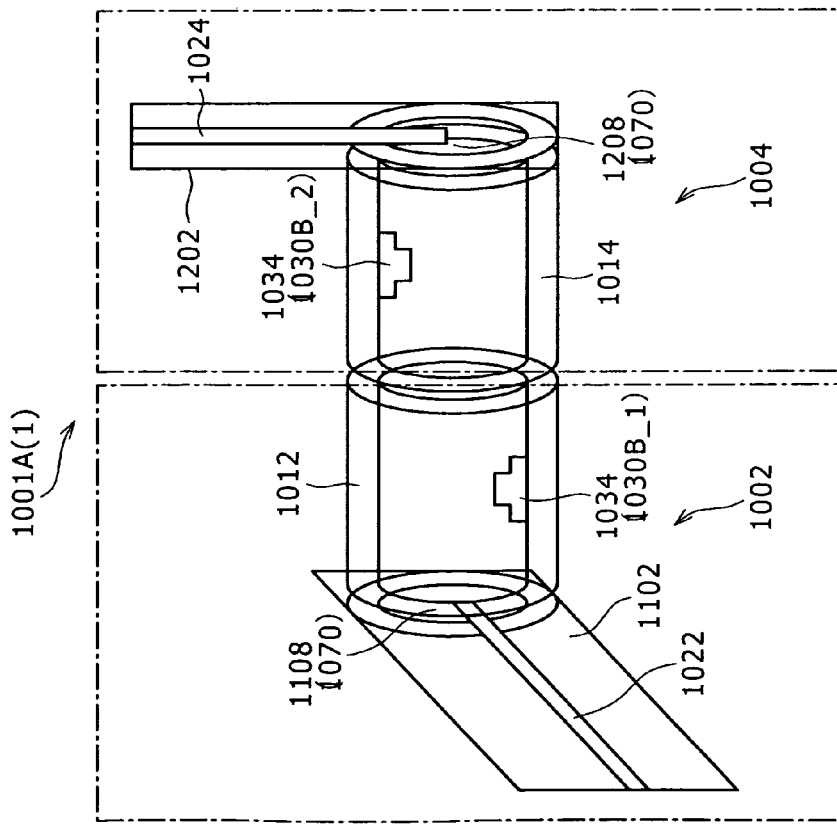

FIGS. 10A to 10C illustrate a hinge structure 1001A of a working example 1. In particular, FIG. 10A shows a general configuration of the hinge structure 1001A. FIGS. 10B and 10C show an antenna structure for the transmission line coupling section 1108 and the transmission line coupling section 1208 used in the hinge structure 1001A.

Referring to FIGS. 10A to 10C, the hinge structure 1001A of the working example 1 applies one of the configuration examples 13 to 15 of the combination form illustrated in FIG. 4. In particular, the linear polarization probe 1070 is used in both of the transmission line coupling section 1108 and the transmission line coupling section 1208, and besides the polarization conversion section 1030 is applied to both of the waveguide 1012 and the waveguide 1014. The waveguide 1012 of the fixed section 1002 side and the waveguide 1014 of the movable section 1004 side have pipe lengths set substantially equal to each other. The waveguide 1014, board 1202 and microstrip line 1024 configure the movable section 1004, and the block of the members mentioned and one of the communication sections not shown rotates relative to the fixed section 1002 on which the other communication section is mounted. FIGS. 10A to 10C show the hinge structure 1001 to which the configuration example 14 is applied, and the end of the waveguide 1012 remote from the waveguide 1014 and the end of the waveguide 1014 remote from the waveguide 1012 are formed as open ends.

In the hinge structure 1001A, the polarization conversion section 1030 is applied to both of the waveguide 1012 and the waveguide 1014. As seen from a perspective view of FIG. 10A, as such polarization conversion sections 1030, the polarization conversion section 1030B of the second example which utilizes the metal projection 1034 are used for both of the waveguide 1012 and the waveguide 1014. Since the polarization conversion section 1030, here the polarization conversion section 1030B, is used for the waveguide 1012 and the waveguide 1014 as described hereinabove, the hinge structure 1001A is complicated in structure in comparison with a hinge structure 1001E of a working example 5 hereinafter described. Further, since totally two polarization conversion sections 1030 are used for the waveguide 1012 and the waveguide 1014, the hinge structure 1001A is complicated in structure in comparison with a hinge structure 1001B of a working example 2 hereinafter described. On the other hand, the hinge structure 1001A is advantageous in that the linear polarization probe 1070 which is simple and easy in structure can be used for both of the fixed section 1002 and the movable section 1004.

In this manner, the hinge structure 1001A of the working example 1 is structured such that two sets of a linear polarization probe 1070 and a polarization conversion section 1030, which is, in the present example, the polarization conversion section 1030B, are placed one on the other, and signal transmission is carried out using the waveguide 1012 and the waveguide 1014 each including the polarization conversion section 1030. The state of a polarized wave in the course of a flow of a signal in the hinge structure 1001A of the working example 1 of such a configuration as described above, that is, in the course of the transmission antenna→tubular portion→tubular portion→reception antenna, is a linearly polarized wave→conversion into a circularly polarized wave→conversion into a linearly polarized wave→the linearly polarized wave. In particular, a signal is inputted in a linearly polarized wave into one of the waveguide 1012 of the fixed section 1002 and the waveguide 1014 of the movable section 1004 and is converted into a circularly polarized wave by the polarization conversion section 1030, which is a polarization conversion structure. Further, the signal is converted into a linearly polarized wave by the other polarization conversion section 1030, which is a polarization conversion structure, of the waveguide 1012 of the fixed section 1002 and the waveguide 1014 of the movable section 1004, and is coupled to the waveguide probe. In short, the two waveguides 1012 and 1014 each having the polarization conversion section 1030 as a polarization conversion structure are used to carry out transmission of a radio signal while conversion of a polarized wave is carried out. A flow of a signal in this instance is described particularly with reference to an oblique perspective view of FIG. 10C.

First, a flow of a signal in the case where the fixed section 1002 serves as the transmission side and the movable section 1004 serves as the reception side is described. In this instance, a signal outputted from the microstrip line 1022 of the fixed section 1002 on the transmission side is transmitted in a linearly polarized wave into the waveguide 1012 through a linear polarization probe 1070_1, that is, the bar-like member 1072. The radio wave in the millimeter waveband, that is, the 60 gigahertz band, of the linearly polarized wave in the waveguide 1012 is converted into a circularly polarized wave by a polarization conversion section 1030B_1, that is, by the metal projection 1034, and then transmitted to the waveguide 1014 side. A polarization conversion section 1030B_2, that is, the metal projection 1034, disposed on the waveguide 1014 converts the radio wave in the millimeter waveband or 60 gigahertz band, having been converted into the circularly polarized wave by the polarization conversion section 1030B_1, that is, by the metal projection 1034, disposed on the waveguide 1012 side, back into a linearly polarized wave. Then, the polarization conversion section 1030B_2 transmits the linearly polarized wave to the movable section 1004 side. The linear polarization probe 1070_2, that is, the bar-like member 1072, of the transmission line coupling section 1208 of the movable section 1004 on the reception side can receive the radio wave in the millimeter waveband or 60 gigahertz band converted into the linearly polarized wave and transfer the radio wave to a high frequency circuit not shown through the microstrip line 1024 on the reception side.

Now, a flow of a signal in the case where the movable section 1004 serves as the transmission side and the fixed section 1002 serves as the reception side is described. In this instance, a signal outputted from the microstrip line 1024 of the movable section 1004 on the transmission side is transmitted in a linearly polarized wave into the waveguide 1014 through the linear polarization probe 1070_2, that is, the bar-like member 1072. The radio wave in the millimeter waveband or 60 gigahertz band of the linearly polarized wave in the waveguide 1014 is converted into a circularly polarized wave by the polarization conversion section 1030B_2, that is, by the metal projection 1034, and then transmitted to the waveguide 1012 side. The polarization conversion section 1030B_1, that is, the metal projection 1034, disposed on the waveguide 1012 converts the radio wave in the millimeter waveband or 60 gigahertz band, having been converted into the circularly polarized wave by the polarization conversion section 1030B_2, that is, by the metal projection 1034, disposed on the waveguide 1014 side, back into a linearly polarized wave. Then, the polarization conversion section 1030B_1 transmits the linearly polarized wave to the fixed section 1002 side. The linear polarization probe 1070_1, that is, the bar-like member 1072, of the transmission line coupling section 1108 of the fixed section 1002 on the reception side can receive the radio wave in the millimeter waveband or 60 gigahertz band converted into the linearly polarized wave and transfer the radio wave to a high frequency circuit not shown through the microstrip line 1022 on the reception side.

First Modification

Figure 11:
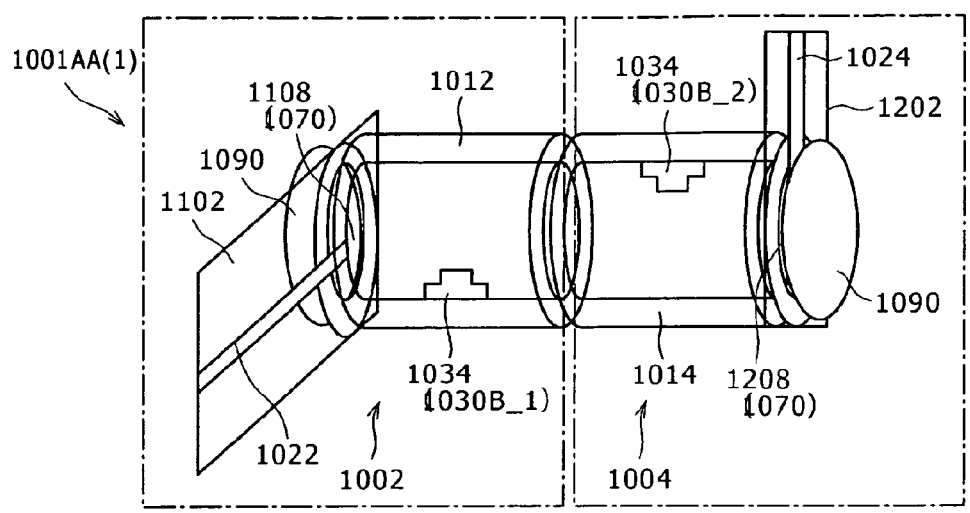
FIGS. 11, 12 and 13 are schematic views showing first, second and third modifications to the hinge structure of the working example 1.

FIG. 11 shows a first modification to the hinge structure 1001A of the working example 1. The hinge structure 1001AA of the first modification to the working example 1 is characterized in that the hinge structure 1001A of the working example 1 is modified such that an absorber is disposed at an end portion of the waveguide to lower the multiple reflection level and erase or lower the level of a backward wave.

FIG. 11 shows an example wherein the opposite ends of the entire waveguide configured from the waveguide 1012 and the waveguide 1014 are formed as open ends and the radio wave absorber 1092 which is an example of an absorbing member for absorbing a radio signal is disposed in the proximity of each of the open ends. However, this is not essential. In other words, the end of the waveguide 1012 remote from the waveguide 1014 and the end of the waveguide 1014 remote from the waveguide 1012 may be formed as open ends and the radio wave absorber 1092 may be disposed in the proximity of one of the open ends. By disposing the radio wave absorber 1092 at one end or both ends of the waveguide configured from the waveguide 1012 and the waveguide 1014 in this manner, reflected components can be absorbed into the radio wave absorber 1092. Since reflected components are absorbed, the multiple reflection level or the backward wave level can be lowered, and effects of preventing a load fluctuation to the antenna, preventing a drop of the power efficiency of the amplification section 117 which is a power amplifier, reducing the current consumption and suppressing a drop of the used time of the apparatus can be enjoyed by the transmission side. Meanwhile, on the reception side, such a problem that an unnecessary wave which advances through the antenna advances into the reception circuit to cause mutual modulation distortion and device breakdown and like problems can be prevented.

Incidentally, since the radio wave absorber 1092 generates heat through absorption of a radio wave, it may become necessary to suppress a temperature rise of the radio wave absorber 1092. Therefore, it is recommendable to provide a structure for radiating heat generated from the radio wave absorber 1092. As the heat radiating structure, for example, a bracket for the heat radiation may be provided with the radio wave absorber 1092 disposed thereon or a metal material around the waveguide 1012 or the waveguide 1014 may be used for the heat radiation. Thereupon, a structure may be used for transmitting heat generated in the inside of the radio wave absorber 1092, that is, internally generated heat of the radio wave absorber 1092, to the bracket for the heat radiation or the metal material of the waveguide 1012 or the waveguide 1014 with a high efficiency.

Second Modification

Figure 12:
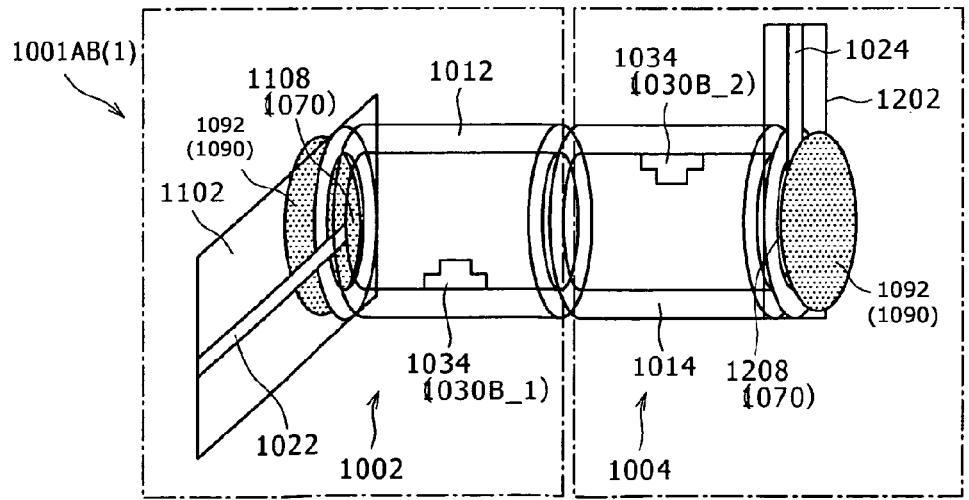

FIG. 12 shows a second modification to the hinge structure 1001A of the working example 1. The hinge structure 1001AB of the second modification is characterized in that the hinge structure 1001A of the working example 1 is modified such that the terminating member 1090 which is an example of a reflection plate is disposed at a position at which radio waves intensify each other by reflected components at an end portion such that the transmission efficiency is raised by an effect that the traveling wave and a reflected wave intensify each other.

FIG. 12 shows an example wherein the terminating member 1090 having a height H substantially equal to $\lambda/4$, where $\lambda$ is a wavelength, is disposed at the opposite end portions of the waveguide configured from the waveguide 1012 and the waveguide 1014 in order that a radio wave radiated from the linear polarization probe 1070 is transmitted with a high efficiency in the advancing direction. However, this is not essential. The terminating member 1090 may be disposed at least at one of the end of the waveguide 1012 remote from the waveguide 1014 and the end of the waveguide 1014 remote from the waveguide 1012. By disposing the terminating member 1090 at one or the opposite ends of the waveguide configured from the waveguide 1012 and the waveguide 1014 in this manner, the transmission efficiency can be raised by an effect that the traveling wave and a reflected wave intensify each other. Consequently, also a reflected wave can be utilized for transmission and reception, and the sensitivity is improved.

Though not shown, the first modification and the second modification may be combined. In particular, one of the end of the waveguide 1012 remote from the waveguide 1014 and the end of the waveguide 1014 remote from the waveguide 1012 is formed as an open end. Further, the radio wave absorber 1092 is disposed in the proximity of the open end, and the radio wave absorber 1092 is disposed at the other one of the end of the waveguide 1012 remote from the waveguide 1014 and the end of the waveguide 1014 remote from the waveguide 1012. By the disposition of the radio wave absorber 1092, the effect of lowering the multiple reflection level and the backward wave level can be enjoyed. Further, by the disposition of the terminating member 1090, also the effect in enhancement of the transmission efficiently and the sensitivity can be enjoyed.

Third Modification

Figure 13:
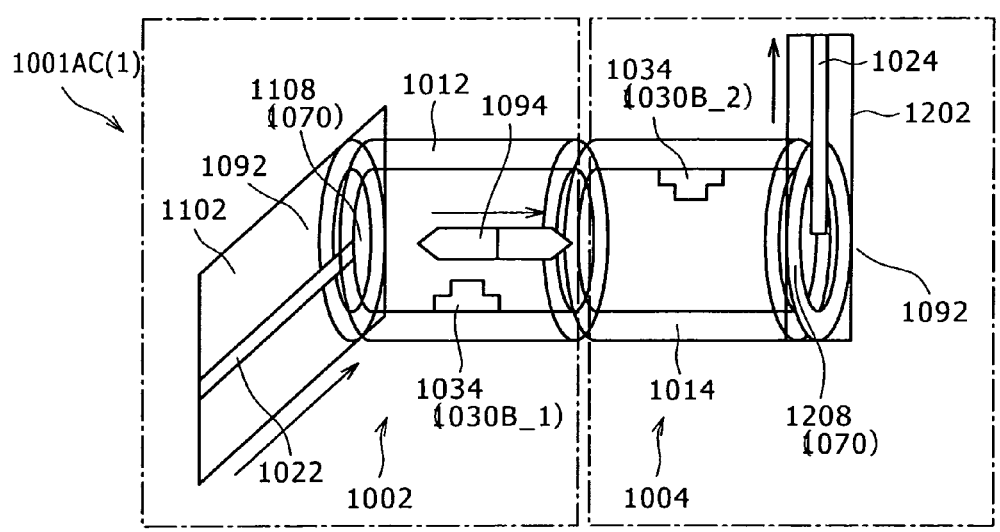

FIG. 13 shows a third modification to the hinge structure 1001A of the working example 1. The hinge structure 1001AC of the third modification is characterized in that the hinge structure 1001A of the working example 1 is modified such that the directional coupling member 1094 of the waveguide type which passes therethrough a traveling wave component from within an electromagnetic wave propagating in the waveguide but absorbs a reflected wave component is disposed in the waveguide to reduce the efficiency of reflection. If a magnetic field is applied in a certain condition to ferrite which is a radio wave absorbing member of the directional coupling member 1094, then the electromagnetic wave is permitted to advance only in a particular direction. By causing an electromagnetic wave to advance only in a direction in which the electromagnetic is to be transmitted while blocking an electromagnetic wave in the reverse direction, interference between a traveling wave and a reflected wave from a joint of a hinge, an antenna or an end of the waveguide can be suppressed.

In the example shown, signal transmission is carried out from the fixed section 1002 side to the movable section 1004 side. The directional coupling member 1094 passes therethrough an electromagnetic wave as a traveling wave to be transmitted from the fixed section 1002 side to the movable section 1004 side in the waveguide 1012 and the waveguide 1014 but absorbs a reflected component to be transmitted from the movable section 1004 side to the fixed section 1002 side. Since the reflected component is absorbed, the multiple reflection level or the backward wave level can be lowered. As a result, effects of preventing a load fluctuation to the antenna, preventing a drop of the power efficiency of the amplification section 117 which is a power amplifier, reducing the current consumption and suppressing a drop of the used time of the apparatus can be enjoyed by the transmission side. Meanwhile, on the reception side, such a problem that an unnecessary wave which advances into the antenna advances into the reception circuit to cause mutual modulation distortion and device breakdown and like problems can be prevented.

Incidentally, since the directional coupling member 1094 generates heat through absorption of a radio wave similarly to the radio wave absorber 1092, it may become necessary to suppress a temperature rise of the ferrite portion of the directional coupling member 1094. Therefore, it is recommendable to provide a structure for radiating heat generated from the directional coupling member 1094. As the heat radiating structure, for example, a bracket for the heat radiation may be provided with the directional coupling member 1094 disposed thereon or a metal material around the waveguide 1012 or the waveguide 1014 may be used for the heat radiation. Thereupon, a structure may be used for transmitting heat generated in the inside of ferrite which is a radio wave absorbing member of the directional coupling member 1094, that is, internally generated heat of the directional coupling member 1094, to the bracket for the heat radiation or the metal material of the waveguide 1012 or the waveguide 1014 with a high efficiency.

Working Example 2

FIGS. 14A to 14C show a hinge structure 1001B according to a working example 2. More particularly, FIG. 14A shows a general configuration of the hinge structure 1001B. FIGS. 14B and 14C show different antenna structures for the transmission line coupling section 1108 and the transmission line coupling section 1208 used in the hinge structure 1001B.

Referring FIGS. 14A to 14C, the hinge structure 1001B of the working example 2 applies one of the configuration examples 4 to 6 of the combination form illustrated in FIG. 4. One of the fixed section 1002 and the movable section 1004 uses the linear polarization probe 1070 while the other of the fixed section 1002 and the movable section 1004 uses the circular polarization probe 1080. Further, the polarization conversion section 1030 is applied to that one of the waveguide 1012 and the waveguide 1014 which uses the linear polarization probe 1070. That one of the waveguide 1012 and the waveguide 1014 to which the polarization conversion section 1030 is applied has a length set longer than that of that one of the waveguide 1012 and the waveguide 1014 to which the polarization conversion section 1030 is not applied. The waveguide 1014, board 1202 and microstrip line 1024 configure the movable section 1004, and the block including them and one of the communication sections not shown is rotatable relative to the fixed section 1002 on which the other communication section is mounted.

In the example shown in FIG. 14A, the polarization conversion section 1030 is disposed in the waveguide 1012 of the fixed section 1002 side and the linear polarization probe 1070 is used for the transmission line coupling section 1108 as in a first example shown in FIG. 14B. However, in the waveguide 1014 on the movable section 1004, the circular polarization probe 1080 is used for the transmission line coupling section 1208 without disposing the polarization conversion section 1030.

In a second example shown in FIG. 14C, the polarization conversion section 1030 is disposed in the waveguide 1014 of the movable section 1004 side and the linear polarization probe 1070 is used for the transmission line coupling section 1208. However, the circular polarization probe 1080 may be used for the transmission line coupling section 1108 without disposing the polarization conversion section 1030 in the waveguide 1012 of the fixed section 1002 side.

In either case, though not shown, one of the terminating member 1090 and the radio wave absorber 1092 may be disposed on at least one of the opposite side to the waveguide 1012 with respect to the waveguide 1014 and the opposite side to the waveguide 1014 with respect to the waveguide 1012 as occasion demands.

It is to be noted that the waveguide on the side on which the polarization conversion section 1030 is disposed, in FIG. 14A, the waveguide 1012, has a length set longer than that of the waveguide on the side on which the polarization conversion section 1030 is not disposed, in FIG. 14A, the waveguide 1014.

In this manner, in the hinge structure 1001B of the working example 2, as the polarization conversion section 1030, one polarization conversion section 1030A of the first example which is an example of a mono-grooved circular waveguide is used only for one of the waveguide 1012 and the waveguide 1014, in the example, only for the waveguide 1012 side. Since the polarization conversion section 1030, here the polarization conversion section 1030A, is used for one of the waveguide 1012 and the waveguide 1014 as described above, the hinge structure 1001B of the working example 2 is complicated in structure in comparison with the hinge structure 1001E of the working example 5 hereinafter described. On the other hand, the hinge structure 1001B of the working example 2 has an advantage that the linear polarization probe 1070 which is simple and easy in structure can be used for one of the fixed section 1002 and the movable section 1004, particularly the fixed section 1002 side in the first example of FIG. 14B and the movable section 1004 side in the second example of FIG. 14C.

In this manner, the hinge structure 1001B of the working example 2 is structured such that the linear polarization probe 1070 and the polarization conversion section 1030, in the present example, the polarization conversion section 1030A, are set to one of the waveguide 1012 and the waveguide 1014 and the circular polarization probe 1080 is set to the other one of the waveguide 1012 and the waveguide 1014. The state of a polarized wave in a flow of a signal in the direction of the transmission antenna→tubular portion→tubular portion→reception antenna in the hinge structure 1001B of the working example 2 of such a configuration as described above is a linearly polarized wave→conversion into a circularly polarized wave→a circularly polarized wave→the circularly polarized wave. In particular, a signal is inputted in a linearly polarized wave into the round waveguide on the side which has the polarization conversion section 1030 or polarization conversion structure, and is converted into a circularly polarized wave by the polarization conversion structure. Then, by the round waveguide which does not have the polarization conversion section 1030 or polarization conversion structure, the signal is coupled to the waveguide probe while it remains in the circularly polarized wave. Or, the state of a polarized wave is a circularly polarized wave→a circularly polarized wave→conversion into a linearly polarized wave→the linearly polarized wave. In particular, a signal is inputted in a circularly polarized wave into the round waveguide on the side which does not have the polarization conversion section 1030 or polarization conversion structure, and is transmitted, while it remains as the circularly polarized wave, to the other round waveguide which has the polarization conversion section 1030 or polarization conversion structure. Thereafter, the signal is converted into a linearly polarized wave by the polarization conversion structure in the round waveguide which has the polarization conversion section 1030 or polarization conversion structure, and the linearly polarized wave obtained by the conversion is coupled to the waveguide probe. In short, one of the two waveguides 1012 and 1014 which has the polarization conversion section 1030 or polarization conversion structure and the other one of the two waveguides 1012 and 1014 which does not have the polarization conversion section 1030 or polarization conversion structure are used to carry out transmission of a radio signal while conversion of a polarized wave is carried out. A flow of a signal in this instance is described particularly.

First, a first example shown in FIG. 14B wherein the linear polarization probe 1070 is used on the fixed section 1002 side and the circular polarization probe 1080 is used on the movable section 1004 side is described. In the case where the fixed section 1002 serves as the transmission side and the movable section 1004 serves as the reception side, a signal outputted from the microstrip line 1022 of the fixed section 1002 on the transmission side is transmitted in a linearly polarized wave into the waveguide 1012 through the linear polarization probe 1070. The radio wave in the millimeter waveband, that is, in the 60 gigahertz band, of the linearly polarized wave in the waveguide 1012 is converted into a circularly polarized wave by the polarization conversion section 1030A, and then transmitted to the waveguide 1014 on the movable section 1004 side. The circular polarization probe 1080 used as the transmission line coupling section 1208 of the movable section 1004 of the reception side receives, at the crank-like member 1082 thereof, the radio wave in the millimeter waveband or 60 gigahertz band, having been converted into the circularly polarized wave, and transmits the reception signal in the form of a linearly polarized wave to the microstrip line 1024 from the transfer end 1086. Consequently, the reception signal can be transferred to a high frequency circuit not shown.

On the other hand, in the case where the movable section 1004 serves as the transmission side and the fixed section 1002 serves as the reception side, a signal outputted from the microstrip line 1024 of the movable section 1004 on the transmission side is transmitted in a circularly polarized wave into the waveguide 1014 through the circular polarization probe 1080. The radio wave in the millimeter waveband, that is, in the 60 gigahertz band, of the circularly polarized wave in the waveguide 1014 is sent to the waveguide 1014 on the fixed section 1002 side and converted into a circularly polarized wave by the polarization conversion section 1030A, and then transmitted to the transmission line coupling section 1108 on the fixed section 1002 side. The linear polarization probe 1070 used as the transmission line coupling section 1108 of the fixed section 1002 of the reception side can receive the radio wave in the millimeter waveband or 60 gigahertz band, having been converted into the linearly polarized wave, and transfer the reception signal to a high frequency circuit not shown through the microstrip line 1022.

Now, a second example shown in FIG. 14C wherein the linear polarization probe 1070 is used on the movable section 1004 side and the circular polarization probe 1080 is used on the fixed section 1002 side is described. In the case where the movable section 1004 serves as the transmission side and the fixed section 1002 serves as the reception side, a signal outputted from the microstrip line 1024 of the movable section 1004 on the transmission side is transmitted in a linearly polarized wave into the waveguide 1014 through the linear polarization probe 1070. The radio wave in the millimeter waveband or 60 gigahertz band of the linearly polarized wave in the waveguide 1014 is converted into a circularly polarized wave by the polarization conversion section 1030A, and then transmitted to the waveguide 1012 on the fixed section 1002 side. The circular polarization probe 1080 used as the transmission line coupling section 1108 of the fixed section 1002 of the reception side receives, at the crank-like member 1082 thereof, the radio wave in the millimeter waveband or 60 gigahertz band, having been converted into the circularly polarized wave, and transmits the reception signal in the form of a linearly polarized wave to the microstrip line 1022 side from the transfer end 1086. Consequently, the reception signal can be transferred to a high frequency circuit not shown.

On the other hand, in the case where the fixed section 1002 serves as the transmission side and the movable section 1004 serves as the reception side, a signal outputted from the microstrip line 1022 of the fixed section 1002 on the transmission side is transmitted in a circularly polarized wave into the waveguide 1012 through the circular polarization probe 1080. The radio wave in the millimeter waveband or 60 gigahertz band of the circularly polarized wave in the waveguide 1012 is transmitted to the waveguide 1014 on the movable section 1004 side and converted into a linearly polarized wave by the polarization conversion section 1030A, and then transmitted to the transmission line coupling section 1208 on the movable section 1004 side. The linear polarization probe 1070 used as the transmission line coupling section 1208 of the movable section 1004 of the reception side can receive the radio wave in the millimeter waveband or 60 gigahertz band, having been converted into the linearly polarized wave, and transfer the reception signal to a high frequency circuit not shown through the microstrip line 1024.

Working Example 3

Figure 15:
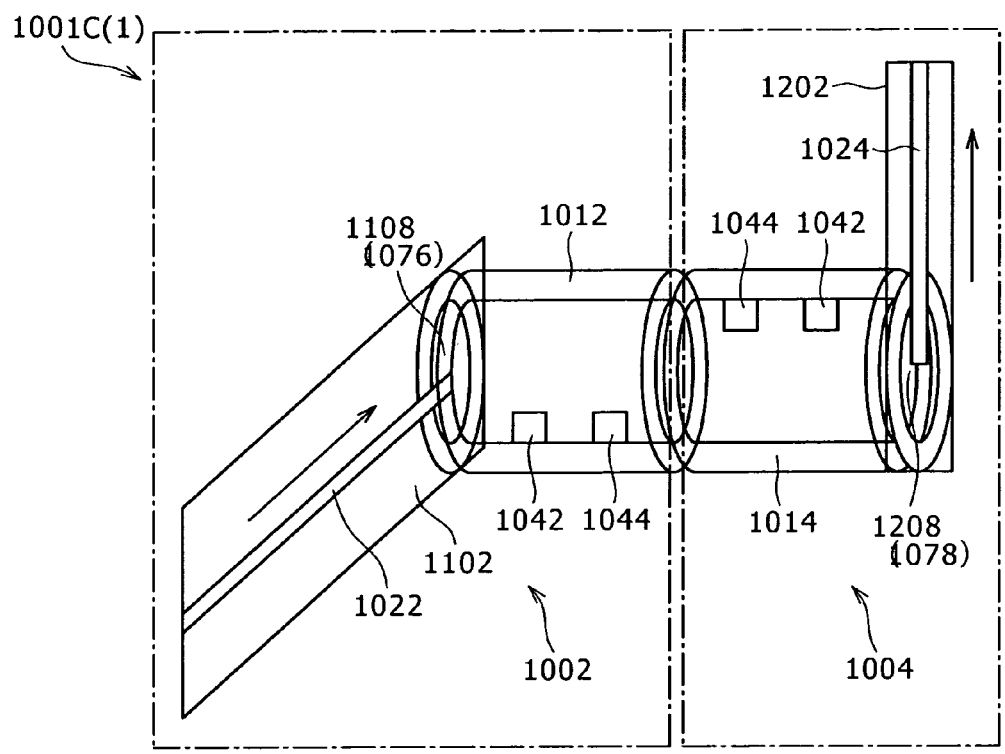
FIGS. 15 and 16 are schematic views showing hinge structures of working examples 3 and 4, respectively.

FIG. 15 shows a hinge structure 1001C of a working example 3. The hinge structure 1001C of the working example 3 is formed such that the mode conversion section 1040 is utilized to convert a signal into a $TM_{01}$ mode to carry out wireless transmission.

For the transmission line coupling section on the transmission side which is one of the transmission line coupling section 1108 and the transmission line coupling section 1208, a $TE_{11}$ mode probe 1176 for inputting a radio wave of the $TE_{11}$ mode to the waveguide, which is the waveguide 1012 in the case where the transmission line coupling section is the transmission line coupling section 1108 but is the waveguide 1014 in the case where the transmission line coupling section is the transmission line coupling section 1208, is used. If a radio wave of the $TE_{11}$ mode is inputted to the waveguide 1012 or the waveguide 1014 from the $TE_{11}$ mode probe 1176, then the $TM_{01}$ mode and the $TE_{21}$ mode are generated by the $TM_{01}$ generating projection 1042. However, the $TE_{21}$ mode is erased by the $TE_{21}$ erasing projection 1044 while the $TM_{01}$ mode and the $TE_{11}$ mode are propagated. For the transmission line coupling section on the reception side which is the other of the transmission line coupling section 1108 and the transmission line coupling section 1208, a waveguide probe 1078 for receiving a radio signal of the $TE_{11}$ mode and a radio signal of the $TM_{01}$ mode from the radio signal transmission line in the waveguide 1012 and the waveguide 1014 is disposed.

FIG. 15 illustrates wireless transmission from the fixed section 1002 side to the movable section 1004 side. If a radio wave of the $TE_{11}$ mode is inputted to the waveguide 1012 from the $TE_{11}$ mode probe 1176 disposed at the transmission line coupling section 1108 on the transmission side, then the $TM_{01}$ mode and the $TE_{21}$ mode are generated by the $TM_{01}$ generating projection 1042, and the $TE_{21}$ mode is erased by the $TE_{21}$ erasing projection 1044 while the $TM_{01}$ mode and the $TE_{11}$ mode are propagated to the transmission line coupling section 1208 side and then received by the waveguide probe 1078.

With the hinge structure 1001C of the working example 3, even if an antenna or waveguide probe of the $TM_{01}$ mode is not used for the transmission line coupling section 1108 or the transmission line coupling section 1208, a signal can be transmitted by the $TM_{01}$ mode by wireless transmission between the waveguide 1012 and the waveguide 1014. Then, since the $TM_{01}$ mode does not include a polarized wave, it can be received even if the hinge is rotated.

Working Example 4

Figure 16:
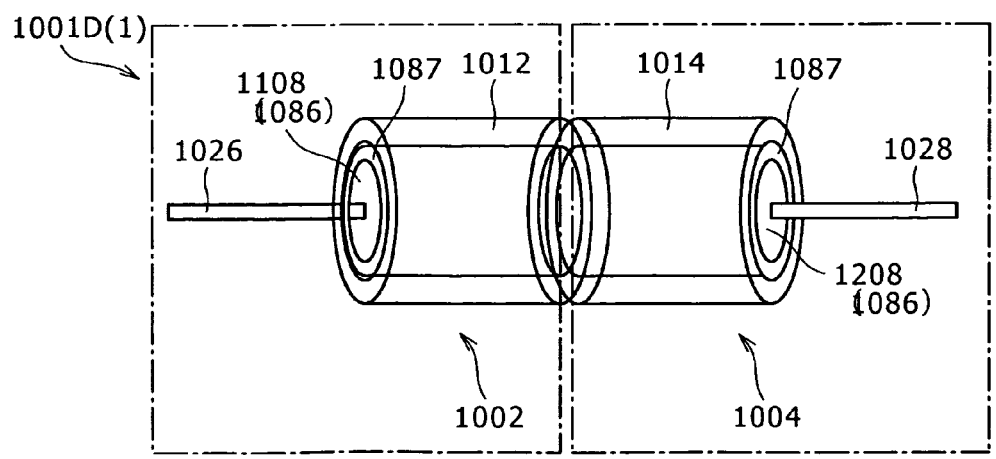

FIG. 16 shows a hinge structure 1001D of a working example 4. The hinge structure 1001D of the working example 4 is characterized in that the $TM_{01}$ mode annular patch antenna 1086 is used as a waveguide probe and a radio wave is introduced directly into the waveguide.

As described above, the $TM_{01}$ mode can be received even if the hinge is rotated because the $TM_{01}$ mode does not include a polarized wave. Here, by adopting the configuration wherein a radio wave is introduced in the $TM_{01}$ mode directly into the waveguide so that the radio wave of the $TM_{01}$ mode is received like the hinge structure 1001D of the working example 4, even in the case where the mode conversion section 1040 is not used, by transmitting a radio signal in the $TM_{01}$ mode in the waveguide, the radio signal can be received even if the hinge is rotated.

Working Example 5

Figure 17A:
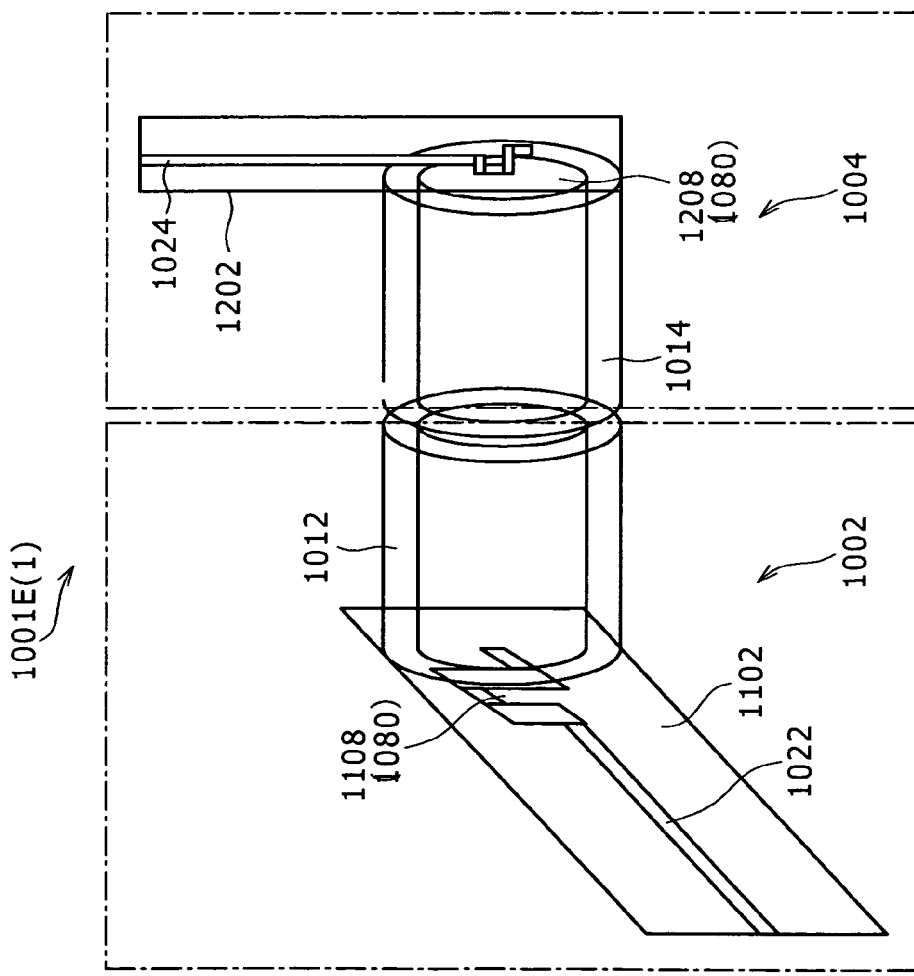
FIGS. 17A and 17B are schematic views showing a hinge structure of a working example 5.
Figure 17B:
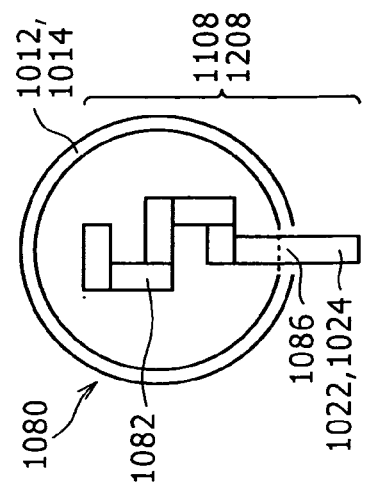

FIGS. 17A and 17B show a hinge structure 1001E of a working example 5. More particularly, FIG. 17A shows a general configuration of the hinge structure 1001E, and FIG. 17B shows an antenna structure for the transmission line coupling section 1108 and the transmission line coupling section 1208 used in the hinge structure 1001E.

Referring to FIGS. 17A and 17B, the hinge structure 1001E of the working example 5 applies one of the configuration examples 1 to 3 of the combination form illustrated in FIG. 4 and uses the circular polarization probe 1080 for both of the transmission line coupling section 1108 and the transmission line coupling section 1208. The waveguide 1014, board 1202, microstrip line 1024 and terminating member 1090 configure the movable section 1004, and a block including the components mentioned and one of the communications rotates as a whole relative to the fixed section 1002 on which the other communication section is mounted.

Though not shown, one of the terminating member 1090 and the radio wave absorber 1092 may be disposed on at least one of the opposite side to the waveguide 1014 with respect to the waveguide 1012 and the opposite side to the waveguide 1012 with respect to the waveguide 1014 as occasion demands. For example, in order to allow a radio wave radiated from the circular polarization probe 1080 to be transmitted with a high efficiency in the advancing direction, the terminating member 1090 having a height H equal to approximately $\lambda/4$, where $\lambda$ is a wavelength, is provided at an end portion of the waveguide 1012 and the waveguide 1014 adjacent the fixed section 1002 and the movable section 1004.

The hinge structure 1001E uses the circular polarization probe 1080 for the transmission line coupling section 1108 of the fixed section 1002 and the transmission line coupling section 1208 of the movable section 1004, and the polarization conversion section 1030 is not applied to any of the waveguide 1012 and the waveguide 1014. The waveguide 1012 and the waveguide 1014 do not require the polarization conversion section 1030 and are simple in structure.

In this manner, the hinge structure 1001E of the working example 5 is structured such that two sets of a waveguide which uses the circular polarization probe 1080 are placed one on the other, and signal transmission is carried out using the waveguide 1012 and the waveguide 1014 which do not include the polarization conversion section 1030. The state of a polarized wave in the course of a flow of a signal in the hinge structure 1001E of the working example 5 of such a configuration as described above, that is, in the course of the transmission antenna→tubular portion→tubular portion→reception antenna, is a linearly polarized wave→transmission in the form of the circularly polarized wave→transmission in the form of the circularly polarized wave→the circularly polarized wave. In particular, a signal is inputted in a circularly polarized wave into one of the waveguide 1012 of the fixed section 1002 and the waveguide 1014 of the movable section 1004 and is transmitted to the waveguide 1012 and then to the waveguide 1014 while it remains in the form of the circularly polarized wave. Then, the signal is coupled to the other one of the waveguide 1012 of the fixed section 1002 and the waveguide 1014 of the movable section 1004. In short, the two waveguides 1012 and 1014 which do not have the polarization conversion section 1030 as a polarization conversion structure are used to carry out transmission of a radio signal making use of a circularly polarized wave.

A flow of a signal in this instance is described particularly. A signal outputted from the microstrip line 1022 or the microstrip line 1024 on the transmission side is converted into a circularly polarized wave by the circular polarization probe 1080 and transmitted into the inside of the waveguide 1012 and the waveguide 1014. The circular polarization probe 1080 on the reception side receives the circularly polarized signal by means of the crank-like member 1082 and then sends the reception signal in the form of a linearly polarized wave to the microstrip line 1024 or the microstrip line 1022 on the reception side from the transfer end 1086. Consequently, the reception signal can be passed to a high frequency signal not shown.

Working Example 6

Figure 18:
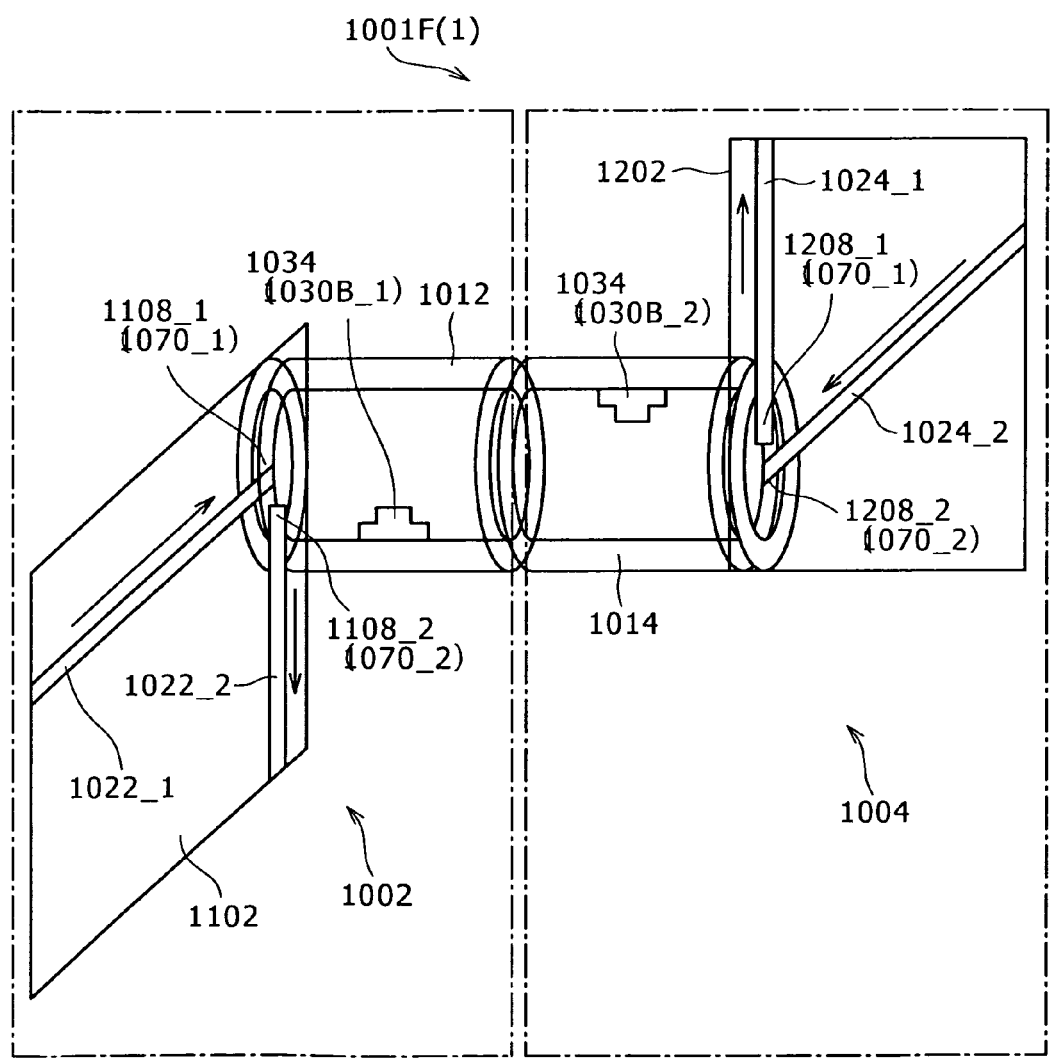
FIG. 18 is a schematic view showing a hinge structure of a working example 6.

FIG. 18 shows a hinge structure 1001F of a working example 6 and shows a general configuration of the hinge structure 1001F. The hinge structure 1001F of the working example 6 is characterized in that orthogonally polarized waves including a right-handed circularly polarized wave and a left-handed circularly polarized wave are utilized such that, while a same carrier frequency is used, a doubled amount of information can be transmitted by communication by two systems in the same direction or by bidirectional communication without applying time division multiplexing, frequency division multiplexing or any other multiplexing method.

FIG. 18 shows an example wherein the form shown in FIG. 8A-3c which utilizes the linear polarization probe 1070 and the polarization conversion section 1030B is adopted and the linear polarization probe 1070_1 is used for the right-handed circularly polarized wave while a linear polarization probe 1070_2 is used for the left-handed circularly polarized wave to carry out bidirectional communication.

For example, in signal transmission from the fixed section 1002 side to the movable section 1004 side, an electric signal in the millimeter waveband transmitted from the signal processing circuit not shown through a microstrip line 1022_1 is converted into a radio signal by the linear polarization probe 1070_1 used in a transmission line coupling section 1108_1 and then supplied to the waveguide 1012. Then, the radio signal is converted into a circularly polarized wave by the polarization conversion section 1030B_1, particularly by the metal projection 1034 and then supplied to the waveguide 1014. Then, the circularly polarized wave is converted back into a linearly polarized wave by a polarization conversion section 1030B_2, particularly the metal projection 1034, of the waveguide 1014 and then received and converted back into an electric signal by the linear polarization probe 1070_1 used in the transmission line coupling section 1208_1. Then, the electric signal is supplied to a signal processing circuit not shown through a microstrip line 1024_1.

In signal transmission from the movable section 1004 side to the fixed section 1002 side, an electric signal in the millimeter waveband transmitted from the signal processing circuit not shown through a microstrip line 1024_2 is converted into a radio signal by the linear polarization probe 1070_2 used in a transmission line coupling section 1108_2 and then supplied to the waveguide 1014. Then, the radio signal is converted into a circularly polarized wave by the polarization conversion section 1030B_2, particularly by the metal projection 1034 and then supplied to the waveguide 1012. Then, the circularly polarized wave is converted back into a linearly polarized wave by a polarization conversion section 1030B_1, particularly the metal projection 1034, of the waveguide 1012 and then received and converted back into an electric signal by the linear polarization probe 1070_2 used in the transmission line coupling section 1108_2. Then, the electric signal is supplied to a signal processing circuit not shown through a microstrip line 1022_2.

It is to be noted that the example shown is a mere example, and also a different probe or antenna form which produces orthogonally polarized waves including a right-handed circularly polarized wave and a left-handed circularly polarized wave can be adopted. For example, also a form of a combination of the linear polarization probe 1070 shown in FIG. 8B-3c and the polarization conversion section 1030B or another form wherein the circular polarization probe 1080_1 for a right-handed wave shown in FIG. 5B-1 and the circular polarization probe 1080_2 shown in FIG. 5B-5 are combined can be adopted.

Working Example 7

Figure 19A:
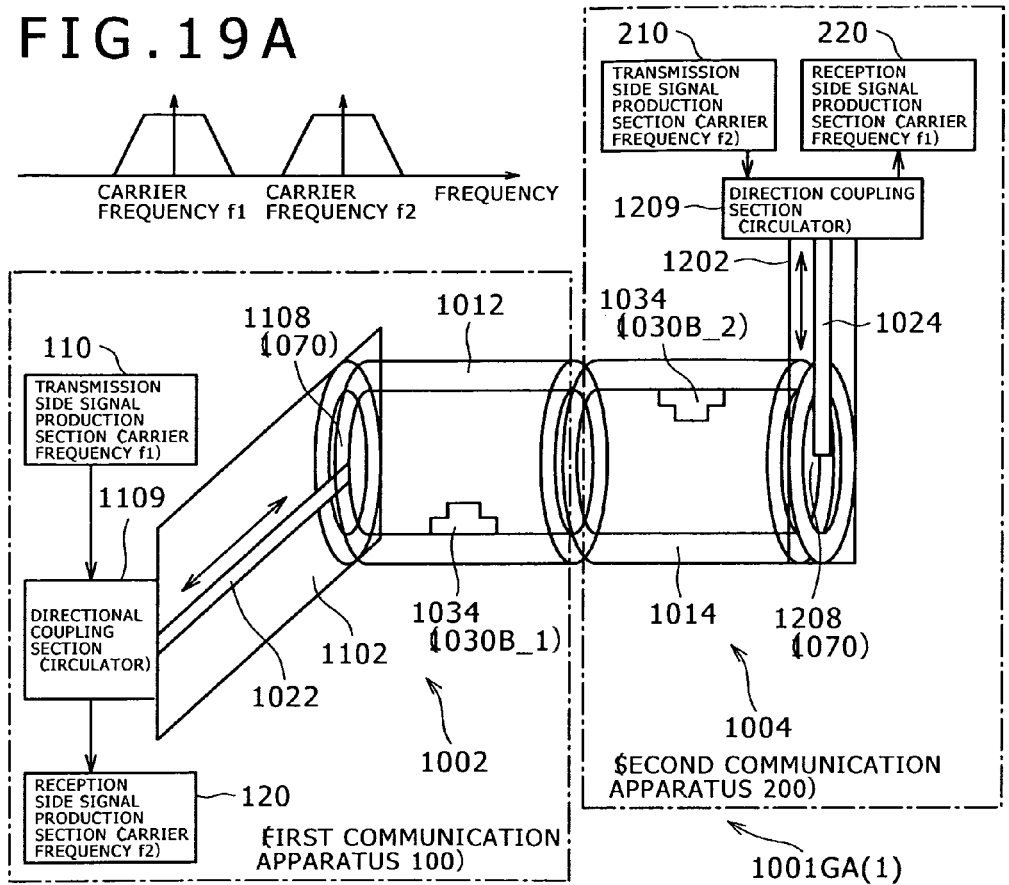
FIGS. 19A and 19B are schematic views showing a hinge structure of a working example 7.
Figure 19B:
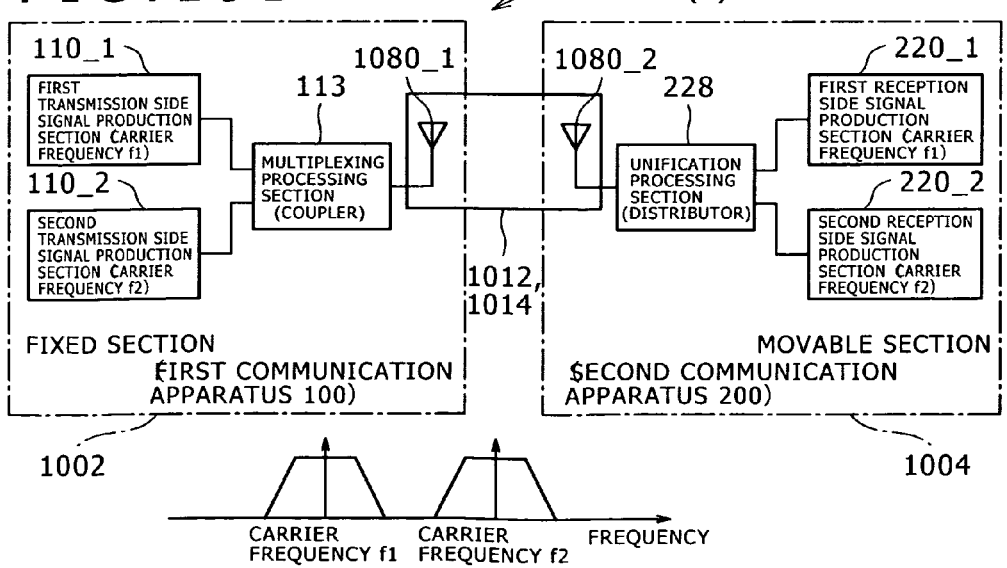

FIGS. 19A and 19B show hinge structures 1001G of a working example 7. More particularly, FIG. 19A shows a general configuration of a hinge structure 1001GA of a first example of the working example 7. FIG. 19B shows a functional configuration of a hinge structure 1001GB of a second example of the working example 7.

The hinge structures 1001G of the working example 7 are characterized in that time division multiplexing or frequency division multiplexing is utilized to achieve transmission of a doubled amount of information such as communication by two systems in the same direction or bidirectional communication without applying orthogonally polarized waves including a right-handed circularly polarized wave and a left-handed circularly polarized wave.

First Example

For example, the hinge structure 1001GA of the first example shown in FIG. 19A is configured such that a transmission section and a reception section are disposed on both of the fixed section 1002 and the movable section 1004 and the sets of the transmission section and the reception section use different carrier frequencies to carry out full duplex bidirectional communication. FIG. 19A shows a configuration wherein one transmission section and one reception section are disposed on each of the fixed section 1002 and the movable section 1004. The transmission sections and the reception sections apply, for example, an injection locking method.

For example, the first communication apparatus 100 including a transmission side signal production section 110 and a reception side signal production section 120 is disposed on the fixed section 1002, and the second communication apparatus 200 including a transmission side signal production section 210 and a reception side signal production section 220 is disposed on the movable section 1004. A directional coupling section 1109 formed utilizing a circulator which is an example of an antenna changeover section is disposed between the microstrip line 1022 and the transmission side signal production section 110 and reception side signal production section 120. Also between the microstrip line 1024 and the transmission side signal production section 210 and reception side signal production section 220, a directional coupling section 1209 formed utilizing a circulator which is an example of an antenna changeover section is disposed.

In order to achieve full duplex bidirectional transmission, different frequencies are applied as reference carrier signals to the individual sets of a transmission section and a reception section between which a signal is to be transmitted. For example, the set of the transmission side signal production section 110 and the reception side signal production section 220 uses a first carrier frequency f1 while the set of the transmission side signal production section 210 and the reception side signal production section 120 uses a second carrier frequency f2 which is not equal to the first carrier frequency f1. For the antennae of the transmission line coupling section 108 and the transmission line coupling section 208, for example, the linear polarization probe 1070 is used. The circular polarization probe 1080 may be used in place of the linear polarization probe 1070.

In signal transmission from the fixed section 1002 side to the movable section 1004 side, a millimeter wave signal of the first carrier frequency f1 produced by the transmission side signal production section 110 of the fixed section 1002 side is transmitted to the linear polarization probe 1070 used for the transmission line coupling section 1108 through the directional coupling section 1109 and then transmitted by wireless transmission in a linearly polarized wave in the waveguide 1012 and the waveguide 1014. On the movable section 1004 side of the reception side, the millimeter wave signal in the form of a linearly polarized wave is received by the linear polarization probe 1070 used in the transmission line coupling section 1208 and is supplied to the reception side signal production section 220 through the directional coupling section 1209. The reception side signal production section 220 produces a reproduction carrier signal synchronized by injection locking with the first carrier frequency f1 used for the modulation by the transmission side signal production section 110 and demodulates the received millimeter wave signal.

On the contrary, in signal transmission from the movable section 1004 side to the fixed section 1002 side, a millimeter wave signal of the second carrier frequency f2 produced by the transmission side signal production section 210 of the movable section 1004 side is transmitted to the linear polarization probe 1070 used in the transmission line coupling section 1208 through the directional coupling section 1209 and then transmitted by wireless transmission in the form of a linearly polarized wave in the waveguide 1014 and the waveguide 1012. On the fixed section 1002 side of the reception side, the millimeter wave signal in the form of a linearly polarized wave is received by the linear polarization probe 1070 used in the transmission line coupling section 1108 and is supplied to the reception side signal production section 120 through the directional coupling section 1109. The reception side signal production section 120 produces a reproduction carrier signal synchronized by injection locking with the second carrier frequency f2 used for the modulation by the transmission side signal production section 210 and demodulates the received millimeter wave signal.

In this manner, with the first example of the working example 7, full duplex bidirectional communication by which different signals are transmitted in the opposite directions to each other can be implemented without causing an interference problem by application of frequency division multiplexing using the two carrier frequencies of the first carrier frequency f1 and the second carrier frequency f2.

Second Example

The hinge structure 1001GB of the second example shown in FIG. 19B is configured such that one of the fixed section 1002 and the movable section 1004 is determined as the transmission side while the other is determined as the reception side and, for transmission in the same direction, N transmission section are disposed on the transmission side while N reception sections are disposed also on the reception side such that the sets of a transmission section and a reception section use individually different carrier frequencies from each other. It is to be noted that N is a positive integer equal to or greater than 2, and FIG. 19B shows an example where N is 2 and the fixed section 1002 is determined as the transmission side while the movable section 1004 is determined as the reception section. The transmission section and the reception section apply an injection locking method.

For example, the first communication apparatus 100 including a first transmission side signal production section 110_1 and a second transmission side signal production section 110_2, is disposed on the fixed section 1002 and the second communication apparatus 200 including a first reception side signal production section 220_1 and a second reception side signal production section 220_2 is disposed on the movable section 1004. The set of the first transmission side signal production section 110_1 and the first reception side signal production section 220_1 uses the first carrier frequency f1 while the set of the second transmission side signal production section 1102 and the second reception side signal production section 2202 use the second carrier frequency f2 different from the first carrier frequency f1. As the antennae of the transmission line coupling section 108 and the transmission line coupling section 208, for example, the circular polarization probe 1080 is used. The linear polarization probe 1070 may be used in place of the circular polarization probe 1080.

A millimeter wave signal of the first carrier frequency f1 produced by the first transmission side signal production section 110_1 and a millimeter wave signal of the second carrier frequency f2 produced by the second transmission side signal production section 110_2 are coupled into one system by a coupler which is an example of the multiplexing processing section 113 and then transmitted in a circularly polarized wave into the waveguide 1012 and the waveguide 1014 through the circular polarization probe 1080 of the transmission line coupling section 108. The circular polarization probe 1080 on the reception side receives the millimeter wave signal in the form of a circularly polarized wave and separates the millimeter wave signal into two systems by means of a distributor which is an example of the unification processing section 228. The separated millimeter signals are supplied to the first reception side signal production section 220_1 and the second reception side signal production section 220_2. The first reception side signal production section 220_1 produces a reproduction carrier signal synchronized by injection locking with the first carrier frequency f1 used for the modulation by the first transmission side signal production section 110_1 and demodulates the received millimeter signal. Meanwhile, the second reception side signal production section 220_2 produces a reproduction carrier signal synchronized by injection locking with the second carrier frequency f2 used for the modulation by the second transmission side signal production section 110_2 and demodulates the received millimeter signal.

In this manner, in the second example of the working example 7, the two carrier signals including the first carrier frequency f1 and the second carrier frequency f2 can be used to implement frequency division multiplexing transmission, by which signals different from each other are transmitted in the same direction, without causing a problem of interference.

Working Example 8

Figure 20A:
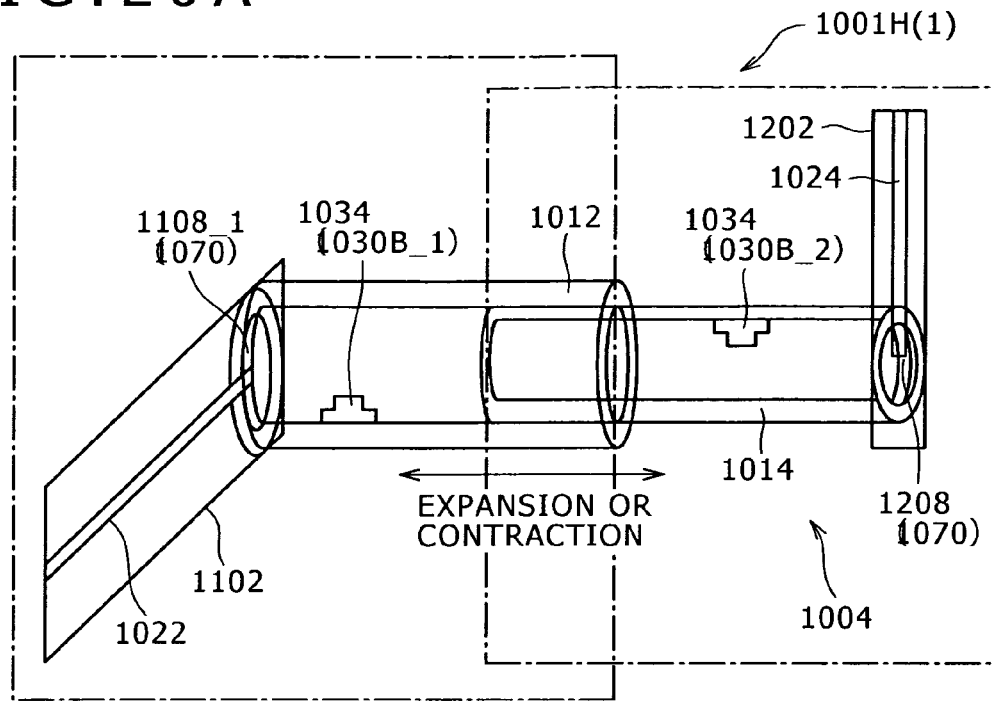
FIGS. 20A and 20B are schematic views showing a hinge structure of a working example 8.
Figure 20B:
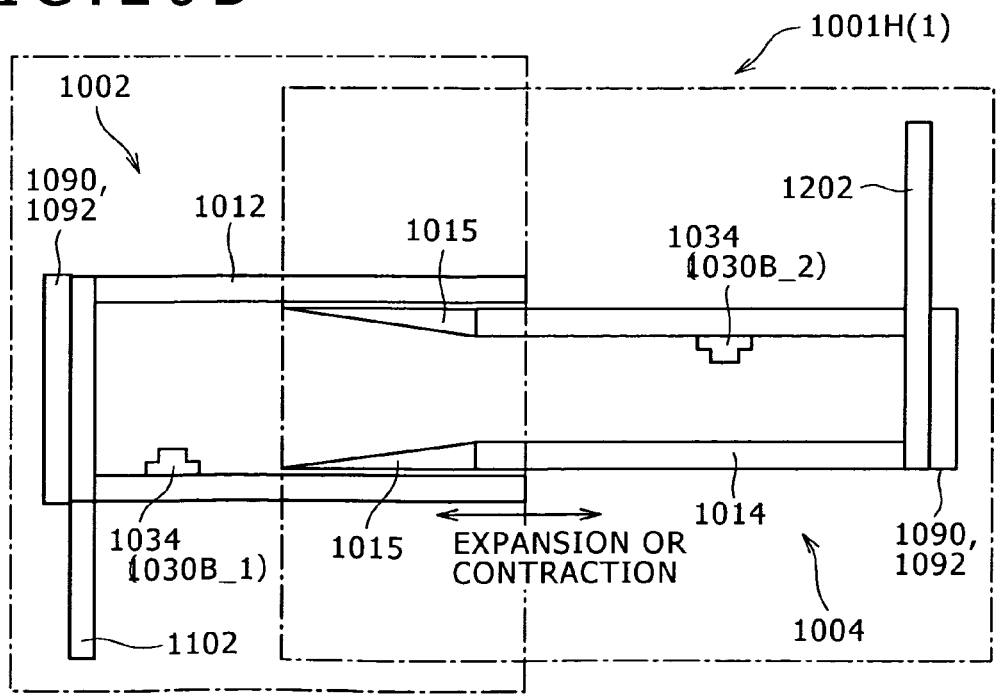

FIGS. 20A and 20B show a hinge structure 1001H of a working example 8. More particularly, FIG. 20A is a perspective view showing a general configuration of the hinge structure 1001H, and FIG. 20B is a side sectional view showing the general configuration of the hinge structure.

The hinge structure 1001H of the working example 8 is characterized in that it has a structure whose length can be varied in the longitudinal direction of the waveguide, or in other words, it has an expansible and contractible hinge structure. In the example shown, the waveguide 1012 on the fixed section 1002 has a sectional size greater than that of the waveguide 1014 of the movable section 1004 while the inner diameter of the waveguide 1012 and the outer diameter of the waveguide 1014 are substantially equal to each other. Further, the outer wall of the waveguide 1014 is slidable (insertable and removable) along the inner wall of the waveguide 1012.

Preferably, a connecting portion 1015 at an end of the waveguide 1014 with the waveguide 1012 is tapered toward the waveguide 1012 as seen in FIG. 20B. By the tapered configuration, a radio wave having propagated in the waveguide 1014 can be propagated smoothly into the waveguide 1012, and a radio wave having propagated in the waveguide 1012 can be propagated smoothly into the waveguide 1014.

Working Example 9

Figure 21:
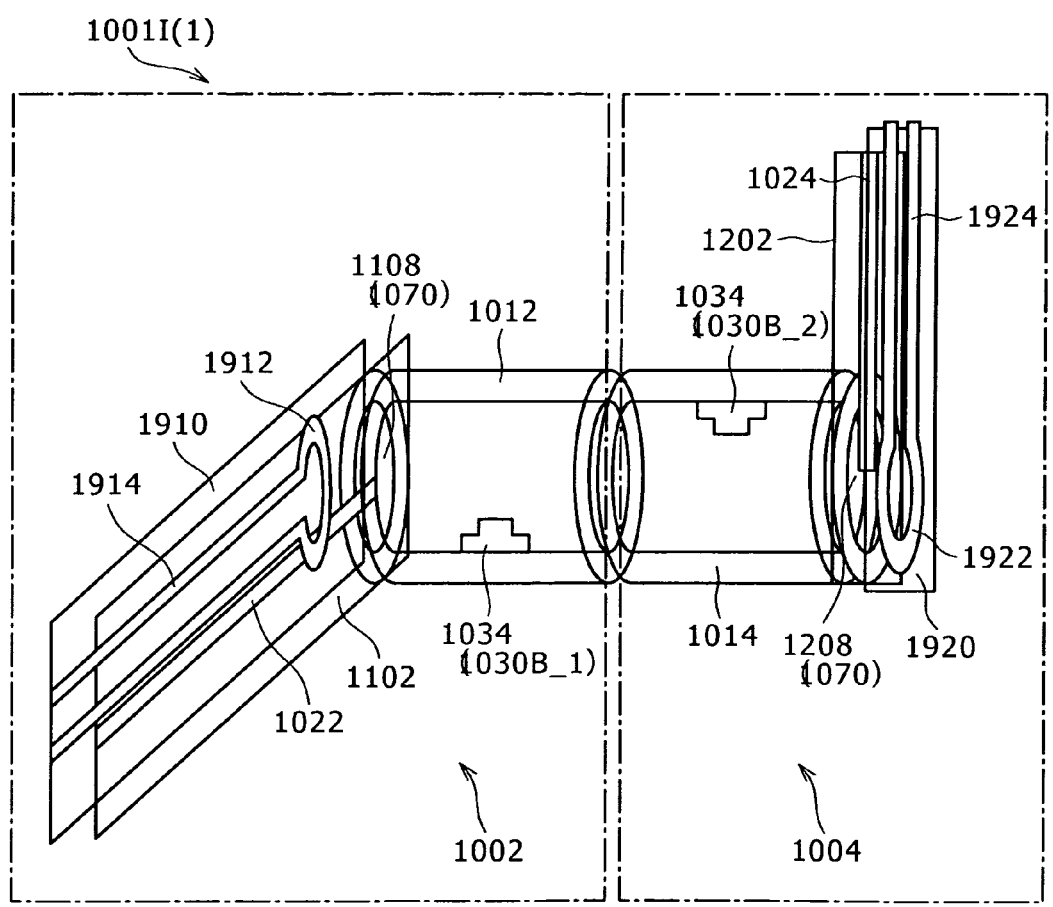
FIGS. 21 and 22 are schematic views showing hinge structures of working examples 9 and 10, respectively.

FIG. 21 shows a general configuration of a hinge structure 1001I of a working example 9.

The hinge structure 1001I of the working example 9 is characterized in that it has a form wherein the signal transmission apparatus 1B of the second example is applied to the hinge structure 1001 of any of the working examples 1 to 8, that is, not only a signal of an object of transmission but also power are supplied by wireless transmission to the opposite party. For wireless transmission of power, any of the radio wave reception type, electromagnetic induction type, resonance type and so forth can be applied as described hereinabove. However, FIG. 21 illustrates a case wherein the electromagnetic induction type or the resonance type wherein a coil for power transmission is used is applied on the basis of the hinge structure 1001A of the working example 1.

For example, a power transmitting coil 1912 on the fixed section 1002 side is formed in a pattern, which is shown in the form of a one-turn coil for the convenience of illustration in FIG. 21, on a board 1910. The power transmitting coil 1912 is connected to a power circuit not shown, which is a power supplying section on the transmission side or a power reception section on the reception side, through a lead pattern 1914. A power transmitting coil 1922 on the movable section 1004 side is formed in a pattern, which is shown in the form of a one-turn coil for the convenience of illustration in FIG. 21. The power transmitting coil 1922 is connected to a power circuit not shown, which is a power supplying section on the transmission side or a power reception section on the reception side, through a lead pattern 1924.

By adopting a method wherein not only a transmission object signal is transmitted by wireless transmission but also power is transmitted contactlessly like the hinge structure 1001I of the working example 9, the necessity for an interface through an electric wiring line or a terminal is reduced sufficiently and a cable-free apparatus configuration can be achieved. Thus, all signals including power supply can be transmitted from the fixed section 1002 side to the movable section 1004 side or reversely from the fixed section 1002 side to the movable section 1004 side by wireless transmission.

Working Example 10

Figure 22:
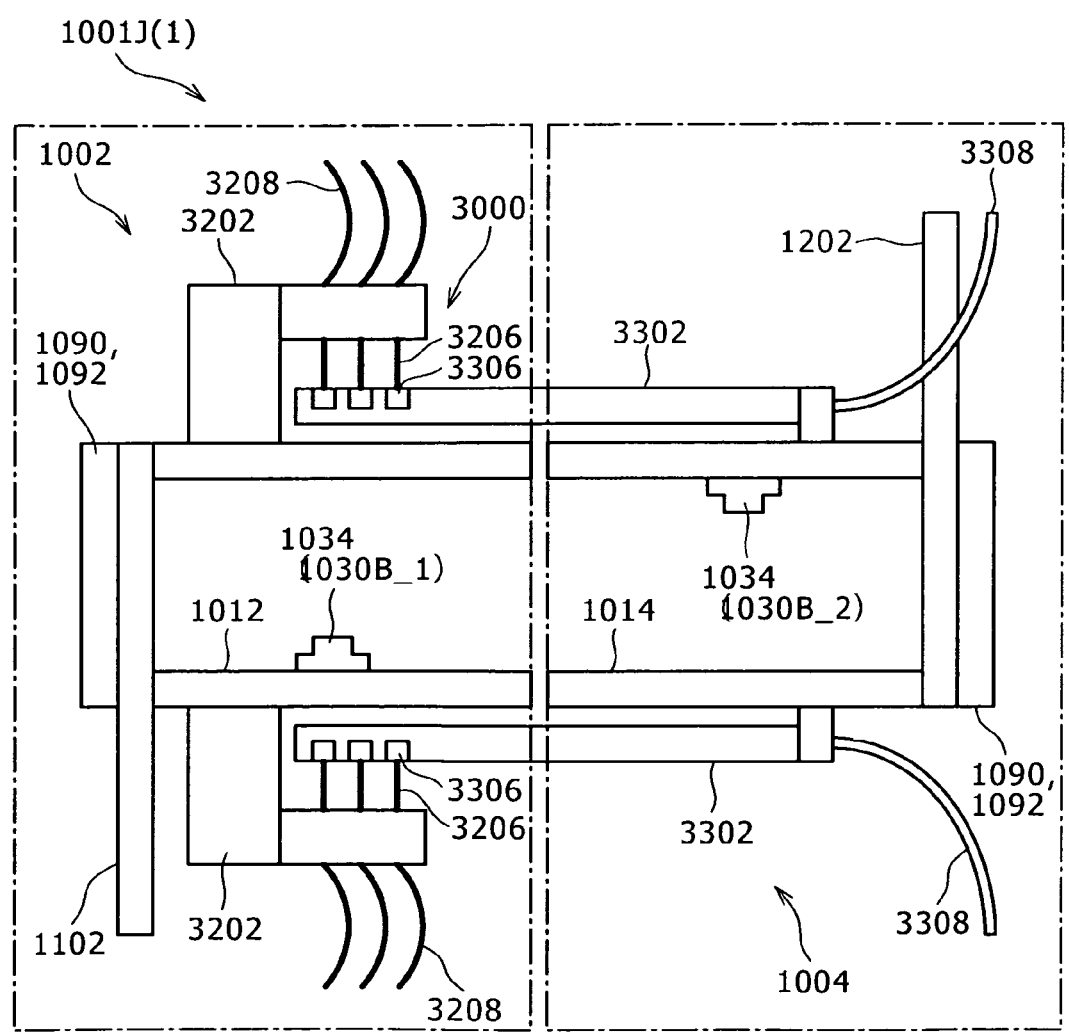

FIG. 22 shows a general configuration of a hinge structure 1001J of a working example 10.

The hinge structure 1001J of the working example 10 indicates an example of a particular technique for power supply in the case where the signal transmission apparatus 1A of the first example is applied to the hinge structure 1001 of one of the working examples 1 to 8, or in other words, power is not transmitted by wireless transmission. In order for a hinge structure to transmit a transmission object signal or power to the housing of the opposite party without depending upon wireless transmission or a radio wave, it is a first possible idea to use an electric wiring line such as a flexible printed board (FPC) or a cable. However, in this instance, disconnection or layout of an electric wiring line matters. For example, when a transmission object signal is transmitted by wireless transmission in a waveguide formed utilizing a cavity of a hinge structure, if an electric wiring line is laid in the waveguide of the hinge structure, then there is a difficulty in that, by inadvertent movement of the electric wiring line, the transmission line of a radio wave is blocked readily and the communication is disturbed. Further, it is desirable to provide a margin to the dimension of the space or waveguide as the transmission line of a radio wave, and this disturbs miniaturization of the housing of the hinge structure.

As a countermeasure, the working example 10 adopts not an electric wiring line but a mechanical connection using a slip ring mechanism configured from a fixed conductor in the form of a fixed brush or a fixed electrode and a rotary conductor in the form of a rotary brush or a rotary electrode. As seen in FIG. 22, on the fixed section 1002 side, the waveguide 1012 is attached to a fixed side base 3202. On the movable section 1004 side, a rotary side base 3302 is attached to the waveguide 1014, and the waveguide 1014 and the rotary side base 3302 can integrally rotate around the rotational shaft of the hinge mechanism.

The slip ring mechanism 3000 includes fixed conductors and rotatable conductors and can carry out electric connection of a signal or power, which is not transmitted by a radio wave, by contact between the fixed conductor and the rotatable conductor. As an example, a cylindrical portion 3204 is provided on the fixed side base 3202 in such a manner as to surround the outer periphery of the waveguide 1012, and fixed brushes 3206 are attached to part of an inner periphery of the cylindrical portion 3204. The fixed brushes 3206 are connected to leads 3208 through wiring line patterns not shown. Meanwhile, a cylindrical portion 3304 is provided on the rotary side base 3302 in such a manner as to surround the outer periphery of the waveguide 1014 and the waveguide 1012, and rotary electrodes 3306 are attached to a portion of the inner periphery of the cylindrical portion 3304 corresponding to the fixed brushes 3206 such that the contact with the fixed brushes 3206. The rotary electrodes 3306 are connected to leads 3308 through wiring line patterns not shown. The rotary electrodes 3306 are configured from a conductor member provided circumferentially along an outer circumferential edge of the rotary side base 3302. FIG. 22 shows an example wherein three pairs of a fixed brush 3206 and a rotary electrode 3306 are provided. However, an arbitrary number of such pairs may be provided.

In the hinge structure 1001J of the working example 10 having such a configuration as described above, power supply from the fixed section 1002 to the movable section 1004 or reversely from the movable section 1004 to the fixed section 1002 is carried out through the slip ring mechanism 3000. Data of a large amount such as a video image signal acquired by the fixed section 1002 or various kinds of control information for controlling the components of the movable section 1004 or acquired by the movable section 1004 side are transmitted by a radio wave in the millimeter waveband or a waveband in the proximity of the millimeter waveband through the waveguide 1012 and the waveguide 1014. In the case where the rotational angle of the hinge structure is great such as an angle, for example, greater than 90 degrees, wireless transmission in the waveguide 1012 and then in the waveguide 1014 is carried out preferably using a circularly polarized wave. By this, even where the rotational angle of the movable section 1004 with respect to the fixed section 1002 is made greater, an image signal of a high resolution and high picture quality and control information can be transmitted without any problem. Thus, high speed wireless data transmission between the fixed section 1002 and the movable section 1004 can be implemented, and there is no possibility that the data transmission may be influenced by communication disturbance by an electric wiring line. Incidentally, some of the pairs of the fixed brush 3206 and the rotary electrode 3306 may be utilized for wire transmission of a transmission object signal such as a signal which may be transmitted at a low rate and by a small amount.

Working Example 11

The signal transmission apparatus 1 or the hinge structure 1001 described hereinabove can be distributed as the hinge structure 1001 including the signal transmission apparatus 1, which is a form of a module and may include the rotational driving section 1060 or can be distributed also in the form of a commodity mounted in an electronic instrument which includes such hinge structure 1001 as described above. For example, the signal transmission apparatus 1 or the hinge structure 1001 can be utilized as a connection section utilizing a hinge structure at a connecting point between a first housing such as a housing on the main body side and a second housing such as, for example, a housing of a display unit or an operation panel, for example, in a portable telephone set, a notebook type personal computer, a video camera or video movie, an electronic book, an electronic dictionary, an electronic notebook or a portable game machine. In the following, several product examples of an electronic instrument to which the hinge structure 1001 can be applied are described below.

Electronic Instrument

First Example

Figure 23A:
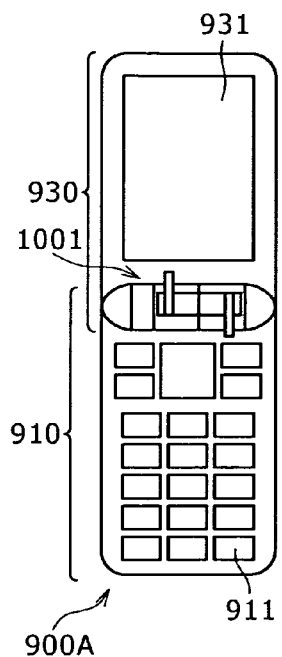
FIGS. 23A to 23C are schematic views showing a first product example of an electronic instrument to which a hinge structure is applied.
Figure 23C:
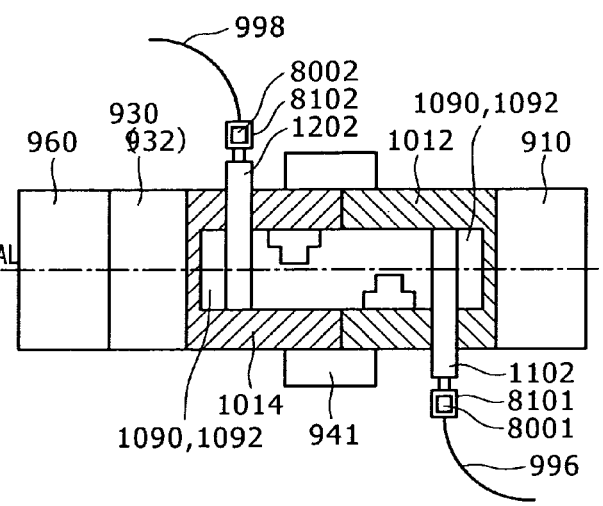
Figure 23B:
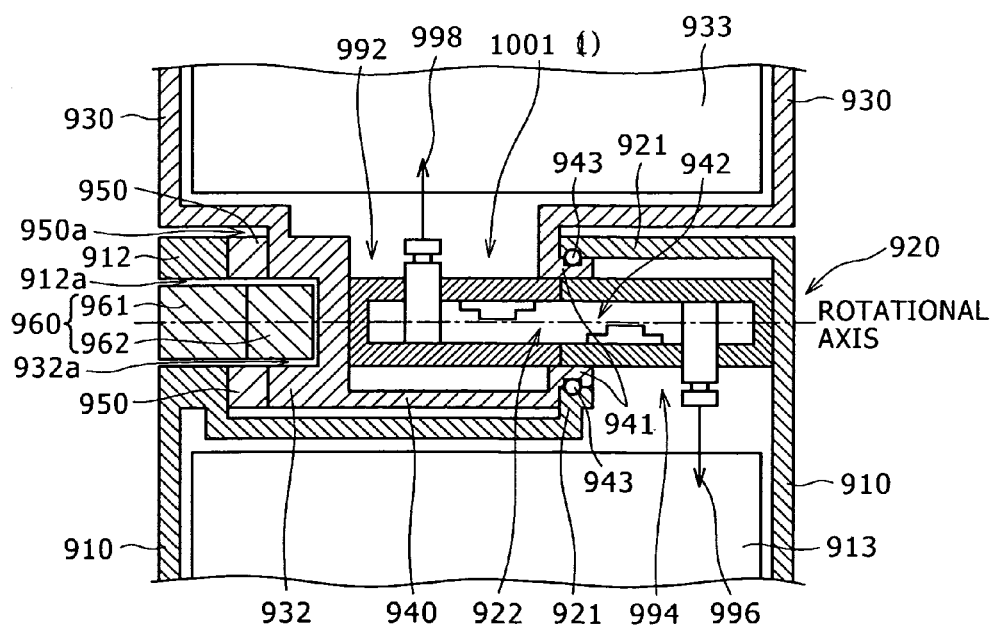

FIGS. 23A to 23C show a first product example of an electronic instrument to which the hinge structure 1001 can be applied. More particularly, FIG. 23A shows a general configuration of the electronic instrument of the first example. FIG. 23B shows a partial cross section of a connection section of the electronic instrument of the first example. FIG. 23C schematically shows the hinge structure 1001 of FIG. 23B.

In the first product example, the hinge structure 1001 of the present embodiment is applied to a portable telephone set. It is to be noted that FIG. 23B is a figure based on FIG. 2 of Japanese Patent No. 4079126 and includes similar components to those shown in the FIG. 2 although reference numerals same as those in the FIG. 2 are applied with the numeral 9 added to the top of each reference numeral such that the components are individually represented by three digits. In the following, description is given of principal components. Referring first to FIG. 23A, the portable telephone set 900A which is an example of an electronic instrument includes an operation section housing 910 having an operation section 911 as a first housing and a display section housing 930 having a display section 931 as a second housing. Referring now to FIG. 23B, the operation section housing 910 has a shape of a flat plate and a printed wiring board 913 and other apparatus accommodated in the inside thereof. Similarly, the display section housing 930 has a shape of a flat plate and has a printed wiring board 933 and other apparatus accommodated in the inside thereof.

The hinge structure 1001 is configured between the operation section housing 910 and the display section housing 930, and the operation section housing 910 and the display section housing 930 are connected by the hinge structure 1001 such that they are folded and placed one on the other. The operation section housing 910 and the display section housing 930 of the portable telephone set 900A are connected for pivotal folding movement to each other by the hinge structure 1001. The hinge structure 1001 is structured such that the two waveguides 1012 and 1014 are juxtaposed coaxially with an axis of the pivotal folding movement, and the transmission line coupling section 1108 having an antenna structure is disposed at an end portion of the waveguide 1012 while the transmission line coupling section 1208 having an antenna structure is disposed at an end portion of the waveguide 1014 thereby to configure the signal transmission apparatus 1. A radio signal transmission line of a waveguide structure is formed at the connection section between the operation section housing 910 and the display section housing 930 such that wireless communication is carried out in a frequency band of a radio signal between transmission and reception sections.

In particular, the hinge structure 1001 in which the waveguide 1012 and the waveguide 1014 are integrated into a single waveguide and used as a waveguide section over a region from a cavity section 992 provided at the connection section on the display section housing 930 side or a display section side bearing 932 side to a cavity section 994 provided at the connection section on an operation section tubular portion 920 side is disposed in the cavity, that is, in the cavity section 992 and the cavity section 994. More particularly, referring to FIG. 23C, the waveguide 1012 of the hinge structure 1001 is provided over the range from the cavity section 992 provided at the connection section on the display section housing 930 side to an inner tubular portion 941. Further, the cavity section 994 provided at the connection section on the operation section tubular portion 920 side and the waveguide 1014 of the hinge structure 1001 are provided such that a circumferential section thereof is opposed to a circumferential section of the waveguide 1012. The waveguide 1014 is secured at an end portion thereof remote from the waveguide 1012 to the operation section tubular portion 930 through a fixing member. The waveguide 1012 is secured at an end portion thereof remote from the waveguide 1014 to the display section housing 930 through a fixing member. The fixing member has a function for adjustment of the length when the waveguide 1012 or the waveguide 1014 is secured to a corresponding housing. As described hereinabove in connection with the working examples 1 to 10 of the hinge structure 1001, the terminating member 1090 or the radio wave absorber 1092 is provided for each end portion of the waveguide 1012 and the waveguide 1014 as occasion demands.

The board 1102 of the waveguide 1012 side is connected to a board 8101 on which a communication chip 8001 is mounted. The board 8101 is connected to the printed wiring board 913 on the operation section 911 side, which corresponds to the LSI functioning section 104, through a wire harness 996. Preferably, the communication chip 8001 is provided on the board 1102 on which the transmission line coupling section 1108 is disposed while the first signal processing section, that is, the communication chip 8001, and the transmission section, that is, the transmission line coupling section 1108, are disposed on the first board, that is, the board 1102, and provided in the first housing, that is, the operation section housing 910. The board 1202 on the waveguide 1014 side is connected to a board 8102 on which a communication chip 8002 is mounted, and the board 8102 is connected to the printed wiring board 933 on the display section 931 side, which corresponds to the LSI functioning section 204, through a wire harness 998. Preferably, the communication chip 8002 is provided on the board 1202 on which the transmission line coupling section 1208 is provided while the second signal processing section, that is, the communication chip 8002, and the reception section, that is, the transmission line coupling section 1208, are disposed on the second board, which is the board 1202, and provided in the second housing, that is, in the display section housing 930. In other words, it is recommendable to place a transmission line coupling section including an antenna and so forth and a communication chip on an integral board on both of the operation section side and the display section side. If the communication chip 8001 includes one of the semiconductor chip 103 and the semiconductor chip 203 described hereinabove while the communication chip 8002 includes the other of the semiconductor chip 103 and the semiconductor chip 203, then the hinge structure 1001 has a configuration for one-way communication. If both of the communication chip 8001 and the communication chip 8002 include both of the semiconductor chip 103 and the semiconductor chip 203, then the hinge structure 1001 has a configuration for bidirectional communication.

It is to be noted that, while, in the example described above, the two waveguides disposed in the cavity section of the hinge structure 1001 are coaxial with the center axis for opening and closing movement, the hinge structure 1001A may be configured such that a plurality of housings can be folded around a center axis for opening and closing movement and is not limited to that described above. For example, the hinge structure 1001A can be applied also to such a configuration that a first housing and a second housing are connected to each other by a connection section which makes use of a ball joint or the like such that not only a folding movement but also a twisting movement can be carried out. In this instance, the connection section is formed as a two-axis hinge mechanism by which the first and second housings can be folded around a center axis for opening and closing movement and can be rotated around a center axis for vertical rotation which is perpendicular to the center axis for opening and closing movement. Then, in order to allow wireless communication by a radio wave between the two housings even in the case where the housings are displaced relative to each other, it is recommendable to provide a transmission line coupling section, particularly, for example, an antenna mechanism is provided for each of the first and second housings and provide waveguides on the center axis for opening and closing movement and the center axis for vertical rotation such that they are arranged in an L shape so as to form the radio signal transmission line 9 as a transmission line for a radio wave while a reflecting plate is provided at an intersecting point of the two center axes.

Electronic Instrument

First Modification to the First Example

Figure 24:
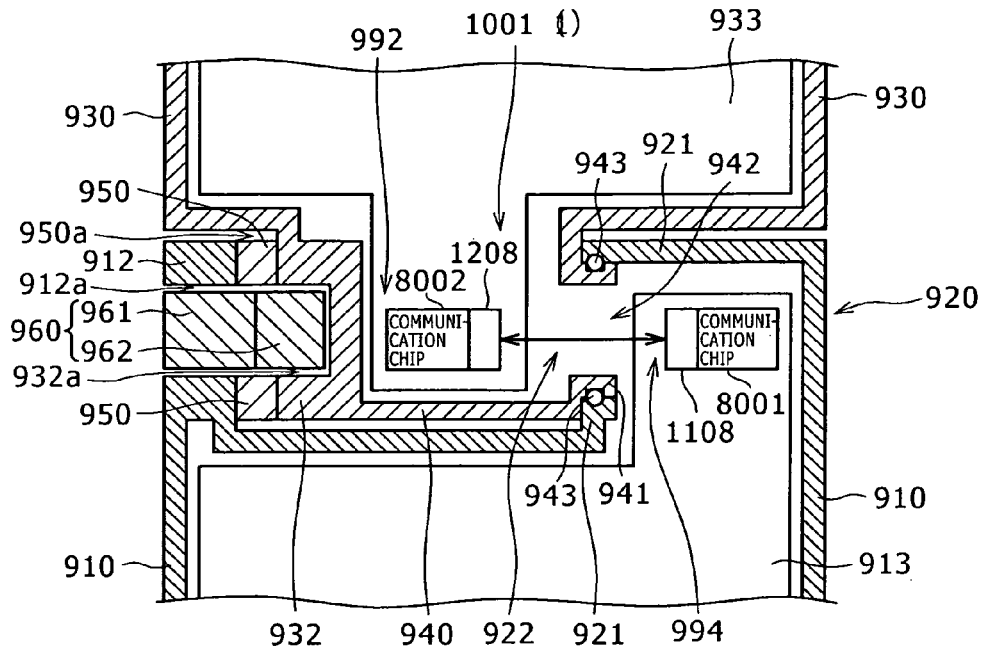
FIGS. 24, 25 and 26 are schematic views showing first, second and third modifications to the first product example of an electronic instrument to which a hinge structure is applied.

FIG. 24 shows a first modification to the first product example of an electronic instrument to which the hinge structure 1001 is applied. The first modification to the first product example utilizes the cavity itself of the hinge structure 1001 as a radio wave signal transmission line. The first communication section including the transmission section and the signal processing section on the transmission side is disposed on the first printed wiring board provided in the inside of the first housing while the second communication section including the reception section and the signal processing section on the reception side is disposed on the second printed wiring board provided in the inside of the second housing. The transmission section and the reception section transmit a transmission object signal by a radio wave to each other through an assembled portion of an opening portion of the first tubular portion and an opening portion of the second tubular portion, that is, at the cavity portion of the connection section of the hinge structure 1001.

For example, the communication chip 8001 and the transmission line coupling section 1108 are provided on the printed wiring board 913 of the operation section housing 910 side while the communication chip 8002 and the transmission line coupling section 1208 are provided on the printed wiring board 933 of the display section housing 930 side. The printed wiring board 913 is disposed such that it extends up to the cavity section 992 of the connection section of the hinge structure 1001. The printed wiring board 933 is disposed such that it extends up to the cavity section 994 of the connection section of the hinge structure 1001. The antenna structure of the transmission line coupling section 1108 and the transmission line coupling section 1208 may be any antenna structure only if it has directivity from the transmission line coupling section 1108 to the transmission line coupling section 1208, or reversely from the transmission line coupling section 1208 to the transmission line coupling section 1108, and, for example, a rod antenna is used. The transmission line coupling section 1108 and the transmission line coupling section 1208 are disposed on the printed wiring board 913 and the printed wiring board 933 such that the transmission end and the reception end are opposed to each other. By the configuration, it is possible to utilize the cavity section of the hinge structure 1001, that is, the cavity section 992 and the cavity section 994 themselves, as a radio signal transmission line to transfer information between the display section housing 930 and the operation section housing 910.

Electronic Instrument

Second Modification to the First Example

Figure 25:
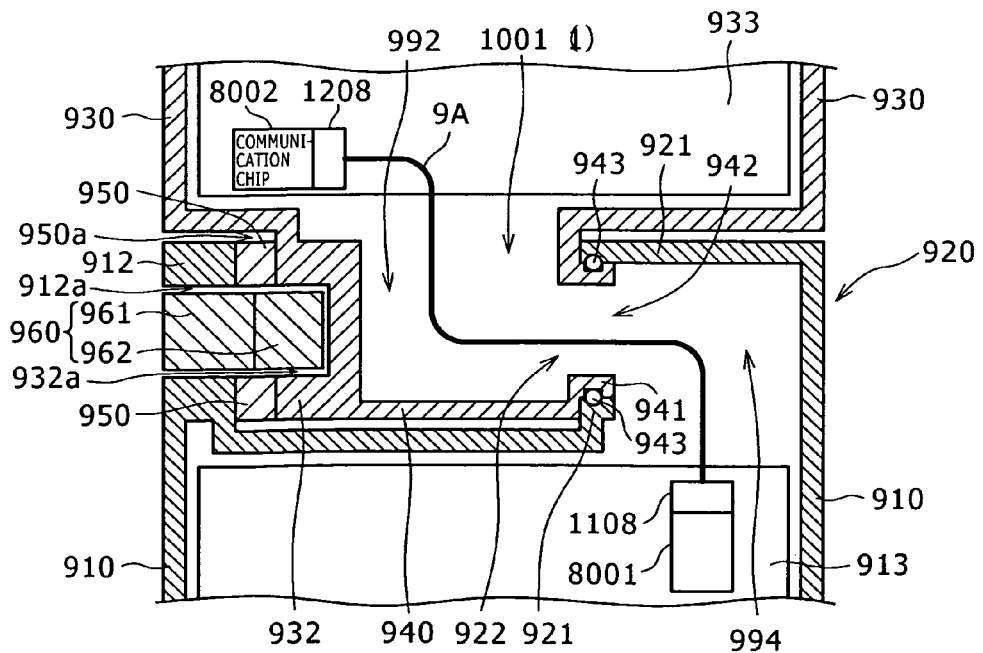

FIG. 25 shows a second modification to the first product example of an electronic instrument to which the hinge structure 1001 is applied. The second modification to the first product example is formed such that the dielectric transmission line 9A having a structure for allowing a radio signal in the form of an electromagnetic wave or radio wave to be transmitted along a transmission line while the radio signal is entrapped in the transmission line, that is, a radio signal entrapping structure such as, for example, a millimeter wave entrapping structure is used as a radio signal transmission line while the dielectric material and the shielding material are provided with flexibility such that the dielectric transmission line 9A is laid in the cavity of the hinge structure 1001. By positively utilizing the radio signal entrapping structure having flexibility as the radio signal transmission line 9, layout of the dielectric transmission line 9A as the radio signal transmission line 9 like, for example, an electric wiring line can be determined arbitrarily.

For example, the communication chip 8001 and the transmission line coupling section 1108 are provided on the printed wiring board 913 of the operation section housing 910 side while the communication chip 8002 and the transmission line coupling section 1208 are provided on the printed wiring board 933 of the display section housing 930 side. Different from the first modification, in the present modification, there is no necessity to dispose the printed wiring board 913 so as to extend to the cavity section 992 of the connection section of the hinge structure 1001 or dispose the printed wiring board 933 so as to extend to the cavity section 994 of the connection section of the hinge structure 1001. The communication chip 8001 and the transmission line coupling section 1108 may be disposed at arbitrary positions in arbitrary directions on the printed wiring board 913, and the communication chip 8002 and the transmission line coupling section 1208 may be disposed at arbitrary positions in arbitrary directions on the printed wiring board 933. For the dielectric transmission line 9A, a soft or flexible dielectric material such as, for example, a silicone resin material is used for connection between the antennae. The antenna structure of the transmission line coupling section 1108 and the transmission line coupling section 1208 may be any antenna structure only if it can introduce a radio wave into the dielectric transmission line 9A or receive a radio wave from the dielectric transmission line 9A. By the configuration, the dielectric transmission line 9A as a radio signal transmission line can be laid in the cavity section of the hinge structure 1001, that is, in the cavity section 992 and the cavity section 994, so that information can be transferred between the display section housing 930 and the operation section housing 910.

Electronic Instrument

Third Modification to the First Example

Figure 26:
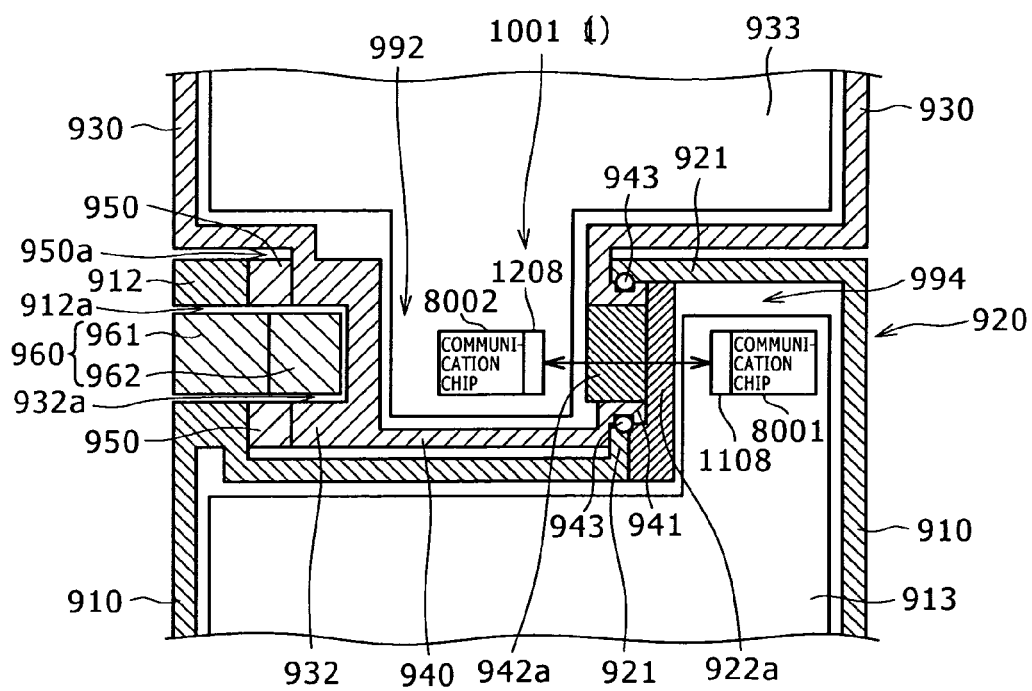

FIG. 26 shows a third modification to the first product example of an electronic instrument to which the hinge structure 1001 is applied. The third modification to the first product example is formed such that the operation section housing 910 and the display section housing 930 are configured from a dielectric material which can transmit a radio wave such that the housings themselves are utilized as the radio signal transmission line 9. If the operation section housing 910 and the display section housing 930 are configured from a dielectric material which can transmit a radio wave, then it is possible to utilize the operation section housing 910 and the display section housing 930 as the radio signal transmission line 9 to carry out wireless transmission in a frequency band of a radio wave between the transmission and reception sections. In this instance, it is not essential to configure the operation section housing 910 and the display section housing 930 entirely from a dielectric material suitable for transmission of a radio wave, but only portions of them along the path interconnecting the transmission and reception sections may be configured from a dielectric material suitable for transmission of a radio wave. In other words, a dielectric material suitable for transmission of a radio wave may be embedded as a dielectric transmission line only in a portion of the path interconnecting the transmission and reception sections in an ordinary transmission material which configures the housings, that is, only in a portion which forms a radio signal transmission line. For example, on the basis of the first example shown in FIGS. 23A to 23C, an opening 922 is embedded in a dielectric material 922a while an opening 942 is embedded in a dielectric material 942a. In a process in which the operation section housing 910 and the display section housing 930 are folded and placed one on the other, the dielectric material 922a and the dielectric material 942a are always maintained in a state in which they are opposed to each other.

The communication chip 8001 and the transmission line coupling section 1108 are provided on the printed wiring board 913 of the operation section housing 910 side while the communication chip 8002 and the transmission line coupling section 1208 are provided on the printed wiring board 933 of the display section housing 930 side. The printed wiring board 913 is disposed so as to extend to a location of the dielectric material 922a of the cavity section 992 of the connection section of the hinge structure 1001. The printed wiring board 933 is disposed so as to extend to a location of the dielectric material 942a of the cavity section 994 of the connection section of the hinge structure 1001. The transmission line coupling section 1108 and the transmission line coupling section 1208 are disposed on the printed wiring board 913 and the printed wiring board 933 in such a manner that the transmission end and the reception end are opposed to each other with the dielectric material 922a and the dielectric material 942a interposed therebetween. The antenna structure of the transmission line coupling section 1108 and the transmission line coupling section 1208 may be any antenna structure only if it has directivity from the transmission line coupling section 1108 to the transmission line coupling section 1208 or reversely from the transmission line coupling section 1208 to the transmission line coupling section 1108, and for example, a rod antenna is used. By the configuration, the dielectric material 922a which forms part of the operation section housing 910 and the dielectric material 942a which forms part of the display section housing 930 can be utilized as the dielectric transmission line 9A as the radio signal transmission line 9 to carry out transfer of information between the display section housing 930 and the operation section housing 910. Although the operation section housing 910 and the display section housing 930 are interposed between the transmission and reception sides, since they are made of a dielectric material, they do not have a significant influence on wireless transmission of a radio wave, which is, in the present example, a radio wave in the millimeter waveband. Although that the connection section of the hinge structure 1001 is utilized to carry out signal transmission between the housings using a radio wave is common to a configuration wherein a waveguide is provided in the cavity of the connection section to carry out wireless communication, since no waveguide is required, a signal interface in the hinge structure can be constructed with a very simple configuration.

Electronic Instrument

Second Example

Figure 27:
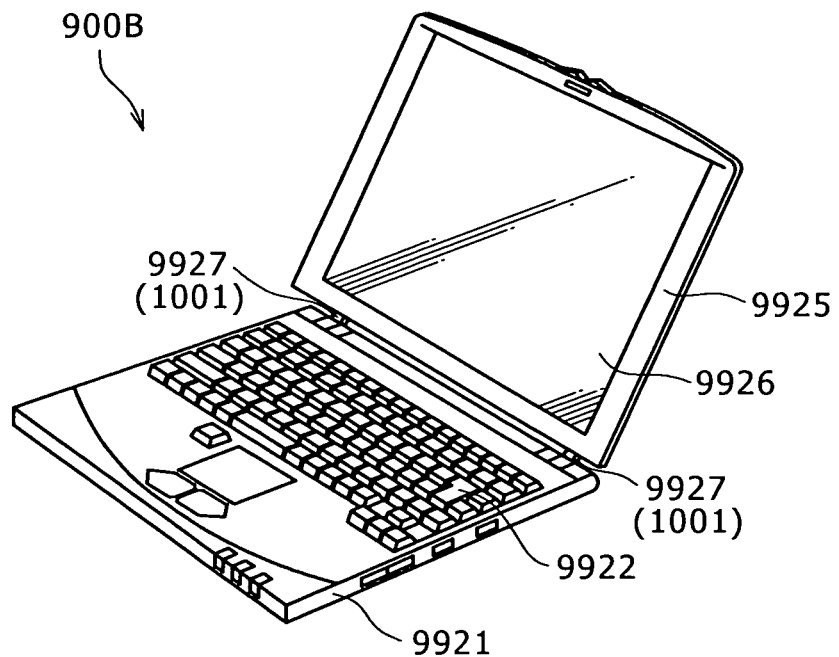
FIGS. 27, 28, 29 and 30 are schematic views showing second, third, fourth and fifth product examples of an electronic instrument to which a hinge structure is applied, respectively.

FIG. 27 shows a second product example of an electronic instrument to which the hinge structure 1001 is applied. In the second product example, the hinge structure 1001 of the present embodiment is applied to a notebook type personal computer in which a display apparatus is incorporated. Referring to FIG. 27, the notebook type personal computer 900B which is an example of an electronic instrument includes a keyboard 9922 which is operated in order to input a character, a figure or the like, and an operation section housing 9921 serving as a main body section and a first housing and having the keyboard 9922 provided thereon. The notebook type personal computer 900B further includes a display section 9926 for displaying an image and a display section housing 9925 serving as a second housing and having the display section 9926 provided thereon. The operation section housing 9921 and the display section housing 9925 are connected to each other by two connection sections 9927 provided at different left and light locations and formed by applying the hinge structure 1001 of the present embodiment such that they can be folded.

Electronic Instrument

Third Example

Figure 28:
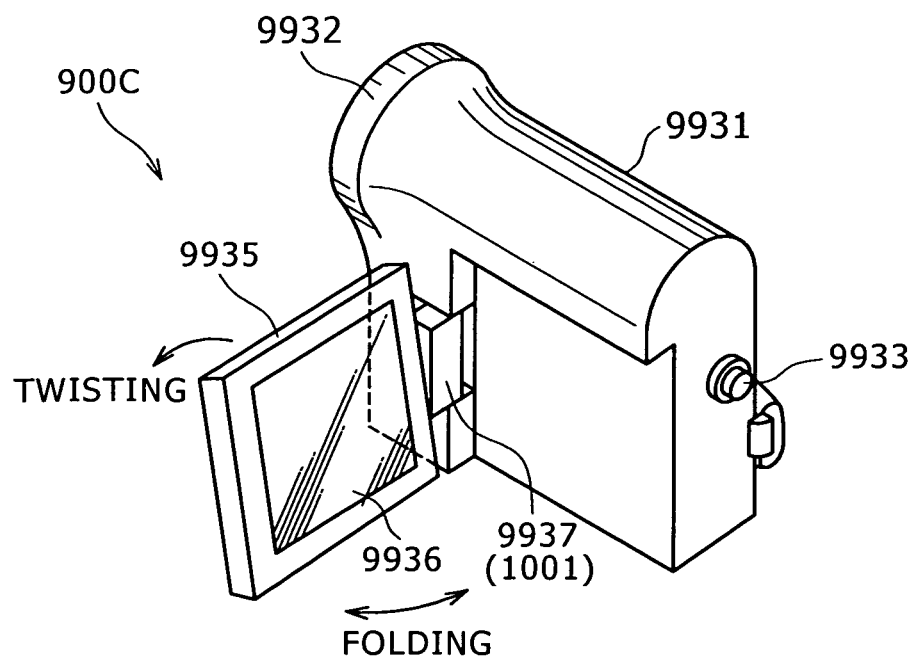

FIG. 28 shows a third product example of an electronic instrument to which the hinge structure 1001 is applied. In the third product example, the hinge structure 1001 of the present embodiment is applied to a video camera. Referring to FIG. 28, the video camera 900C which is an example of an electronic instrument includes a main body side housing 9931, a lens 9932 for image pickup of an image pickup object provided on a face directed forwardly, a start/stop switch 9933 for image pickup, a display section 9936 provided on a display section housing 9935, and so forth. The main body side housing 9931 and the display section housing 9935 are connected to each other by a connection section 9937 having the hinge structure 1001 of the present embodiment applied thereto and utilizing a ball joint or the like such that not only a folding operation but also a twisting operation of them can be carried out.

Electronic Instrument

Fourth Example

Figure 29:
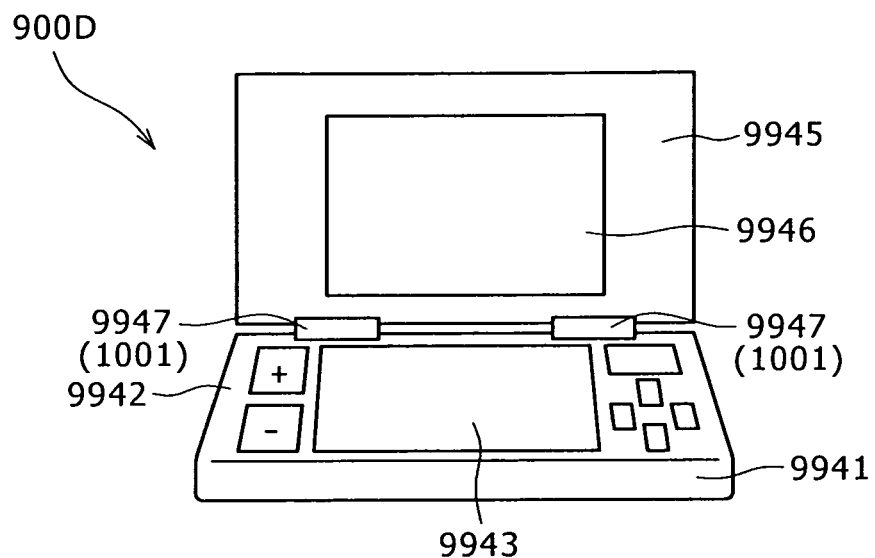

FIG. 29 shows a fourth product example of an electronic instrument to which the hinge structure 1001 is applied. In the fourth product example, the hinge structure 1001 of the present embodiment is applied to a portable game machine. Referring to FIG. 29, the portable game machine 900D which is an example of an electronic instrument includes a main body side housing 9941 serving as a first housing on which an operation section 9942 having various operation buttons to be operated for moving a cursor and a first display section 9943 for displaying an image are provided. The game machine 900D further includes a display section housing 9945 serving as a second housing on which a second display section 9946 for displaying an image is provided. The main body side housing 9941 and the display section housing 9945 are connected to each other for folding movement by connection sections 9947 provided at two left and right locations and configured by applying the hinge structure 1001 of the present embodiment.

Electronic Instrument

Fifth Example

Figure 30:
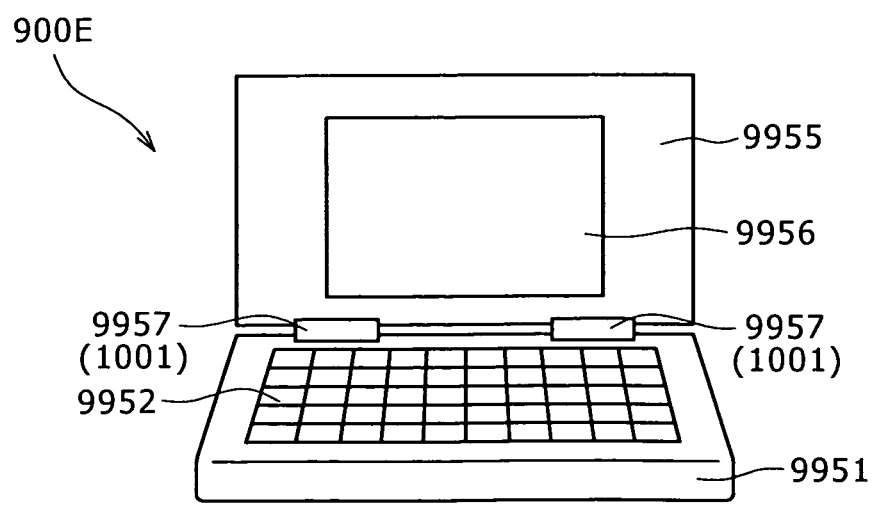

FIG. 30 shows a fifth product example of an electronic instrument to which the hinge structure 1001 is applied. In the fifth product example, the hinge structure 1001 of the present embodiment is applied to an electronic notebook. Referring to FIG. 30, the electronic notebook 900E which is an example of an electronic instrument includes an operation section housing 9951 serving as a main body section and a first housing on which a keyboard 9952 which is operated to input a character, a figure or the like is provided. The electronic notebook 900E further includes a display section housing 9955 serving as a second housing on which a display section 9956 for displaying an image is provided. The operation section housing 9951 and the display section housing 9955 are connected to each other for folding movement by two connection sections 9957 provided at different left and right locations and configured by applying the hinge structure 1001 of the present embodiment.

Other Electronic Instrument

The hinge structure 1001 of the present embodiment can be applied not only to the portable telephone set 900A, notebook type personal computer 900B, video camera 900C and game machine 900D but also to various other portable terminal apparatus such as a PDA (Personal Digital Assistant) based on a like technical idea.

While a preferred embodiment of the present disclosure has been described using specific terms, such description is for illustrative purpose only, and it is to be understood that changes and variations may be made without departing from the spirit or scope of the following claims.

The present disclosure contains subject matter related to that disclosed in Japanese Priority Patent Application JP 2010-233696 filed in the Japan Patent Office on Oct. 18, 2010, the entire content of which is hereby incorporated by reference.

What is claimed is:

1. A signal transmission apparatus comprising:
   a first housing configured to accommodate a transmission side section;
   a second housing configured to accommodate a reception side section; and
   a connection section configured to connect the first housing and the second housing for pivotal motion around a center of axis of the connection section, wherein the first housing and the second housing are connected to each other for a folding movement by the connection section, wherein the connection section includes a cavity, wherein a waveguide section for performing wireless communication between the transmission side section and the reception side section is disposed in the cavity, wherein the waveguide section comprises:
      a first polarizer that protrudes from an inner side face of a first waveguide and terminates in a cavity of the first waveguide, the inner side face of the first waveguide being spaced apart from a tip of the first polarizer;
      a first substrate spaced apart from the first polarizer along a first waveguide axis, the first polarizer in the first waveguide being between a connection and the first substrate,
         wherein a base of the first polarizer is between the inner side face of the first waveguide and the tip of the first polarizer, a sectional shape of the tip of the first polarizer being smaller than a sectional shape of the base of the first polarizer.

2. The signal transmission apparatus according to claim 1, wherein the waveguide section comprises:
   a dielectric material that fills the cavity of the first waveguide, a thin film of a metal material coating an outer periphery of the dielectric material.

3. The signal transmission apparatus according to claim 2, wherein the waveguide section comprises:
   a second polarizer that protrudes from an inner side face of a second waveguide and terminates in a cavity of the second waveguide, the dielectric material filling the cavity of the second waveguide.

4. The signal transmission apparatus according to claim 3, wherein the inner side face of the second waveguide is spaced apart from a tip of the second polarizer, a sectional shape of the tip of the second polarizer being smaller than a sectional shape of a base of the second polarizer.

5. The signal transmission apparatus according to claim 4, wherein the base of the second polarizer is between the inner side face of the second waveguide and the tip of the second polarizer.

6. The signal transmission apparatus according to claim 4, wherein the waveguide section comprises:
   a second substrate spaced apart from the second polarizer along a second waveguide axis, the second polarizer in the second waveguide being between the connection and the second substrate.

7. The signal transmission apparatus according to claim 3, wherein the connection is between the first polarizer and the second polarizer, the connection joining the first waveguide to the second waveguide.

8. The signal transmission apparatus according to claim 3, wherein the inner side face of the second waveguide encircles the cavity of the second waveguide.

9. The signal transmission apparatus according to claim 3, wherein the second polarizer is a metallic stepped plate.

10. The signal transmission apparatus according to claim 1, wherein the cavity of the first waveguide is configured to propagate a radio wave along the first waveguide axis, the first polarizer converting the radio wave into a polarized wave.

11. An electronic instrument comprising:
    the signal transmission apparatus according to claim 10,
    wherein the connection section is configured to pivotably connect the first housing of the electronic instrument to the second housing of the electronic instrument.

12. The electronic instrument according to claim 11, wherein the second housing comprises:
    a transmission section that is configured to radiate the radio wave along the first waveguide axis after converting a transmission object signal into the radio wave.

13. The electronic instrument according to claim 12, wherein the first housing comprises:
    a reception section that is configured to convert the radio wave into an electric signal after receiving the radio wave.

14. The electronic instrument according to claim 11, wherein the first housing is rotatable around the first waveguide axis.

15. The signal transmission apparatus according to claim 10, wherein the waveguide section comprises:
    a radio wave absorber that absorbs the radio wave, wherein the first substrate is between the first polarizer and the radio wave absorber.

16. The signal transmission apparatus according to claim 10, wherein the first substrate is configured to radiate or receive the radio wave.

17. The signal transmission apparatus according to claim 1, wherein the first polarizer is a stepped plate.

18. The signal transmission apparatus according to claim 1, wherein the first waveguide is metallic.

19. The signal transmission apparatus according to claim 1, wherein the inner side face of the first waveguide encircles the cavity of the first waveguide.

20. The signal transmission apparatus according to claim 1, wherein the waveguide section comprises:
    a polarization probe that outputs a polarized wave to the cavity of the first waveguide or receives the polarized wave from the cavity of the first waveguide, wherein the polarization probe is on the first substrate.

21. The signal transmission apparatus according to claim 1, wherein the waveguide section is coaxial with the center axis of the connection section.

22. The signal transmission apparatus according to claim 1, wherein the waveguide section comprises a bent portion, at which a reflection section for changing a path of a radio wave between the transmission side section and the reception side section is provided.

* * * * *